United States Patent [19]

Miki et al.

[11] Patent Number: 5,563,777

[45] Date of Patent: Oct. 8, 1996

[54] INVERTER AC POWER SUPPLY

[75] Inventors: Nobukazu Miki, Hirakata; Toshiya Kanja, Shijonawate; Koji Nishiura, Sakai; Akinori Hiramatsu, Ikoma, all of Japan

[73] Assignee: Matsushita Electric Works, Ltd., Kadoma, Japan

[21] Appl. No.: 288,090

[22] Filed: Aug. 10, 1994

[30] Foreign Application Priority Data

Apr. 25, 1994 [JP] Japan ........................................ 6-86975

[51] Int. Cl.$^6$ ............................................................ H02M 5/45
[52] U.S. Cl. .............................. 363/37; 363/124; 363/131; 363/132; 315/224
[58] Field of Search ................................ 363/34, 37, 49, 363/124, 131, 132; 315/224

[56] References Cited

U.S. PATENT DOCUMENTS

| | | | |
|---|---|---|---|
| 4,564,897 | 1/1986 | Okamoto et al. | 363/132 |
| 4,933,831 | 6/1990 | Takahashi et al. | 363/132 |
| 5,406,471 | 4/1995 | Yamanaka | 363/124 |
| 5,449,979 | 9/1995 | Ueoka et al. | 315/224 |
| 5,502,635 | 3/1996 | Bobel | 363/132 |

FOREIGN PATENT DOCUMENTS 2-202366  8/1990  Japan .

*Primary Examiner*—Stuart N. Hecker
*Attorney, Agent, or Firm*—Armstrong, Westerman, Hattori, McLeland & Naughton

[57] ABSTRACT

A inverter AC power supply comprises a chopper connected to receive an AC voltage from a low frequency AC voltage source to provide a smoothed DC voltage, and an inverter providing a high frequency AC voltage from the smoothed DC voltage for driving a load. The chopper includes an inductor and a series connected pair of first and second switching elements which alternately turn on and off for periodically interrupting an input AC voltage to store a resulting energy to the inductor which is subsequently released to charge a smoothing capacitor to give a smoothed DC voltage there across. The inverter shares the first and second switching elements with the chopper and comprises a L-C resonant circuit which is connected across one of the first and second switching elements together with the load to provide an oscillating voltage as the high frequency AC voltage to the load. A self-excitation control circuit is included in the inverter to acknowledge a change in the oscillating voltage. The self-excitation control circuit is connected to control terminals of the first and second switching elements in order to alternately turn on and off the first and second switching elements in response to the change in the oscillating voltage.

40 Claims, 34 Drawing Sheets

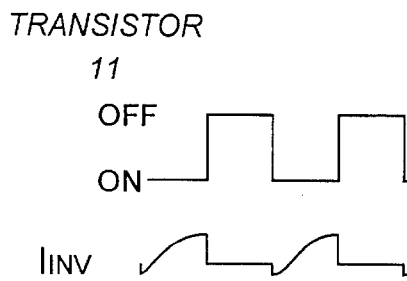
FIG. 6A
FIG. 6A-1
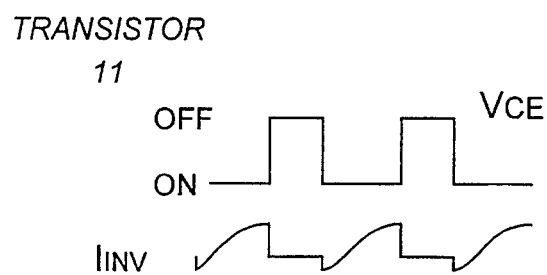
FIG. 7A
FIG. 7A-1
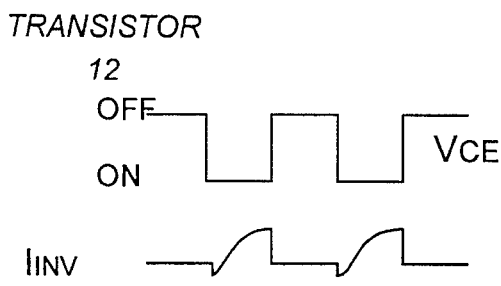
FIG. 6B
FIG. 6B-1
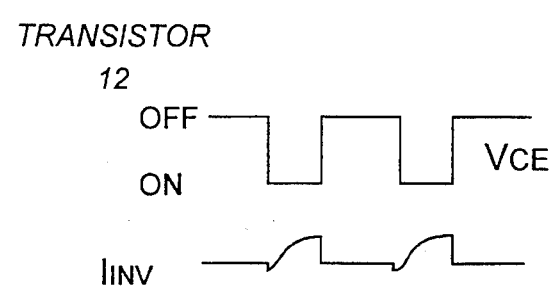
FIG. 7B
FIG. 7B-1
FIG. 8A
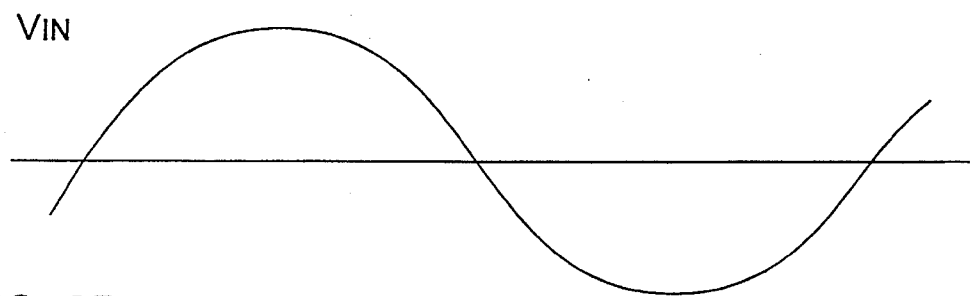
FIG. 8B
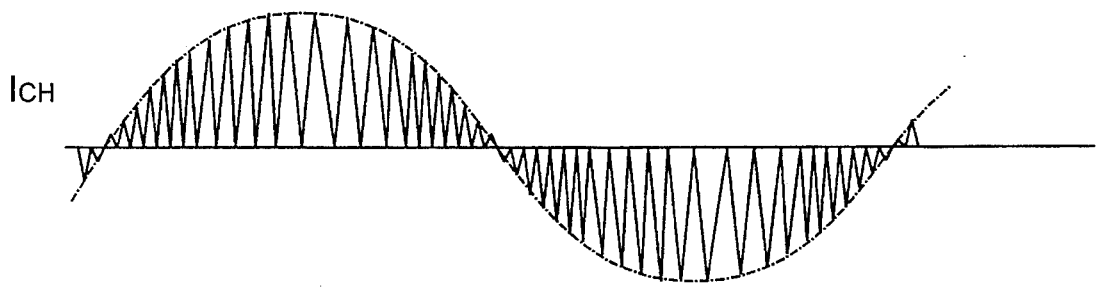

VOLTAGE ACROSS RESISTOR 264

VOLTAGE Vcc OF SECOND TRANSISTOR 12T

INVERTER AC POWER SUPPLY

BACKGROUND OF THE INVENTION

1. Field of the Invention

The present invention is directed to an inverter AC power supply providing a high frequency AC voltage to a load, and more particularly to an inverter AC power supply composed of a chopper for providing a smoothed DC voltage from an AC voltage and an inverter for providing the high frequency AC voltage from the smoothed DC voltage.

2. Description of the Prior Art

An inverter AC power supply has been widely utilized in the art to drive such as discharge lamps and electric motors. Typical inverter power supplies are proposed in U.S. Pat. No. 4,933,831 and Japanese Patent Early Publication (KOKAI) No. 2-20366, each configured to includes a chopper of providing a smoothed DC voltage from an input AC voltage and an inverter providing a high frequency AC voltage from the smoothed DC voltage. In these prior power supplies a special design is made to share switching elements and diodes for the chopper and the inverter in order to simplify the circuit with an attendant reduction in the number of the components. However, U.S. Pat. No. 4,933,831 requires an external controller for alternately turning on and off the switching elements and therefore necessitates an additional circuitry which add complexity to the overall power supply circuit. Further, since the external controller is designed to turn on the switching elements for a fixed time period, there remains a problem that only a less input AC current is drawn to the chopper as an input pulsating AC voltage goes low, thereby failing to exactly conform an envelop of the input AC current to a sinusoidal waveform of the input AC voltage, and therefore lowering a power factor to that extent. On the other hand, the power supply of the Japanese Patent Publication No. 2-20366 is designed to eliminate the above problem by incorporating an external controller with an extra circuitry which monitors an input AC pulsating voltage and varies the turn-on period of the switching elements depending upon the monitored input AC voltage for improving the power factor. The power supply of this type therefore necessitates a complicated circuit arrangement due to not only the external controller but also the extra circuit with an attendant increase in the number of the components, which adds more cost and greater bulk to the assembled power supply and militates against the use in powering the load where the cost and bulk of primary concern.

SUMMARY OF THE INVENTION

The above problems and insufficiencies have been eliminated in an inverter AC power supply of the present invention which is capable of reducing the complexity of the circuitry and component costs, yet improving a power factor. The power supply in accordance with the present invention comprises a chopper connected to receive an AC voltage from a low frequency AC voltage source to provide a smoothed DC voltage, and an inverter providing a high frequency AC voltage from the smoothed DC voltage for driving a load. The chopper includes at least one inductor; a series connected pair of first and second diodes; a series connected pair of first and second unidirectional switching elements which are controlled to alternately turn on and off; a series connected pair of third and fourth diodes which are connected in an anti-parallel relation respectively to the first and second switching elements, and which are connected across the series connected pair of the first and second diodes to form a rectifier bridge; and a smoothing capacitor connected across the series pair of the first and second switching elements. The first and second diodes define therebetween a first input point, while the first and second switching elements define therebetween a second input point. The low frequency AC voltage source is inserted in series with the inductor between the first and second input ends such that the first and second switching elements repeat interrupting a pulsating AC voltage supplied from the AC voltage source through the first and second diodes, thereby developing at the inductor a resulting voltage which is then fed through associated ones of the first, second, third, and fourth diodes to give the smoothed DC voltage across the smoothing capacitor.

The inverter shares the first and second switching elements, the third and fourth diodes with the chopper and comprises a L-C resonant circuit which is connected across one of the first and second switching elements together with the load to provide an oscillating voltage as the high frequency AC voltage to the load.

A self-excitation control circuit is included in the inverter to acknowledge a change in the oscillating voltage. The self excitation control circuit is connected to control terminals of the first and second switching elements in order to alternately turn on and off the first and second switching elements in response to the change in the oscillating voltage. The combination of the self-excitation control circuit and the L-C resonant circuit can eliminate an external controller of complicated circuitry and therefore can simplify the overall circuit arrangement and the component cost, yet assuring consistent inverter operation. Further, the self-controller circuit can be also made responsive to a pulsating input AC voltage during either of positive or negative half cycle thereof so that it adjusts the turn-on period of the first and second switching elements in a direction of conforming an envelop of the periodically interrupted input AC current to a sinusoidal waveform of the input AC voltage, for maximizing the power factor.

Accordingly, it is a primary object of the present invention to provide an inverter AC power supply which is simple in circuitry economical in cost, and efficient in maximizing the power factor.

In preferred embodiments, the L-C resonant circuit comprises a resonance inductor and a resonance capacitor which are connected in series across the first switching element. The self excitation control circuit is designed to make the use of the resonance inductor and to comprise a first feedback winding and a second feedback winding which are magnetically coupled to the resonance inductor to develop bias voltages of opposite polarity respectively in response to the oscillating voltage produced by the inverter. The first and second feedback windings are coupled to feed back the bias voltages respectively to the control terminals of the first and second switching elements for alternately turning on and off the first and second switching elements. The first and second feedback windings may be coupled to the resonance inductor to constitutes a saturable transformer.

In another preferred embodiment, the self-excitation control circuit is designed to make the use of an output transformer through which the load is coupled to the inverter. That is, the self-excitation control circuit comprises a pair of like first and second feedback windings which are magnetically coupled to a primary winding of the output transformer for alternately turning on and off the first and second switching elements in response to the oscillating voltage appearing at the output transformer.

Alternately, the self-excitation control circuit may be designed to comprises an additional transformer with a main winding and a pair of like first and second feedback windings. The main winding is connected in circuit in series with the resonance inductor across the first switching element to give the oscillating voltage of the inverter which in turn produces the feedback bias voltages for alternately turning on and off the first and second switching elements.

Further, the self-excitation control circuit may comprise the resonance inductor with a first feedback winding which is magnetically coupled to the resonance inductor to give a bias voltage in response to the oscillating voltage of the inverter for turning on and off the first switching element, a detector which produces a control signal indicative of a turn-off of the first switching element; and a driver which is connected to receive the control signal and provides a bias voltage for turning on the second switching element for a predetermined time period. Thus configured self-excitation control circuit is also responsive to the oscillating output voltage of the inverter for turning on and off the first and second switching elements.

The inverter AC power supply of the present invention can include additional useful features in conjunction with the self-excitation of the first and second switching elements. Among these features is a protection of the inverter from producing unduly high resonance current which would occur when the load is substantially disconnected from the inverter, for example, a discharge lamp as the load is accidentally disconnected or become deteriorated to an end of lamp life. To this end, the inverter includes a saturable drive transformer with a main winding, a pair of first and second feedback windings, and a signal winding. The main winding is inserted in the inverter to provide the oscillating voltage of the inverter which in turn develops the bias voltages at the first and second feedback windings for alternately turning on and off the first and second switching elements. Also included in the inverter is a sensor winding which is magnetically coupled to the resonance inductor to develop a check voltage indicative of the oscillating voltage of the inverter. A converter circuit is connected to the sensor winding to convert the check voltage into a corresponding control DC voltage and to apply the resulting control voltage to the signal winding in order to magnetize the drive transformer in the direction of lowering the bias voltages developed at the first and second feedback windings as the oscillating voltage increases, thereby reducing a turn-on period of the first and second switching elements. Thus, the inverter is enabled to limit its output in response to the load condition for protection of the components of the inverter.

Another feature of the present invention resides in that the inverter includes an offset circuit which produces an offset DC voltage proportional to the oscillating voltage of the inverter. The offset voltage is additive to the bias voltage applied to the first and second switching elements so as to vary the turn on period thereof in proportion to the offset voltage, i.e., the output voltage of the inverter.

Alternately, the offset voltage may be obtained from the input AC voltage as indicative of thereof. In this instance, the first and second switching elements are enabled to turn on only when the offset voltage is added to the bias voltage developed at the first and second feedback windings so that the inverter can immediately stop operating as soon as the inverter is disconnected from the AC voltage source for avoiding undesirable inverter operation which would otherwise follow due to a gradually decreasing voltage of the smoothing capacitor.

A further feature of the present invention is to adjust the inverter frequency in accordance with the input AC voltage for reducing ripples in the inverter output which is provable when the smoothing capacitor is of a relatively low capacitance. This is achieved by incorporating an input voltage monitor and a regulator. The input voltage monitor provides a varying DC voltage corresponding to the pulsating AC voltage from the AC voltage source. The regulator is connected to the first and second feedback windings and responsive to the monitored DC voltage for decreasing the bias voltages developed at said first and second feedback windings by an extent proportional to the pulsating DC voltage, whereby shortening the turn-on period of the first and second switching elements as the instantaneous AC voltage increases. Thus, the inverter frequency is adjusted to increase as the input AC voltage increase to limit its output to thereby reduce the ripples.

Still further feature of the present invention is to protect the inverter from producing unduly high resonance current by limiting the turn on period of the first and second switching elements in a case when the load is disconnected or substantially shorted such that the L-C circuit responds to increase the resonance current. The feature is realized by provision of first and second current sensors and a regulator. The first and second current sensors are connected in series respectively with the first and second switching elements to give first and second monitored voltages indicative of currents flowing through the inverter. The regulator is responsive to the first and second monitored voltages from the first and second current sensors for decreasing the bias voltages developed at the first and second feedback windings by an extent proportional to the first and second monitored voltage, whereby shortening the turn-on period of the first and second switching elements as the first and second monitored voltage increase.

A more feature of the present invention is to limit the inverter output by decreasing the turn-on period of the switching elements when the chopper acts to supply an excessively high voltage to the inverter. For this purpose, the inverter includes a voltage detector providing a detected voltage indicative of the DC voltage developed across the smoothing capacitor, and a regulator which is connected to the first and second feedback windings. The regulator is responsive to the detected DC voltage exceeding a predetermined level for lowering the bias voltages applied from the first and second feedback windings to the first and second switching elements, whereby shortening the turn-on period of the switching elements as the detected voltage exceeds above the predetermined level.

These and still other objects and advantageous features of the present invention will become more apparent from the following detailed description of the preferred embodiments when taken in conjunction with the attached drawings.

BRIEF DESCRIPTION OF THE DRAWINGS

FIGS. 6A and 6B are charts illustrating waveforms of a current flowing across first and second switching transistors when the pulsating input voltage to the chopper is around its peak;

FIGS. 7A and 7B are charts illustrating waveforms of a current flowing across first and second switching transistors when the pulsating input voltage to the chopper is around its zero level;

FIGS. 8A and 8B are charts illustrating a sinusoidal waveform of the input AC voltage to the chopper and a repetitively interrupted input current to the chopper;

DETAILED DESCRIPTION OF THE EMBODIMENTS

1st Embodiment <FIGS. 1 to 8>

Figure 1:
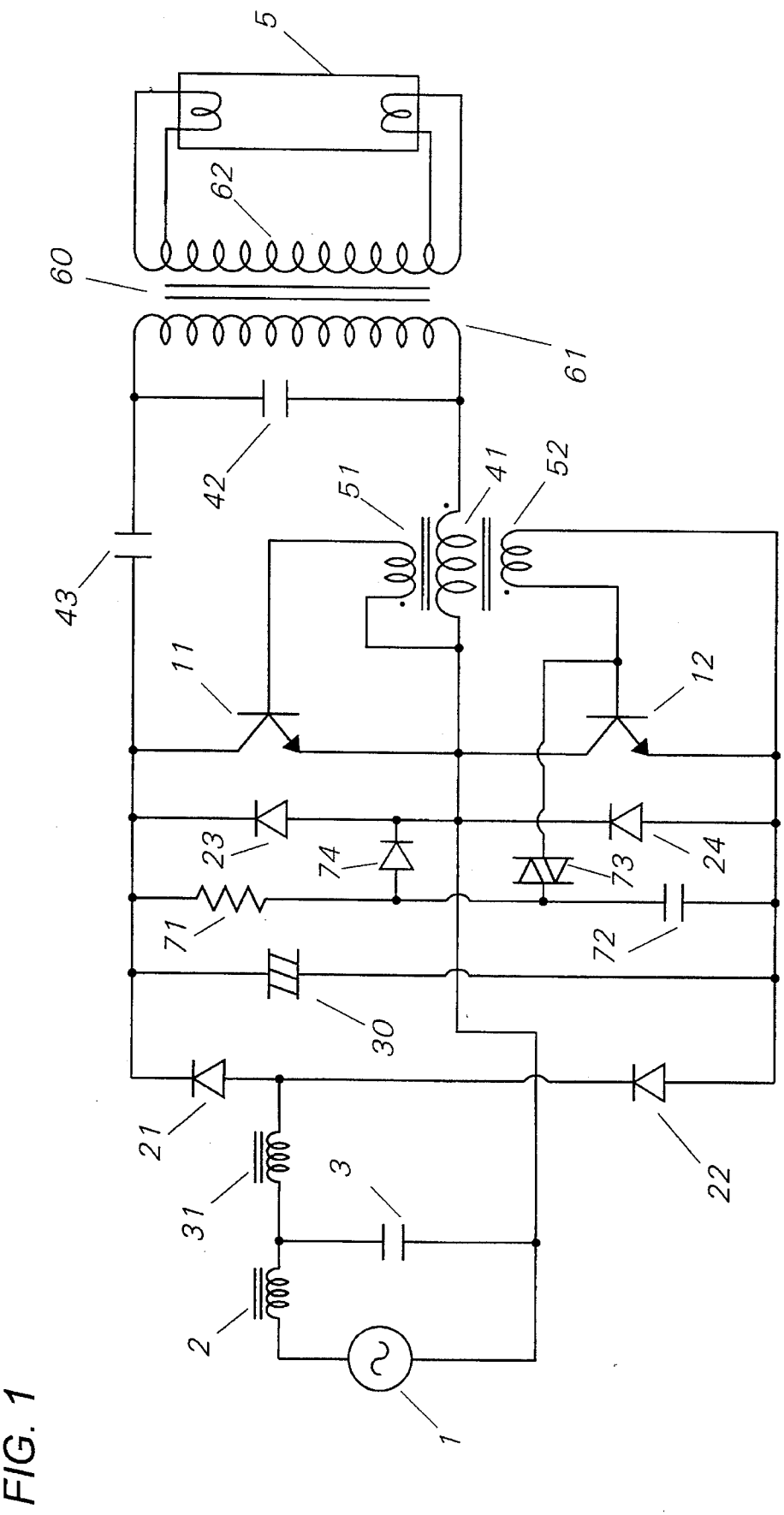
FIG. 1 is a circuit diagram of an inverter AC power supply composed of a chopper and an inverter in accordance with a 1st embodiment of the present invention.
Figure 3A:
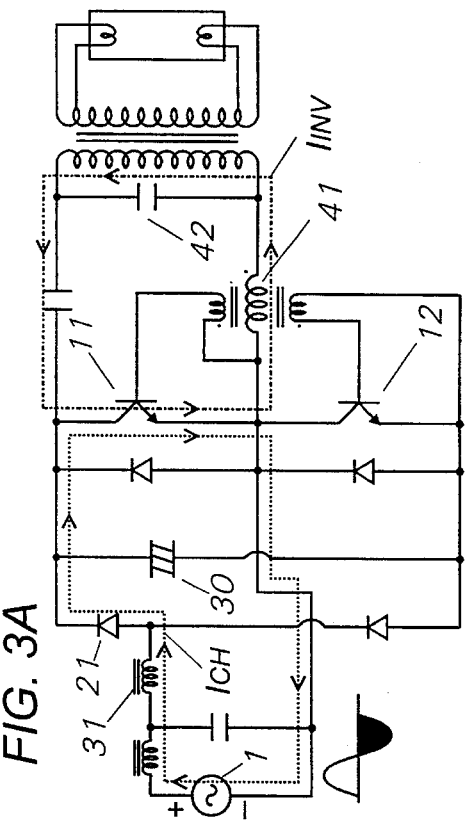
FIGS. 3A and 3B are diagrams illustrating an operation of the chopper during a negative half cycle of the input AC voltage.
Figure 3B:
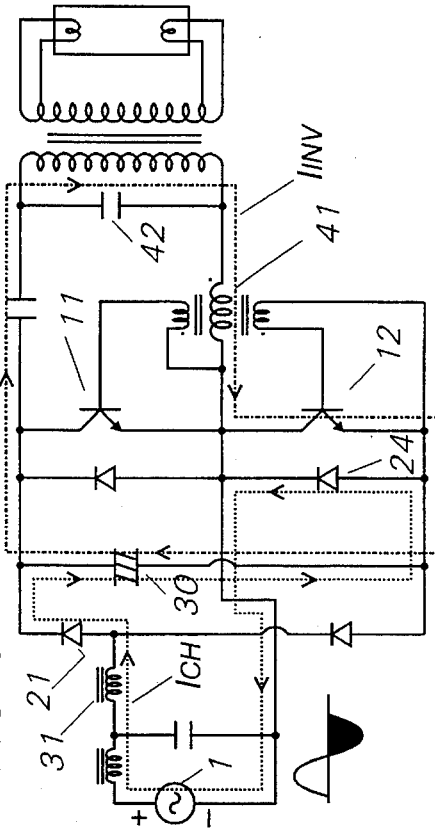

Referring now to FIG. 1, there is shown an inverter AC power supply in accordance with a 1st embodiment of the present invention. The inverter power supply comprises a chopper and an inverter. The chopper provides a smoothed DC voltage from a low frequency AC voltage available as AC mains, while the inverter convert the DC voltage into a high frequency AC voltage to drive a load 5, for example, a discharge lamp.

Figure 2A:
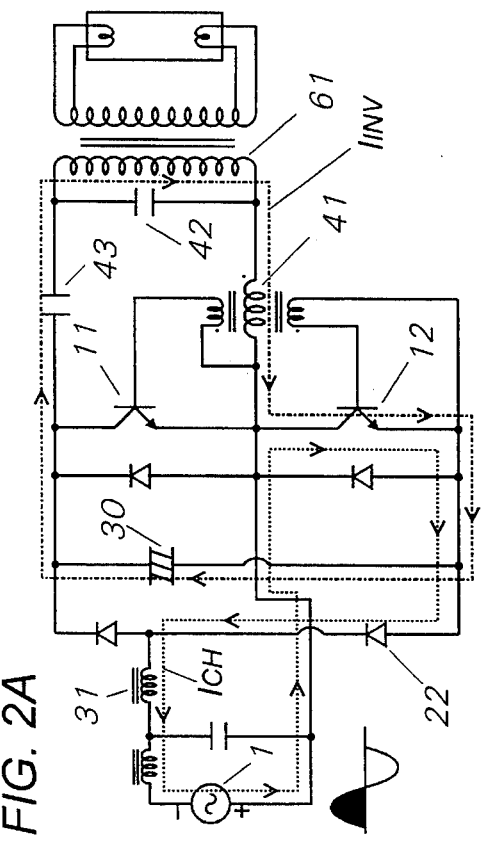
FIGS. 2A and 2B are diagrams illustrating an operation of the chopper during a positive half cycle of an input AC voltage.
Figure 2B:
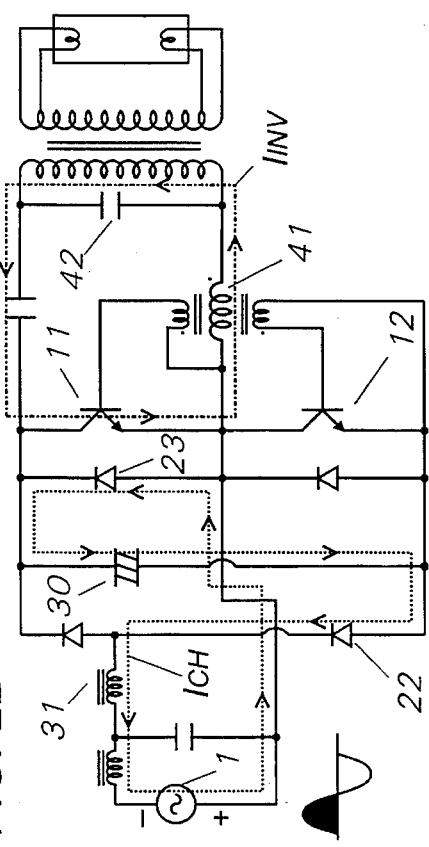

As shown in FIG. 1, the chopper comprises a series connected pair of first and second switching elements or bipolar transistors 11 and 12, a full-wave rectifier composed of diodes 21 to 24, smoothing capacitor 30 and an inductor 31. The switching transistors 11 and 12 are connected across the smoothing capacitor 30. Diodes 21 to 24 are connected in a bridge configuration with third and fourth diodes 23 and 24 being connected in anti-parallel relation to first and second transistors 11 and 12, respectively. First and second diodes 21 and 22 define therebetween a first input end, while the third and fourth diodes 23 and 24 or first and second transistors 11 and 12 define therebetween a second input end. The inductor 31 is connected in series with an AC voltage source 1 between the first and second input ends. As explained hereinafter with reference to the inverter operation, the transistors 11 and 12 are driven to alternately turn on and off at a high frequency, for instance, several tens kHZ for accumulating a smoothed step-up voltage at the smoothing capacitor 30. This chopper operation is shown in FIGS. 2A, 2B, 3A and 3B. During a positive half cycle of the input AC voltage, as shown in FIGS. 2A and 2B, transistor 12 is responsible for periodically interrupting the input AC voltage to charge smoothing capacitor 30. That is, while transistor 12 is conductive, a current ICH from the AC voltage source is allowed to flow through inductor 31 through a loop indicated by a dotted line in FIG. 2A for storing a corresponding energy to inductor 31, after which transistor 12 is turned off to release the energy through a loop indicated by a dotted line in FIG. 2B for charging smoothing capacitor 30. In the negative half cycle of the AC voltage, transistor 11 is responsible for periodically interrupting the input AC voltage to charge smoothing capacitor 30 by the current ICH flowing through loops as indicated by dotted lines in FIGS. 3A and 3B in response to on and off of transistor 11. Thus, the chopper provides a smoothed step-up DC voltage to smoothing capacitor 30. A low pass filter composed of an inductor 2 and a capacitor 3 is connected between the rectifier and the AC voltage source 1. A starter is included in circuit to comprise a series combination of a resistor 71 and a capacitor 72 connected across smoothing capacitor 30, and a diac 73 connected to apply a starting bias to the base of transistor 12 from capacitor 72 to firstly turn on transistor 12 when capacitor 72 is charged up to a certain level. A diode 74 is connected in series with transistor 12 in a shunting relation with capacitor 72 for discharging the voltage at capacitor 72 each time transistor 12 is turned on to thereby disable the starting bias once after the chopper starts.

The inverter comprises a pair of first and second transistors 11 and 12, third and fourth diodes 23 and 24, a series L-C resonant circuit composed of an inductor 41, and a capacitor 42. Thus, the inverter shares transistors 11 and 12 as well as diodes 23 and 24 with the chopper. An output transformer 60 is included in circuit with its primary winding 61 connected across capacitor 42 and with its secondary winding 62 connected to the discharge lamp 5. The primary winding 61 is connected in series with a coupling capacitor 43 across first transistor 11 and defines an inverter output at which the L-C resonant circuit produces the high frequency AC voltage in response to the switching operation of transistors 11 and 12. The resulting high AC voltage is applied through the secondary winding 62 to drive the discharge lamp 5. The coupling capacitor 43 which acts as a DC-blocking capacitor is selected to have a capacitance sufficiently greater than that of capacitor 42 and is charged up to a voltage nearly half of DC voltage at the smoothing capacitor 30. The inductor 41 is magnetically coupled to first and second feedback windings 51 and 52 which are respectively connected to bases of transistors 11 and 12 for self-excitation thereof.

The self-excited inverter operation is now discussed with reference to FIGS. 4A to 4D, and 5A to 5D respectively for positive and negative half cycles of the input AC voltage.

Figure 4C:
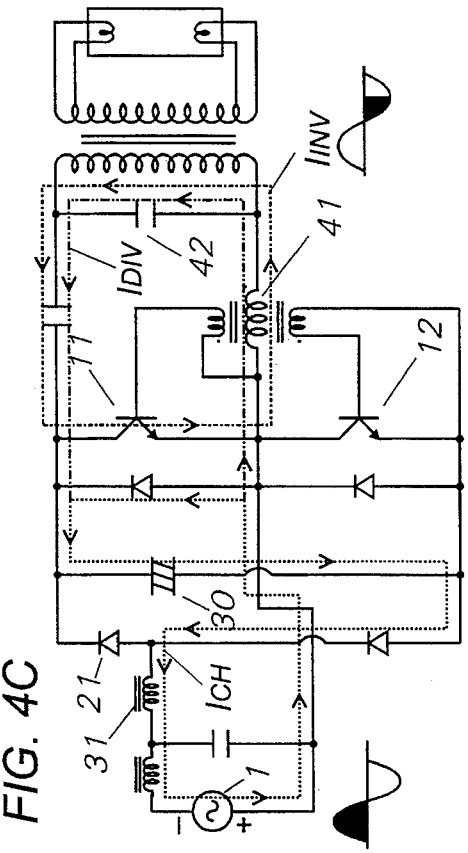
FIGS. 4A to 4D are diagrams illustrating an operation of an inverter during the positive half-cycle of the input AC voltage.
Figure 4D:
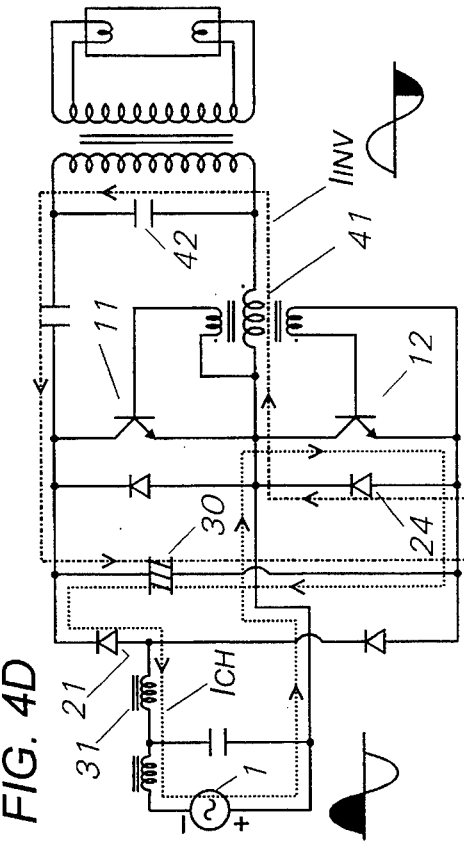
Figure 4A:
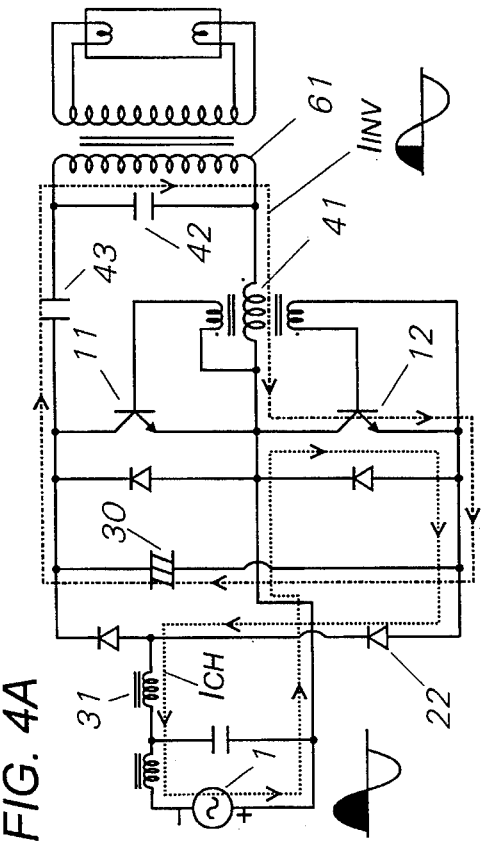
Figure 5A:
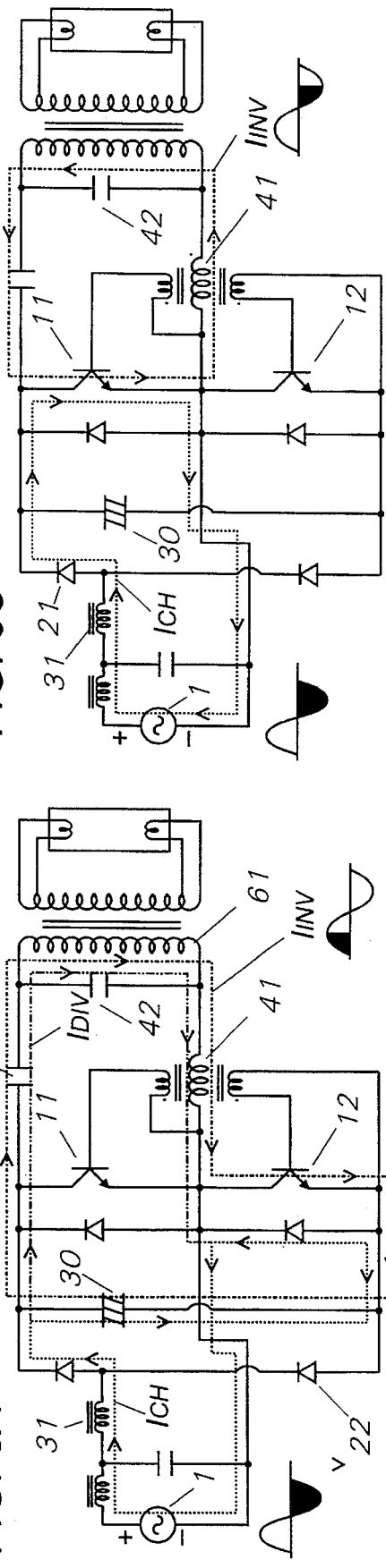
FIGS. 5A to 5D are diagrams illustrating an operation of an inverter during the negative half-cycle of the input AC voltage.

1) When the starting bias is applied to turn on transistor 12, the inverter starts operating to flow an inverter current IINV, as shown in FIGS. 4A and 5A from smoothing capacitor 30 through coupling capacitor 43, a parallel combination of primary winding 61 and capacitor 42, inductor 41, and transistor 12, while charging coupling capacitor 43.

Figure 4B:
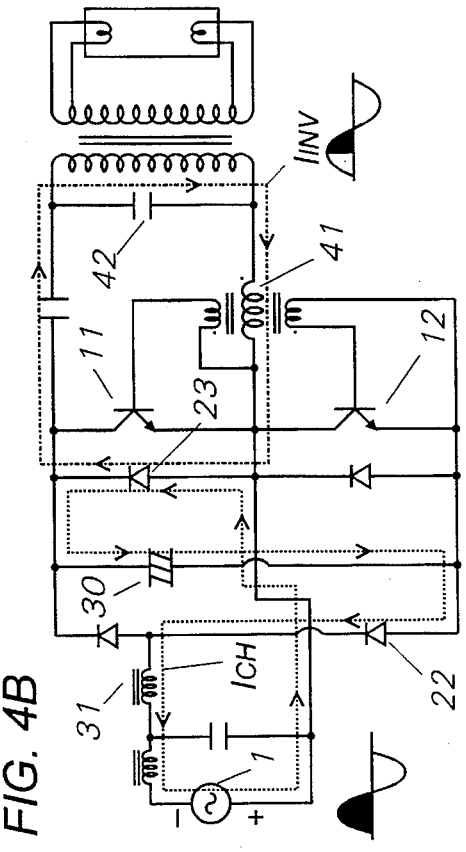
Figure 5B:
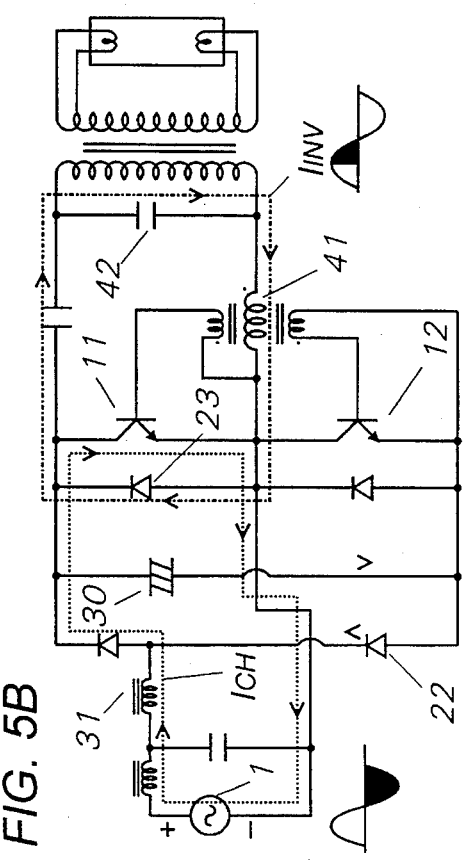

2) When the current IINV flows to a point where it induces no further expanding magnetic field around inductor 41, the voltage developed across feedback winding 52 is reduced to thereby turn off transistor 12, after which the inductor 41 continues to flow inverter current IINV, as shown in FIGS. 4B and 5B, in the same direction through third diode 23 instead of first transistor 11, capacitor 43, and the parallel combination of primary winding 61 and resonance capacitor 42, with attendant collapsing magnetic field.

Figure 5C:
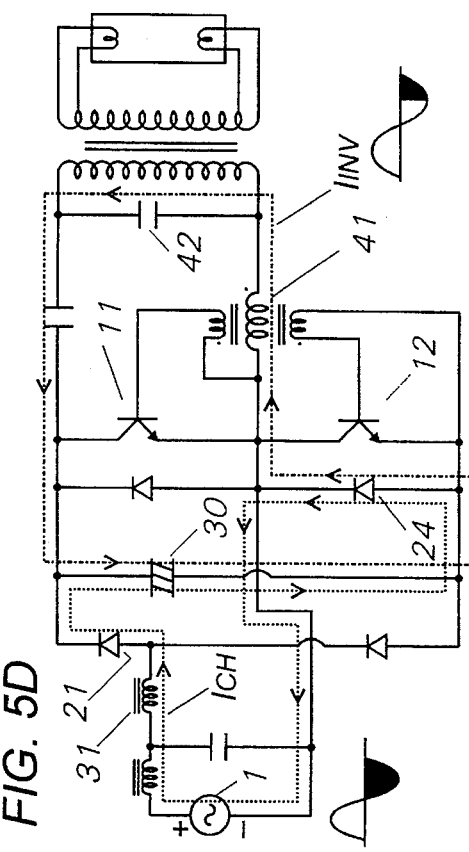

3) In response to the collapsing magnetic filed, the feedback winding 51 induces a forward bias to turn on transistor 11. Upon this occurrence, transistor 11 becomes conductive to flow the inverter current IINV in the opposite direction, as shown in FIGS. 4C and 5C, from capacitor 43 through transistor 11, inductor 41, and the parallel combination of primary winding 61 and capacitor 42, and back to capacitor 43.

Figure 5D:
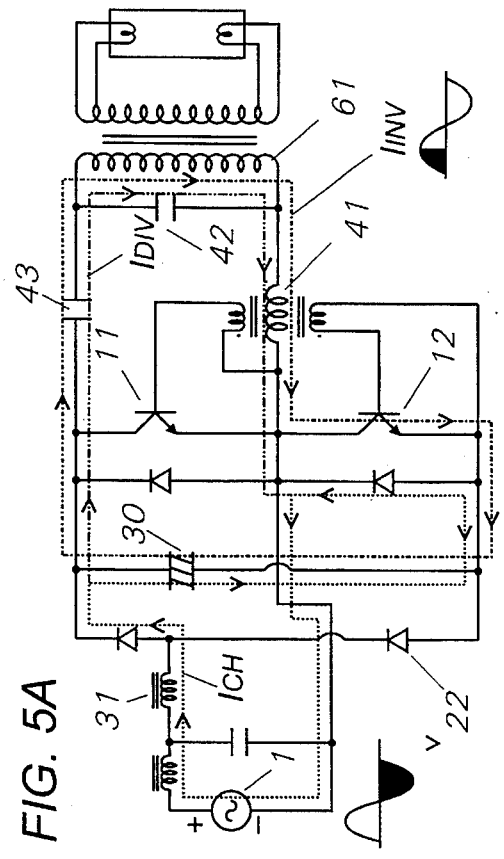

4) When the inverter current IINV flows to a point where it induces no further expanding magnetic field around inductor 41, the voltage developed across feedback winding 51 is reduced to turn off first transistor 11. Immediately thereafter inductor 41 acts also to continue flowing the inverter current IINV, as shown in FIGS. 4D and 5D, through the parallel combination of primary winding 61 and capacitor 42, capacitor 43, smoothing capacitor 30, and through diode 24.

In this manner, the above steps are repeated so that the resonance circuit can provide an oscillating current flowing in the opposite directions with an on-time duration determined by a circuit constant of the resonance circuit.

As known from the above figures that, during the positive half cycle of the input AC voltage, transistor 12 is responsible for both the chopper and inverter operations while transistor 11 is only for the inverter operation and that, during the negative half cycle of the input AC voltage, transistor 11 is responsible for both the chopper and inverter operations while transistor 12 is only for the inverter operation. That is, during the positive half cycle of the input AC voltage as shown in FIGS. 4A to 4D, transistors 11 and 12 are made alternately conductive and non-conductive to give the inverter operation of providing the high frequency oscillating voltage and inverter current IINV, while transistor 12 is also active to effect the chopper operation of flowing the chopper current ICH to give the DC voltage to smoothing capacitor 30. During the negative half cycle of the input AC voltage, as shown in FIGS. 5A to 5D, transistors 11 and 12 are made alternately conductive and non-conductive to give the inverter operation of providing the inverter current IINV, while transistor 11 is also active to effect the chopper operation of flowing the chopper current ICH to give the DC voltage to smoothing capacitor 30. In this manner, first and second transistors 11 and 12 are equally utilized in one complete cycle of the input AC voltage for the chopper operation and therefore share stress uniformly for enabling a well balanced transistor configuration.

It should be noted here that, in a particular phase of the inverter operation, the chopper current ICH is allowed to diverge into the inverter circuit to flow through resonance inductor 41 in an additive relation to the inverter current IINV to vary the voltage developed across resonance inductor 41 and therefore the bias voltages across first and second feedback windings 51 and 52, thereby varying the turn-on periods of transistors 11 and 12, respectively in accordance with the strength of the chopper current ICH. The particular phase are conditions shown in FIG. 4C and FIG. 5A respectively for positive and negative half cycles of the input AC voltage. In the phase of FIG. 4C, first transistor 11 becomes conductive to flow the inverter current IINV, while second transistor 12 is kept non-conductive to flow the chopper current I_CH through a loop of inductor 31, AC voltage source 1, third diode 23, smoothing capacitor 30, and second diode 22. In this phase, the chopper current I_CH is in opposite direction to the inverter current I_INV with respect to across third diode 23 and first transistor 11 and the presence of the inverter current I_INV lowers impedance of the inverter. Accordingly, under this condition, the chopper current I_CH is caused to give a diverging current I_DIV flowing from the connection between third and fourth diodes 23 and 24 through resonance inductor 41, parallel combination of resonance capacitor 42 and primary winding 61, coupling capacitor 43 and back to the connection between third diode 23 and smoothing capacitor 30. The extent to which the diverging current I_DIV flows through the inverter depends upon an instantaneous AC voltage at the AC voltage source so that the diverging current I_DIV flows by a larger amount when the instantaneous AC voltage is around its peak than when it is around zero. In this manner, the diverging current I_DIV is added to increase the inverter current I_INV by a greater extent as the instantaneous input AC voltage increases with an attendant elongation of the turn-on period of first transistor 11 acting only for the inverter operation, as shown in FIGS. 6A and 7A which illustrate collector-emitter voltage V_CE of transistor 11 and the inverter current I_INV respectively when the input AC voltage is around zero level (FIG. 6A) and around its peak (FIG. 7A). In the subsequent phase of FIG. 4D where the inverter current I_INV responds to turn-off of first transistor 11 for flowing through a flywheel loop from resonance inductor 41, parallel combination of resonance capacitor 42 and primary winding 61, coupling capacitor 43, smoothing capacitor 30, fourth diode 24, and back to inductor 41, and the chopper current I_INV is allowed to flow in response to the turn-on of second transistor 12 from AC voltage source 1, second transistor 12, second diode 22, and inductor 31. At this condition, the chopper current I_CH is not permitted to diverge into the inverter due to high impedance thereof and counteracts the inverter current I_INV to thereby interrupt the inverter current from flowing through the flywheel loop by a greater extent when the instantaneous input AC voltage is around its peak than around the zero, as seen from FIGS. 6B and 7B which illustrate V_CE of transistor 12 and the inverter current I_INV respectively when the input AC voltage is around zero level (FIG. 6B) and around its peak (FIG. 7B). With this result, turn-on period of second transistor 12 responsible both for the chopper and inverter operations is shortened as the input AC voltage increases. In the present instance, it is designed to give a duty ratio of about 50% to transistors 11 and 12 when the input AC voltage is around zero, and a duty ratio of about 70% to transistor 11 responsible only for the inverter operation and a duty ratio of about 30% to transistor 12 responsible for the inverter and chopper operations when the input AC voltage is around its peak. Thus, the inverter acts to elongate the turn-on period of transistor 11 and correspondingly shorten the subsequent turn-on period of transistor 12 with the increase of the input AC voltage, yet without substantially changing the frequency of the oscillating voltage produced. With this result, the chopper current I_CH can be derived continuously from the AC voltage source without leaving substantial dead period notwithstanding the pulsating input AC voltage, as shown in FIG. 8B, thereby conforming an envelop of the chopper current closely to a sinusoidal waveform (FIG. 8A) of the input AC voltage and therefore greatly improving the power factor.

The above advantageous feature is also available in the negative half cycle of the input AC voltage, as seen the phase of FIG. 5A and the subsequent phase of FIG. 5B. That is, in the phase of FIG. 5A where second transistor 12 is conductive to give the inverter current I_INV and the inverter shows a low impedance to the chopper current I_CH flowing through inductor 31, first diode 21, smoothing capacitor 30, fourth diode 24, and AC voltage source 1, the chopper current I_CH gives a like diverging current I_DIV which flows from a connection between first diode 21 and smoothing capacitor 30 through coupling capacitor 43, parallel combination of resonance capacitor 42 and primary winding 61, resonance inductor 41, and back to a connection between third and fourth diodes 23 and 24. Therefore, as the instantaneous input AC voltage increases, the diverging current I_DIV is additive to increase the inverter current I_INV to thereby elongate the turn-on period of second transistor 12 responsible only for the inverter operation in this negative half cycle. In the subsequent phase of FIG. 5B where the inverter current I_INV tends to flow through a flywheel loop of resonance inductor 41, third diode 23, coupling capacitor 43 and parallel combination of resonance capacitor 42 and primary winding 61, first transistor 11 is made conductive to flow the chopper current I_CH from AC voltage source 1, inductor 31, first diode 21, first transistor 11 and back AC voltage source 1 in an opposite direction to the inverter current I_INV with respect to across third diode 23 and first transistor 11. Therefore, the chopper current I_CH counteracts to the inverter current I_INV in a direction of shortening the turn-on period of first transistor 11 as the instantaneous input AC voltage increases. Thus, also in the negative half cycle of the input AC voltage, second transistor 12 responsible only for the inverter operation can increase its duty ratio up to about 70% with attendant decrease in the duty ratio down to about 30% for first transistor 11 responsible both for the chopper and inverter operations in much the same way as in the positive half cycle for the purpose of improving the power factor. Although this embodiment is illustrated to utilize a single inductor 31 for the chopper, it is equally possible to use an additional inductor on opposite of inductor 31 from AC voltage source 1 with respect to its polarity. In such case, these two inductors may be magnetically coupled.

Figure 9:
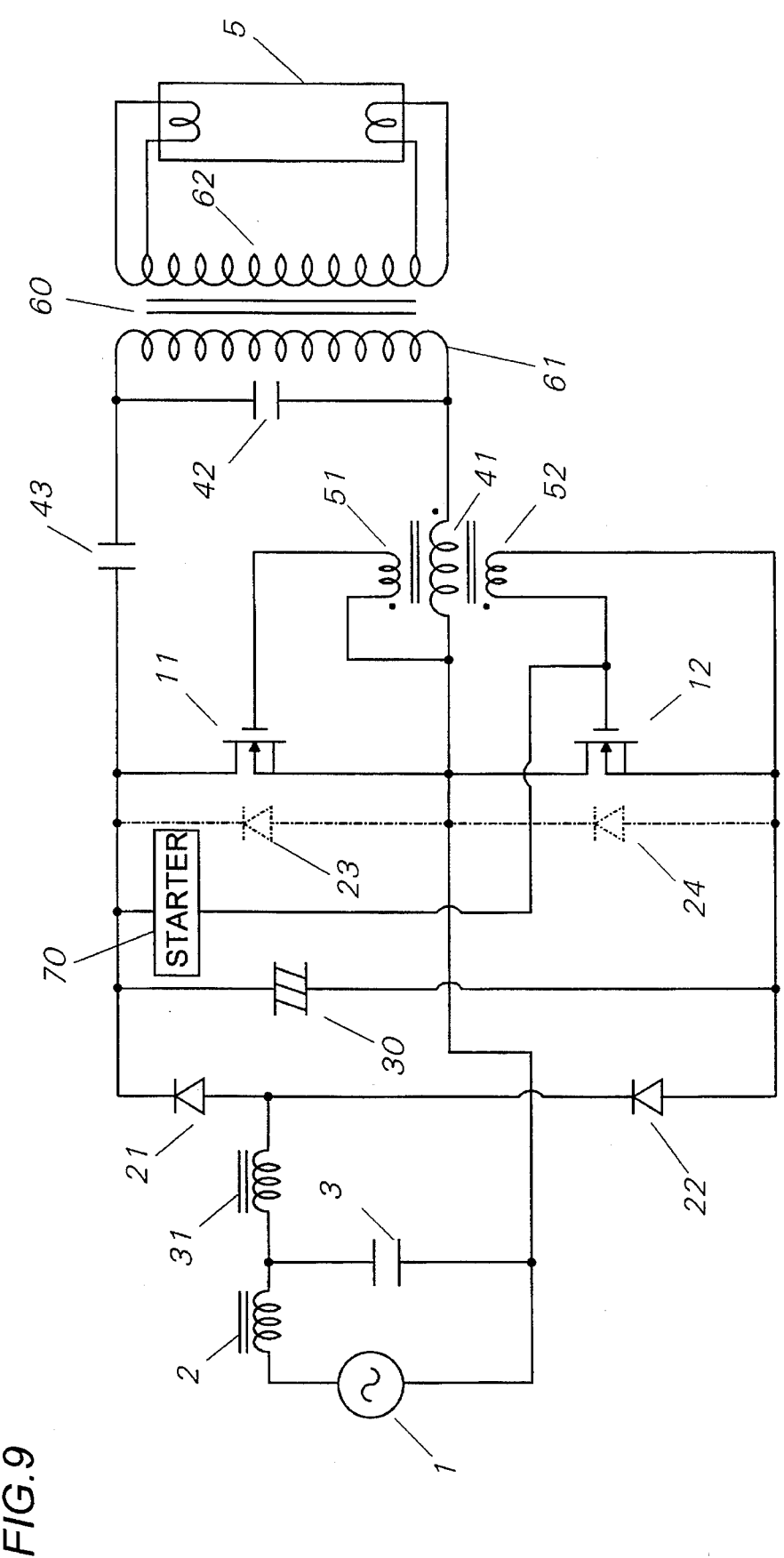
FIG. 9 is a circuit diagram of an inverter AC power supply in accordance with a modification of the first embodiment.

FIG. 9 illustrates a modification of the above embodiment in which MOSFETs are utilized as first and second transistors 11 and 12 by making the use of their parasitic diodes as defining third and fourth diodes 23 and 24.

Figure 10:
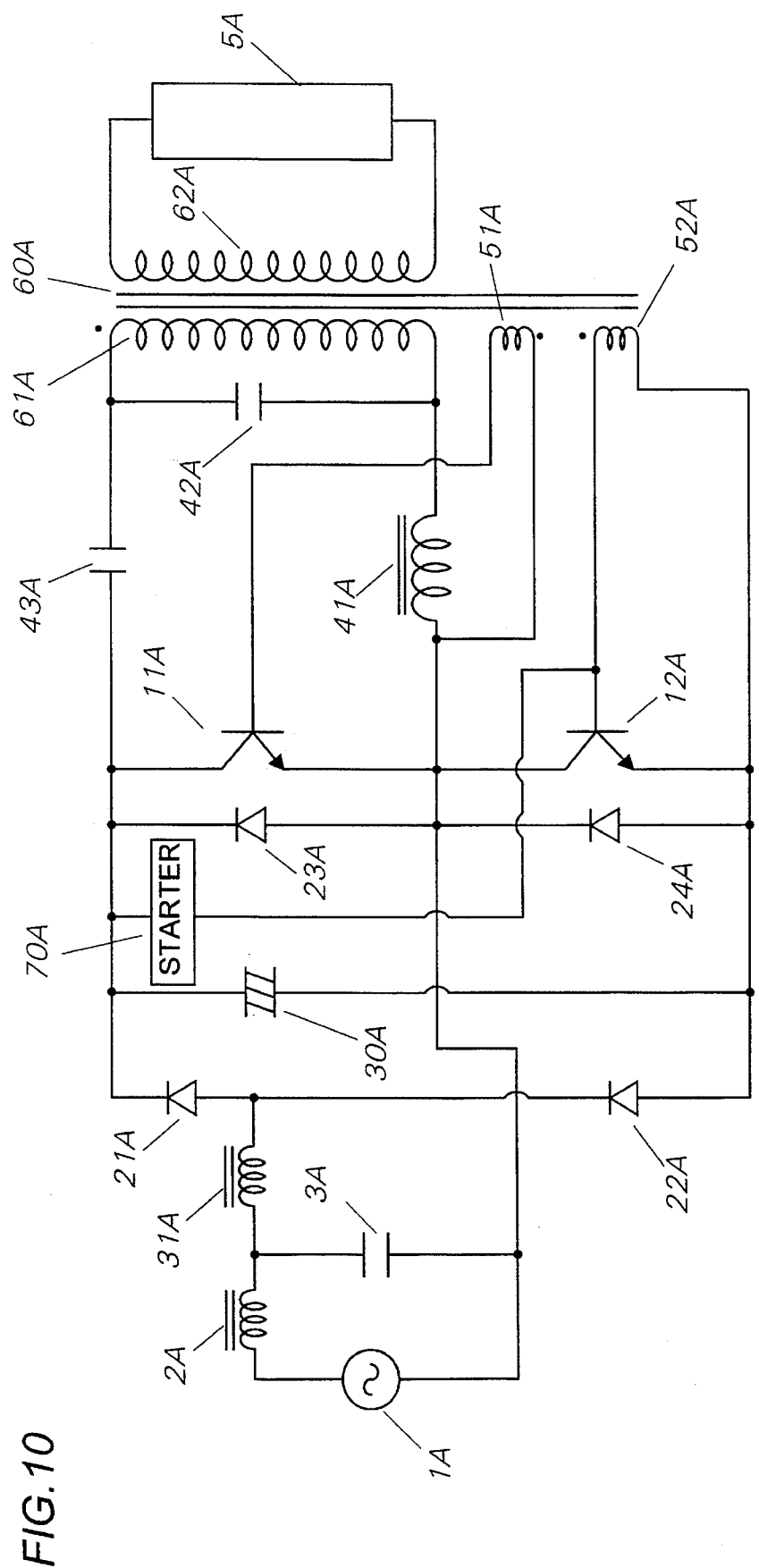
FIG. 10 is a circuit diagram of an inverter AC power supply in accordance with a 2nd embodiment of the present invention.

2nd Embodiment <FIG. 10>

FIG. 10 illustrates an inverter AC power supply in accordance with a 2nd embodiment of the present invention which is identical to the 1st embodiment except that first and second feedback windings 51A and 52A are magnetically coupled to the output transformer 60A instead of being coupled to resonance inductor 41A. First and second feedback windings 51A and 52A develop thereacross bias voltages in correspondence to the oscillating voltage appearing across primary winding 61A of output transformer 60A, the bias voltages being fed to the bases of first and second transistors 11A and 12A for self-excitation thereof in response to the inverter output. The other operations are identical to those in the 1st embodiment, therefore no further duplicated explanation is made herein. Like components are designated by like numerals with a suffix letter of "A" for an easy reference purpose. In this and the following embodiments and modifications, the starter of firstly turning on second switching transistor is simply indicated by a block, for example, with a reference number of "70A" or the like.

Figure 11:
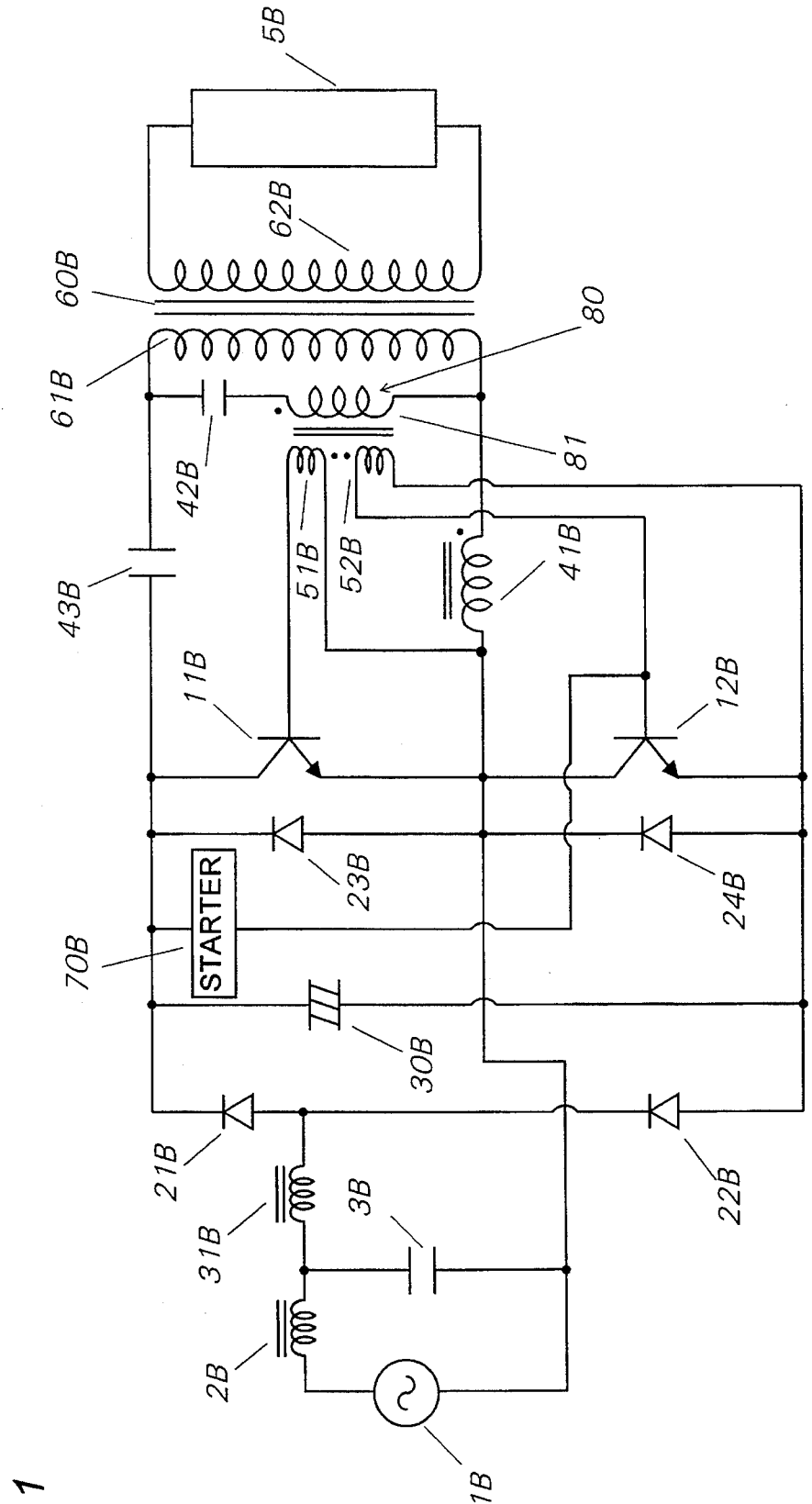
FIG. 11 is a circuit diagram of an inverter AC power supply in accordance with a 3rd embodiment of the present invention.

3rd Embodiment <FIG. 11>

FIG. 11 illustrates an inverter AC power supply in accordance with a 3rd embodiment of the present invention which is identical to the 1st embodiment except that the inverter includes a drive transformer 80 of current feedback type with a main winding 81 to which first and second feedback windings 51B and 52B are magnetically coupled. The main winding 81 is connected in series with resonance capacitor 42B across the primary winding 61B of output transformer 60B so as to induce bias voltages respectively across first and second feedback windings 51B and 52B for self-excitation of first and second transistors 11B and 12B in response to the oscillating voltage produced by the inverter. Like components are designated by like numerals with a suffix letter of "B" for an easy reference purpose. Drive transformer 80 may be of saturable or non-saturable type. When there occurs a failure on the side of load 5B to short-circuit the secondary winding 62B, the primary winding 61B is also short-circuited to give no current through the drive transformer 80 and therefore no bias voltages for transistors 11B and 12B, whereby immediately stop operating the inverter for protection of the circuit components thereof.

Figure 12:
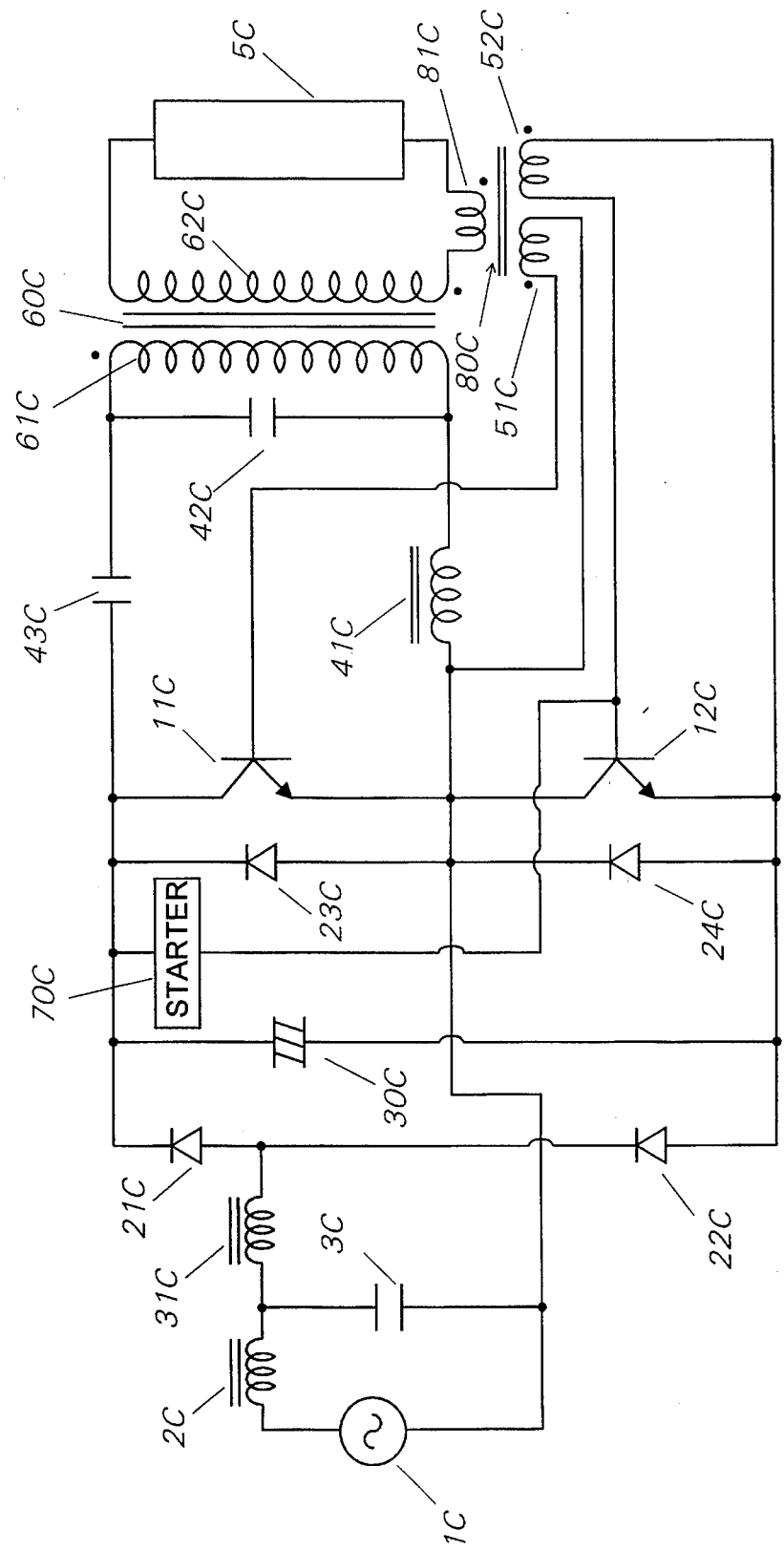
FIG. 12 is a circuit diagram of an inverter AC power supply in accordance with a 4th embodiment of the present invention.

4th Embodiment <FIG. 12>

FIG. 12 illustrates an inverter AC power supply in accordance with a 3rd embodiment of the present invention which is identical to the 1st embodiment except that the inverter includes a drive transformer 80C with a main winding 81C to which first and second feedback windings 51C and 52C are magnetically coupled. The main winding 81C is connected in series with the load or discharge lamp 5C across the secondary winding 62C of output transformer 60C so as to induce bias voltages respectively across first and second feedback windings 51C and 52C for self-excitation of first and second transistors 11C and 12C in response to the oscillating voltage produced by the inverter. Like components are designated by like numerals with a suffix letter of "C" for an easy reference purpose. This embodiment contemplates to stop operating the inverter as soon as the load 5C is disconnected. That is, in response to the disconnection of load 5C the drive transformer 80C is disconnected to output transformer 60C to produce no bias voltages at feedback windings 51C and 52C, thereby turning off transistors 11C and 12C and consequently ceasing the inverter operation for protection of inverter.

Figure 13:
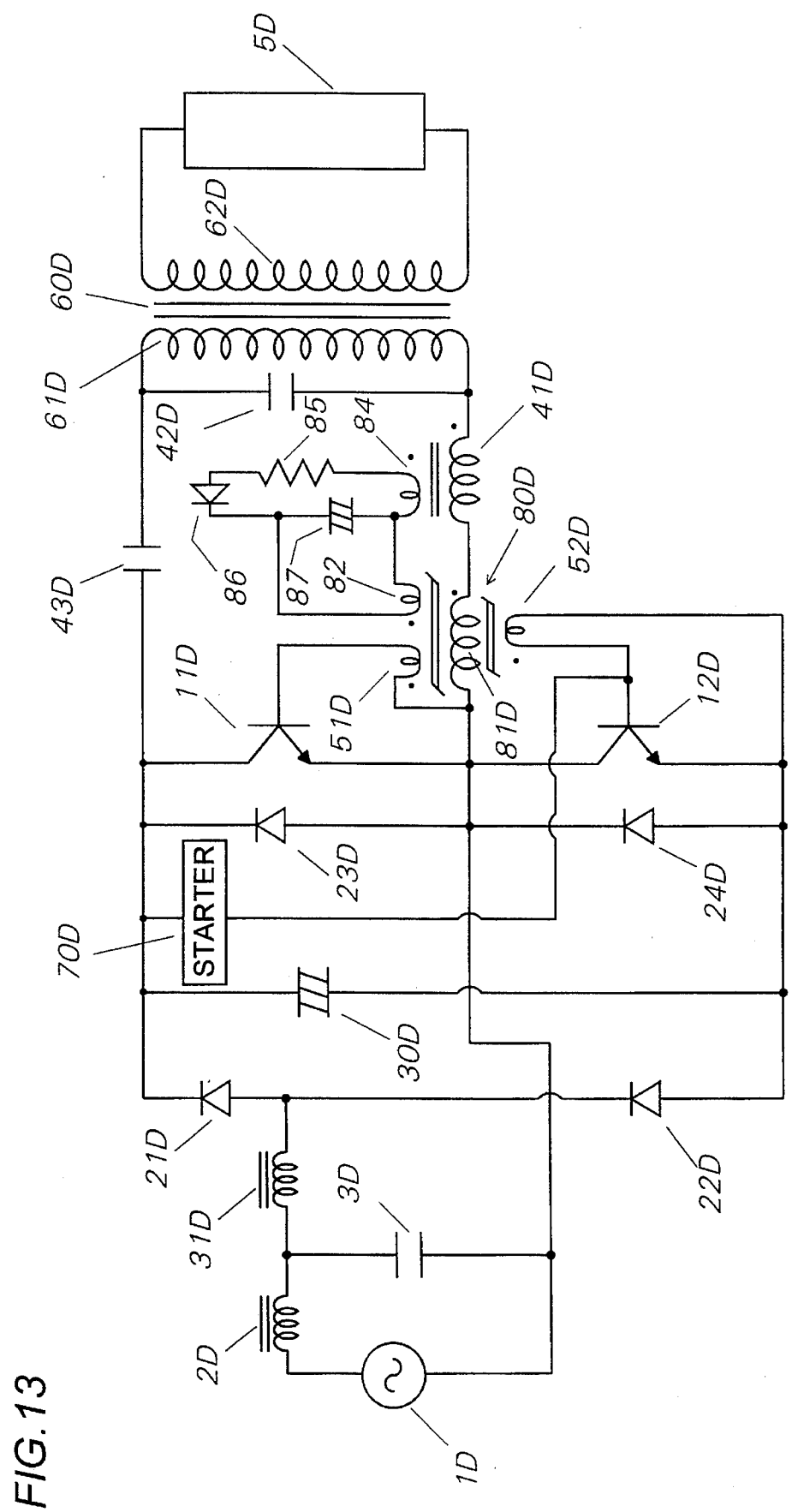
FIG. 13 is a circuit diagram of an inverter AC power supply in accordance with a 5th embodiment of the present invention.

5th Embodiment <FIG. 13>

FIG. 13 illustrates an inverter AC power supply in accordance with a 4th embodiment of the present invention which is basically identical in configuration and operations to the 1st embodiment except that the inverter includes a drive transformer 80D with a main winding 81D to which first and second feedback windings 51D and 52D are magnetically coupled. The main winding 81D is connected in series with resonant inductor 41D across first transistor 11D so as to induce bias voltages respectively across first and second feedback windings 51D and 52D for self-excitation of first and second transistors 11D and 12D in response to the oscillating voltage produced by the inverter. Like components are designated by like numerals with a suffix letter of "D" for an easy reference purpose. The drive transformer 80D is of a saturable type and includes a signal winding 82 for magnetizing the drive transformer 80D. A sensor inductor 84 is coupled to resonance inductor 41D to sense a voltage indicative of the oscillating voltage that the inverter produces. Thus sensed voltage is rectified through resistor 85, diode 86 to give a check voltage to a capacitor 87 across which the signal winding 82 is connected.

When the inverter current increases as a consequence of that the discharge lamp 5D is accidentally disconnected or deteriorated to its end of lamp life to show no load or less load condition, the sensor winding 84 induces a correspondingly increased voltage. The increased voltage is then applied to signal winding 82 to magnetize saturable drive transformer 80D in the direction of lowering the bias voltages developed respectively at first and second windings 51D and 52D, thereby disabling transistors 11D and 12D or limiting the switching operation thereof. In this manner, transistors 11D and 12D can be protected from excessive current even under the above abnormal condition.

Figure 14:
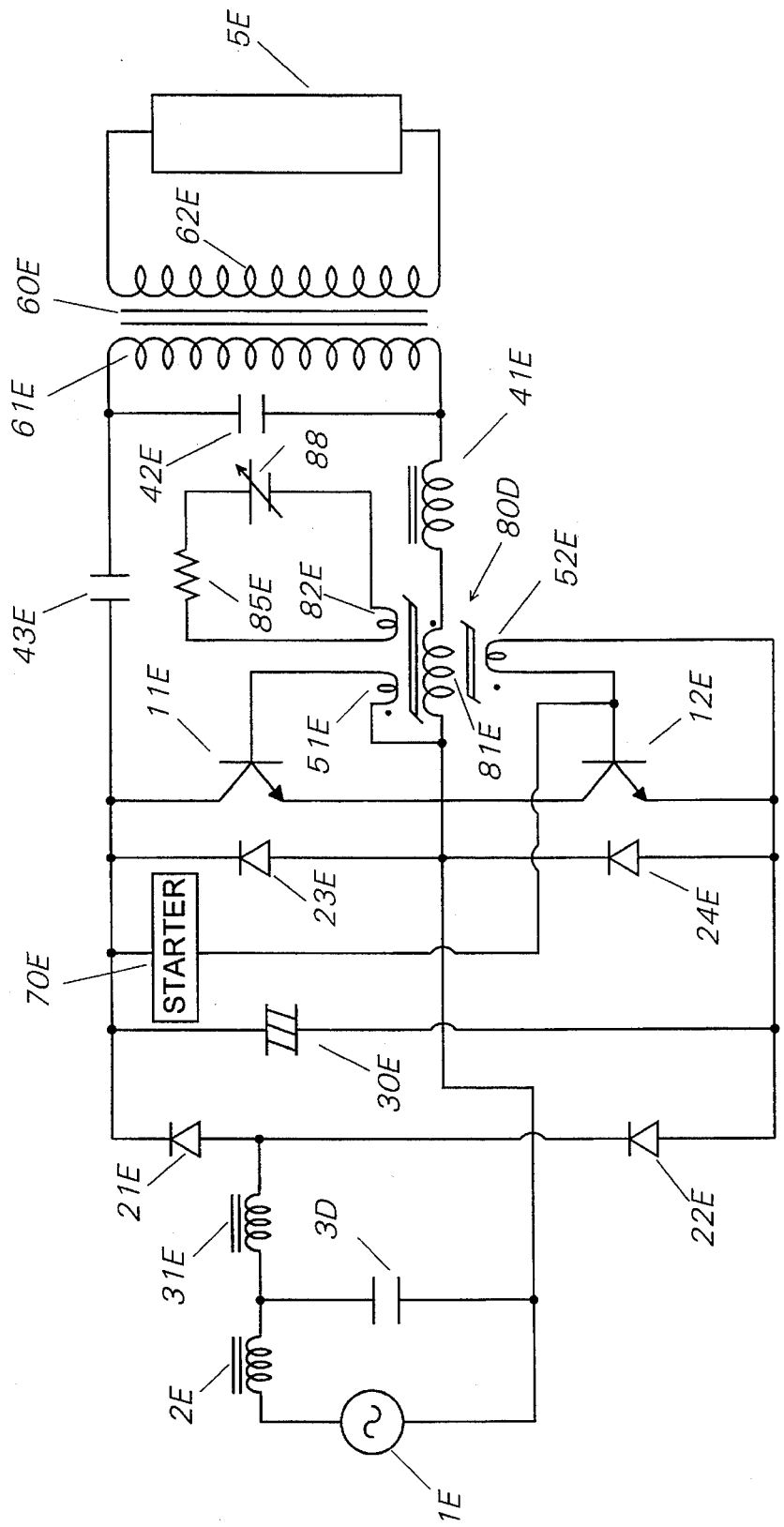
FIG. 14 is a circuit diagram of an inverter AC power supply in accordance with a 6th embodiment of the present invention.

6th Embodiment <FIG. 14>

FIG. 14 illustrates a 6th embodiment of the present invention which is similar in structure and operation to the 5th embodiment except that signal winding 82E gives a variable voltage that an user selects. Signal winding 82E is connected through resistor 85E to a variable voltage 88 to apply the variable voltage to adjust the bias voltage developed at first and second feedback windings 51E and 52E in the direction of shortening the turn-on period of first and second transistors 11E and 12E for dimming the discharge lamp 5E. Like components are designated like numerals with a suffix letter of "E" for an easy reference purpose.

Figure 15:
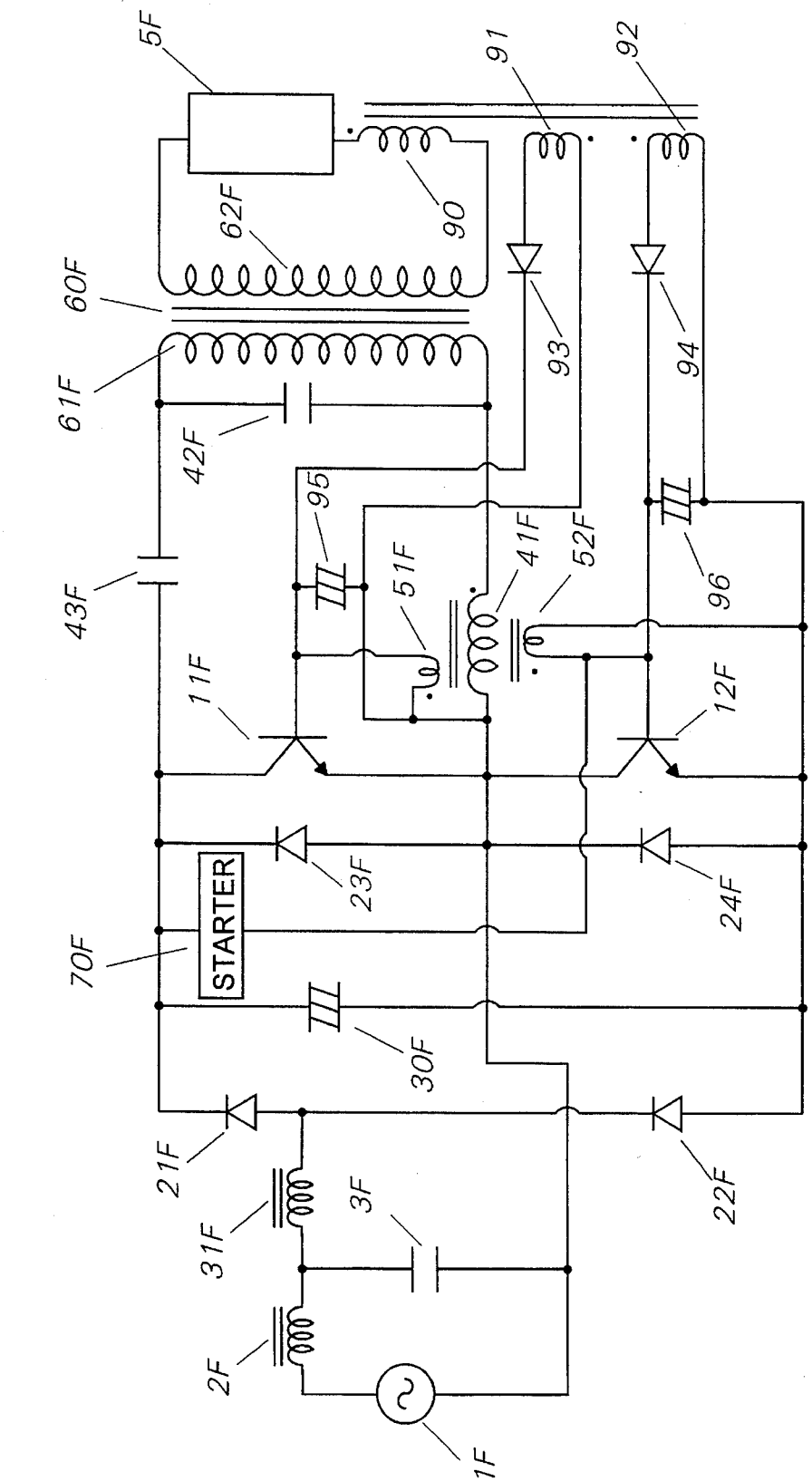
FIG. 15 is a circuit diagram of an inverter AC power supply in accordance with a 7th embodiment of the present invention.

7th Embodiment <FIG. 15>

FIG. 15 illustrates a 7th embodiment of the present invention which is similar in structure and operation to the 1st embodiment except for a provision of an offset circuit which provides and adds an offset voltage to the bias voltages developed respectively at first and second feedback windings 51F and 52F. Like components are designated by like numerals with a suffix letter of "F". The offset circuit comprises a transformer with a current sensing winding 90, first and second sensor windings 91 and 92. The current sensing winding 90 is connected in series with discharge lamp 5F across secondary winding 62F of output transformer 60F so as to develop at each of first and second sensor windings 91 and 92 a corresponding voltage indicative of a load current being supplied to discharge lamp 5F from the inverter. The resulting voltage is rectified by means of diodes 93 and 94 and capacitors 95 and 96 to give the offset voltage which is added to the bias voltages from first and second feedback windings 51F and 52F to keep operating to turn on and off first and second transistors 11F and 12F. In this embodiment, transistors 11F and 12F are caused to turn on by the sum of the bias voltage and the offset voltage and not to operate by the bias voltage alone. Accordingly, if discharge lamp 5F be disconnected to give no load current through current sensor windings 90 and no offset voltage, transistors 11F and 12F responds to cease operating for protection of the inverter.

Figure 16:
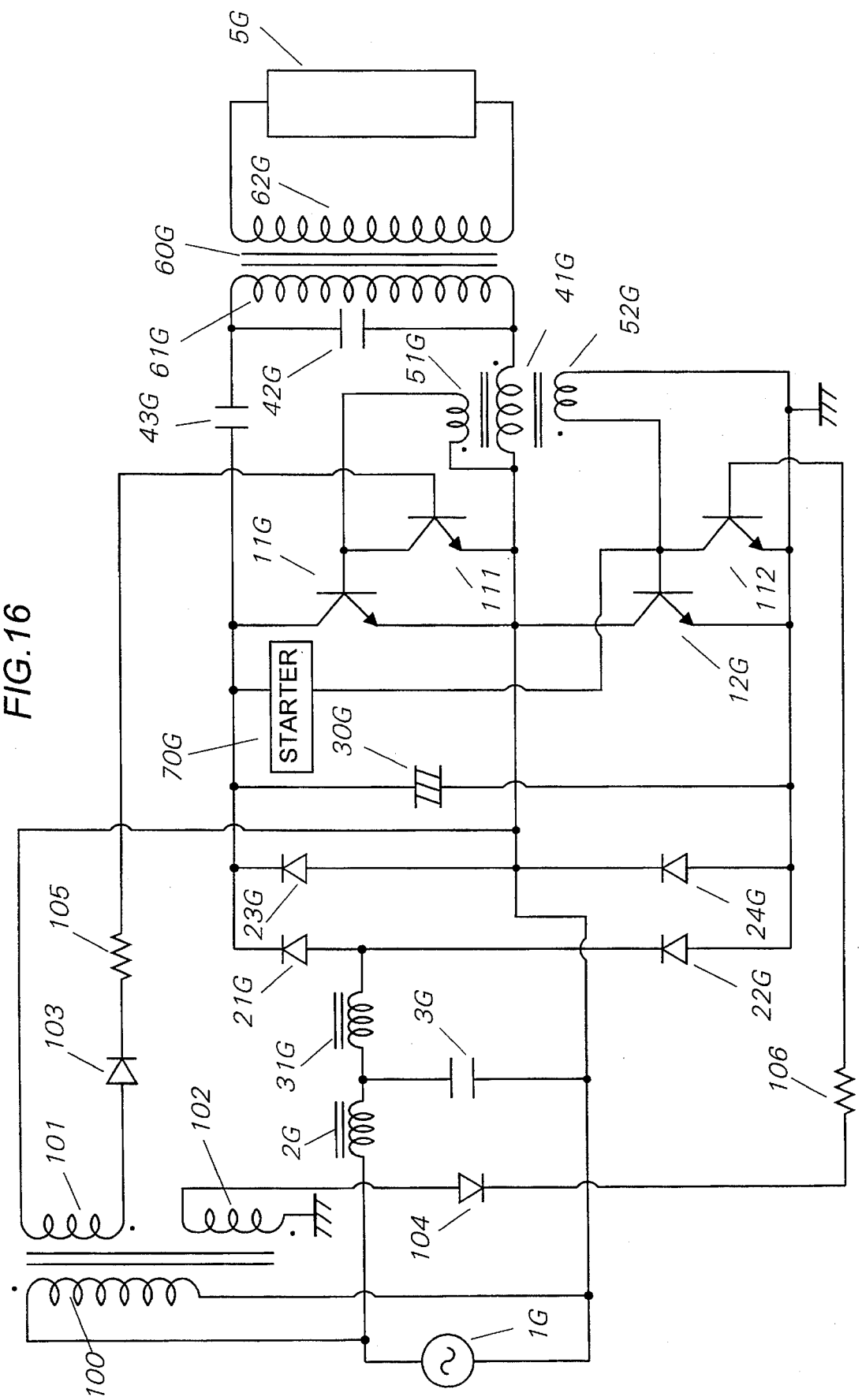
FIG. 16 is a circuit diagram of an inverter AC power supply in accordance with an 8th embodiment of the present invention.

8th Embodiment <FIG. 16>

FIG. 16 illustrates an 8th embodiment of the present invention which is similar in structure and operation to the 1st embodiment except for a provision of an input voltage monitor for monitoring the input AC voltage and a regulator for varying the frequency of the inverter output in correspondence with the input AC voltage. Like components are designated by like numerals with a suffix letter of "G". The input voltage monitor comprises a transformer with a main winding 100 connected across AC voltage source 1G and with first and second sensor windings 101 and 102 which develop voltages corresponding to the instantaneous input AC voltage. The regulator comprises a pair of first and second amplifier transistors 111 and 112 each connected across base-emitter path of each one of first and second switching transistors 11G and 12G. First and second sensor windings 101 and 102 are each connected to the base of the corresponding one of first and second switching transistors 11G and 12G through diodes 103,104 and resistors 105,106 to give a half-rectified and limited current thereto in order to effect varying amplification at first and second transistors 111 and 112 in accordance with the instantaneous input AC voltage.

In operation, during the positive half cycle of the input AC voltage to have a polarity as illustrated in FIG. 16 where first switching transistor 11G is responsible only for the inverter operation while second switching transistor 12G is for both the inverter and chopper operations, first sensor winding 101 provides an increasing voltage to the base of first amplifier transistor 111 as the input AC voltage increases to its peak, while second sensor winding 102 provides no voltage to the base of second transistor 112. Thus, first transistor 111 acts to draw by a greater extent the base current being fed to the base of first switching transistors 11G from first feedback winding 51G, thereby shortening the turn-on period of switching transistor 11G. During the negative half cycle of the AC voltage source where second switching transistor 12G is responsible only for the inverter operation while first switching transistor 11G is for both the inverter and chopper operations, second sensor winding 102 provides an increasing voltage to the base of second amplifier transistor 112 as the input AC voltage increases to its peak, while first sensor winding 101 provides no voltage to the base of first transistor 111. Therefore, second transistor 112 acts to draw by a greater extent the base current being fed to the base of second switching transistors 12G from second feedback winding 52G, thereby shortening the turn-on period of switching transistor 12G. In this manner, one of the switching transistors currently responsible for only the inverter operation is controlled to shorten and extend the turn-on period as the input AC voltage increases to its peak and decreases to zero level, respectively, thereby varying the frequency of the inverter output in a direction of limiting and raising the inverter output and increasing as the input AC voltage increases to its peak and decreases towards its bottom, respectively. More particularly, when the input AC voltage is around its bottom, the inverter frequency is controlled to be lowered towards the resonant frequency of the L-C circuit to raise the output voltage. On the other hand, when the input AC voltage is around its peak, the inverter frequency is controlled to be raised away from the resonant frequency to limit the output voltage. With this result, it is readily possible to provide a consistent and well-balanced inverter output while reducing ripples which would appear to a greater extent when the input AC voltage is around its peak than around its bottom.

Figure 17:
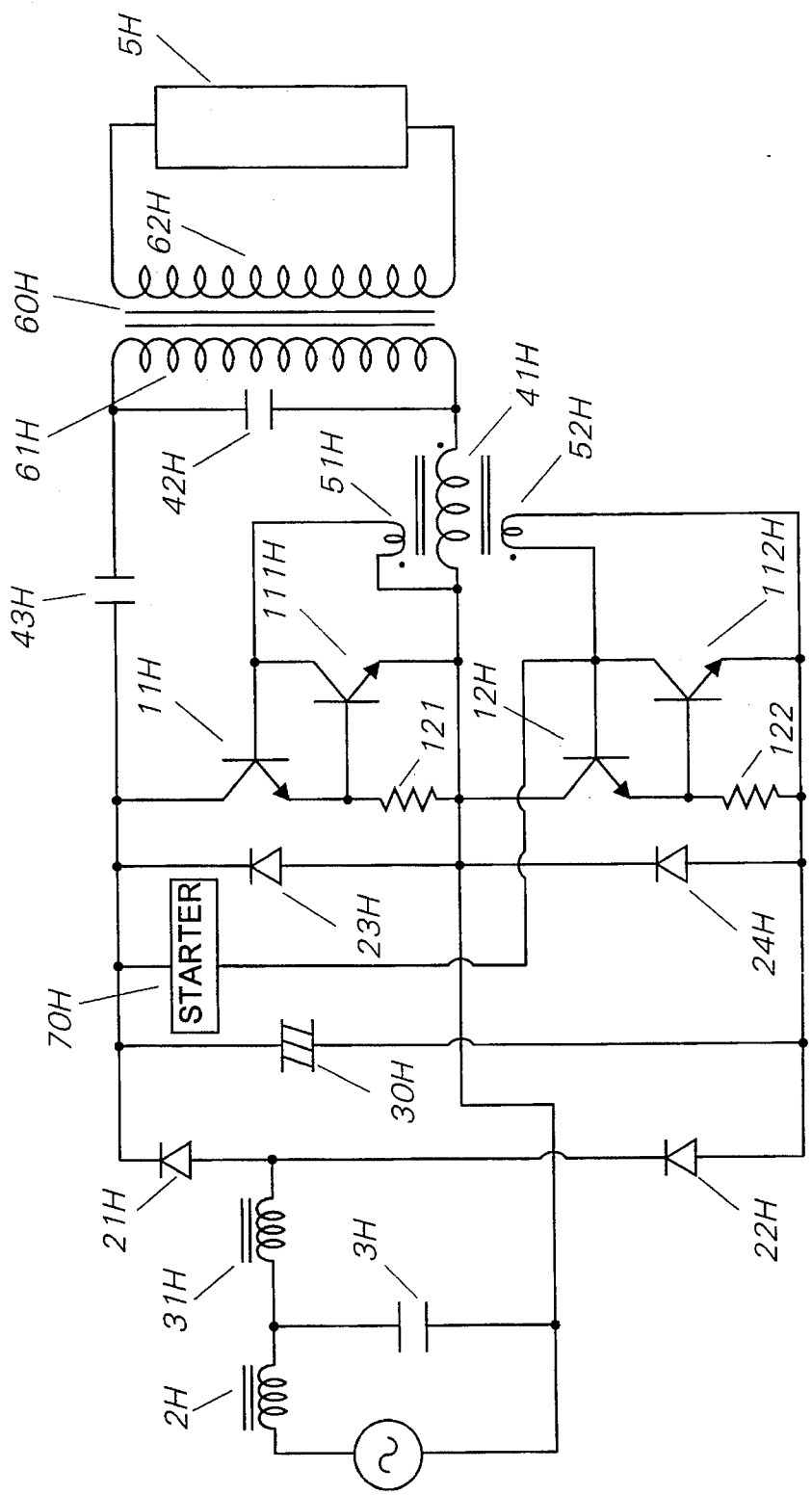
FIG. 17 is a circuit diagram of an inverter AC power supply in accordance with a 9th embodiment of the present invention.

9th Embodiment <FIG. 17>

FIG. 17 illustrates an inverter AC power supply in accordance with a 9th embodiment of the present invention which is basically identical in configuration and operations to the 1st embodiment except that the inverter includes first and second current sensing resistors 121 and 122 inserted respectively in series with first and second switching transistors 11H and 12H for sensing inverter current flowing therethrough in order to limit the inverter output upon occurrence of substantially no load condition due to the disconnection of discharge lamp 5H or deterioration thereof. Like components are designated by like numerals with a suffix letter of "H" for an easy reference purpose. First and second transistors 111H and 112H are each inserted in base-emitter path of each corresponding one of first and second switching transistors 11H and 12H with base of each of transistors 111H and 112H connected to emitter of each corresponding one of switching transistor 11H and 12H.

In operation, when the inverter current increases unduly in response to substantially no load condition, first and second transistors 111H and 112H become conductive in order to draw the bias current being fed to first and second switching transistors 11H and 12H respectively from feedback windings 51H and 52H, thereby shortening the turn-on period of switching transistors or disabling them to limit the inverter output. It is noted in this connection that dimming of discharge lamp 5H can be made by suitable controlling resistance of first and second current sensing resistors 121 and 122.

Figure 18:
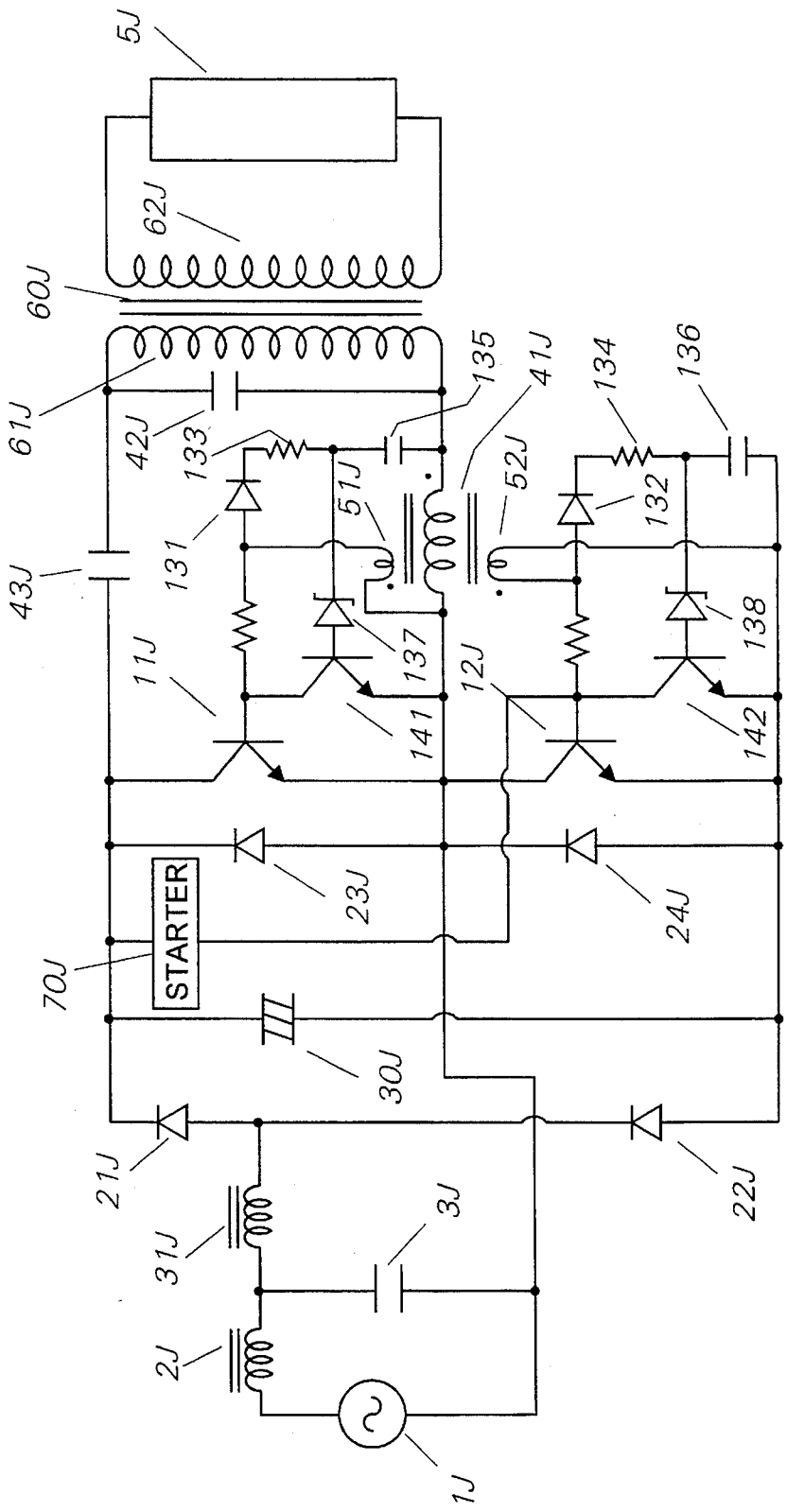
FIG. 18 is a circuit diagram of an inverter AC power supply in accordance with a 10th embodiment of the present invention.

10th Embodiment <FIG. 18>

FIG. 18 illustrates an inverter AC power supply in accordance with a 10th embodiment of the present invention which is basically identical in configuration and operations to the 1st embodiment except for provision of first and second voltage monitors which monitor bias voltage developed respectively at first and second feedback windings 51J and 52J in order to regulate the turn-on period of first and second switching transistors 11J and 12J in accordance with thus monitored voltages. Like components are designated by like numerals with a suffix letter of "J" for an easy reference purpose. First and second voltage monitors are each composed of a diode 131,132, resistor 133,134, and capacitors 135,136 which are connected in series across each one of first and second feedback windings 51J and 52J so as to give to capacitors 135,136 voltages indicative of the bias voltage fed to first and second switching transistors 11J and 12J. Also included in the inverter is a pair of first and second shunting transistors 141 and 142 which are each inserted in base-emitter path of each corresponding one of first and second switching transistors 11J and 12J with base of each of transistors 141 and 142 connected through zener diode 137,138 to receive the voltage from corresponding one of capacitors 135,136.

In operation, when the inverter current increases unduly due to an abnormal load condition to induce high voltage at resonance inductor 41J, first and second feed back windings 51J and 52J respond to charge capacitors 135,136 up to a level beyond a predetermined level. Upon this occurrence, zener diode 137,138 is made conductive to turn on the corresponding one of transistors 141 and 142 to thereby shunt the base-emitter path of corresponding one of first and second switching transistors 11J and 12J for turning it off, thus reducing the turn-on period of first and second transistors 11J and 12J and therefore limiting the inverter output.

Figure 19:
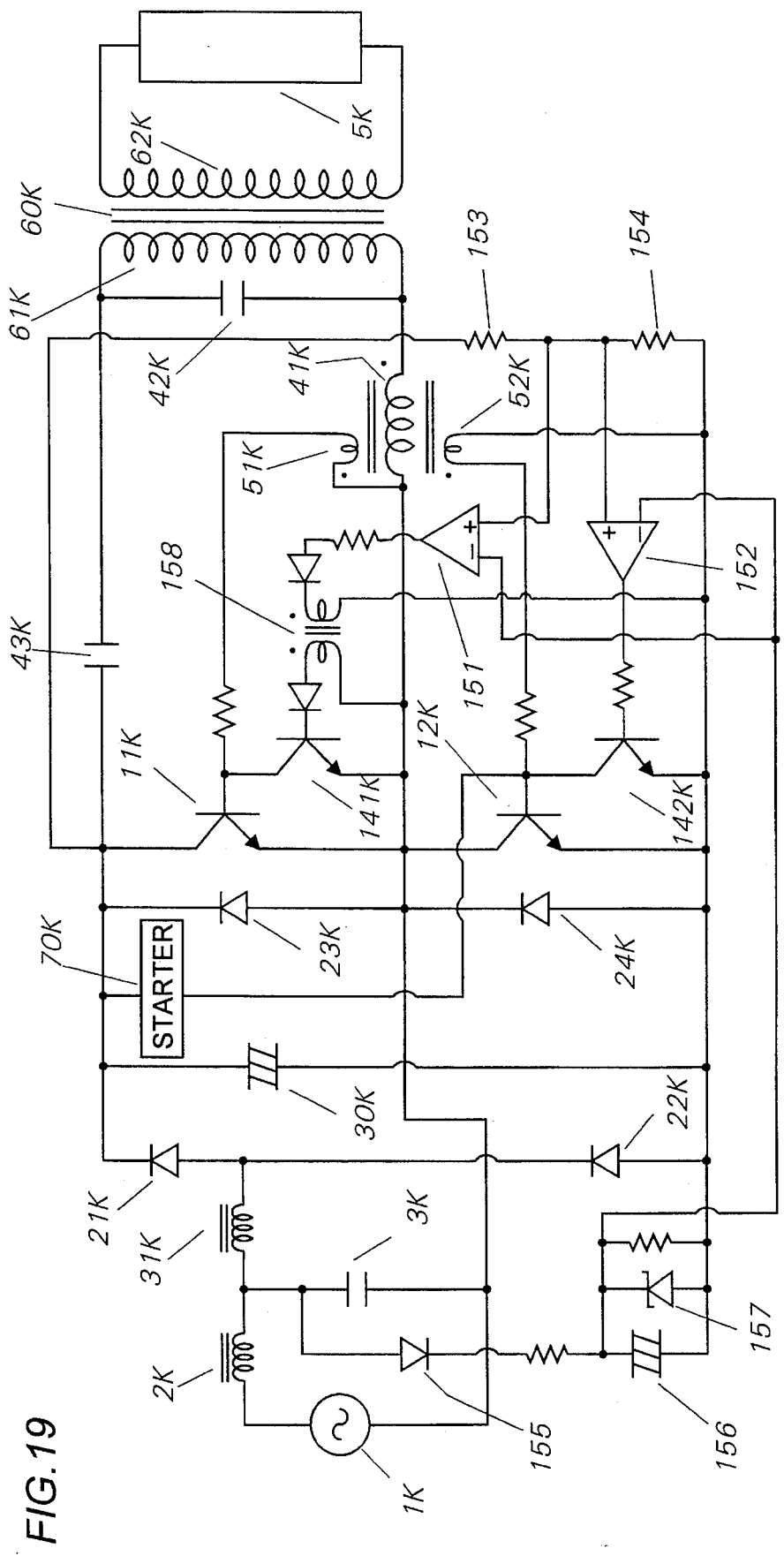
FIG. 19 is a circuit diagram of an inverter AC power supply in accordance with an 11th embodiment of the present invention.

11th Embodiment <FIG. 19>

FIG. 19 illustrates an inverter AC power supply in accordance with a 11th embodiment of the present invention which is basically identical in configuration and operations to the 1st embodiment except for provision of voltage detector which detects a voltage of smoothing capacitor 30K for limiting the inverter output based upon the detected voltage indicative of an input DC voltage to the inverter from the chopper. Like components are designated by like numerals with a suffix letter of "K" for an easy reference purpose. The voltage detector comprises a divider of resistors 153 and 154 connected in series across smoothing capacitor 30K to give a divided voltage to non-inverted terminals of first and second comparators 151 and 152. Applied to inverted terminals of first and second comparators 151 and 152 is a fixed reference voltage which is derived from the AC voltage source 1K through a circuit of diode 155, capacitor 156, and zener diode 157. Also included in the inverter is a pair of first and second shunting transistors 141K and 142K which are each inserted in base-emitter path of each corresponding one of first and second switching transistors 11K and 12K with base of each of transistors 141K and 142K connected to output ends of first and second comparators 151 and 152.

When the divided voltage exceeds the reference voltage as a consequence of smoothing capacitor 30K provides an unduly high voltage due to an abnormal condition, first and second comparators 151 and 152 respond to give high level output to turn on first and second shunting transistors 141K and 142K, thereby limiting the inverter output. The output end of first comparator 151 is coupled through a coupling transformer 158 to the base of first switching transistor 11K.

Figure 20:
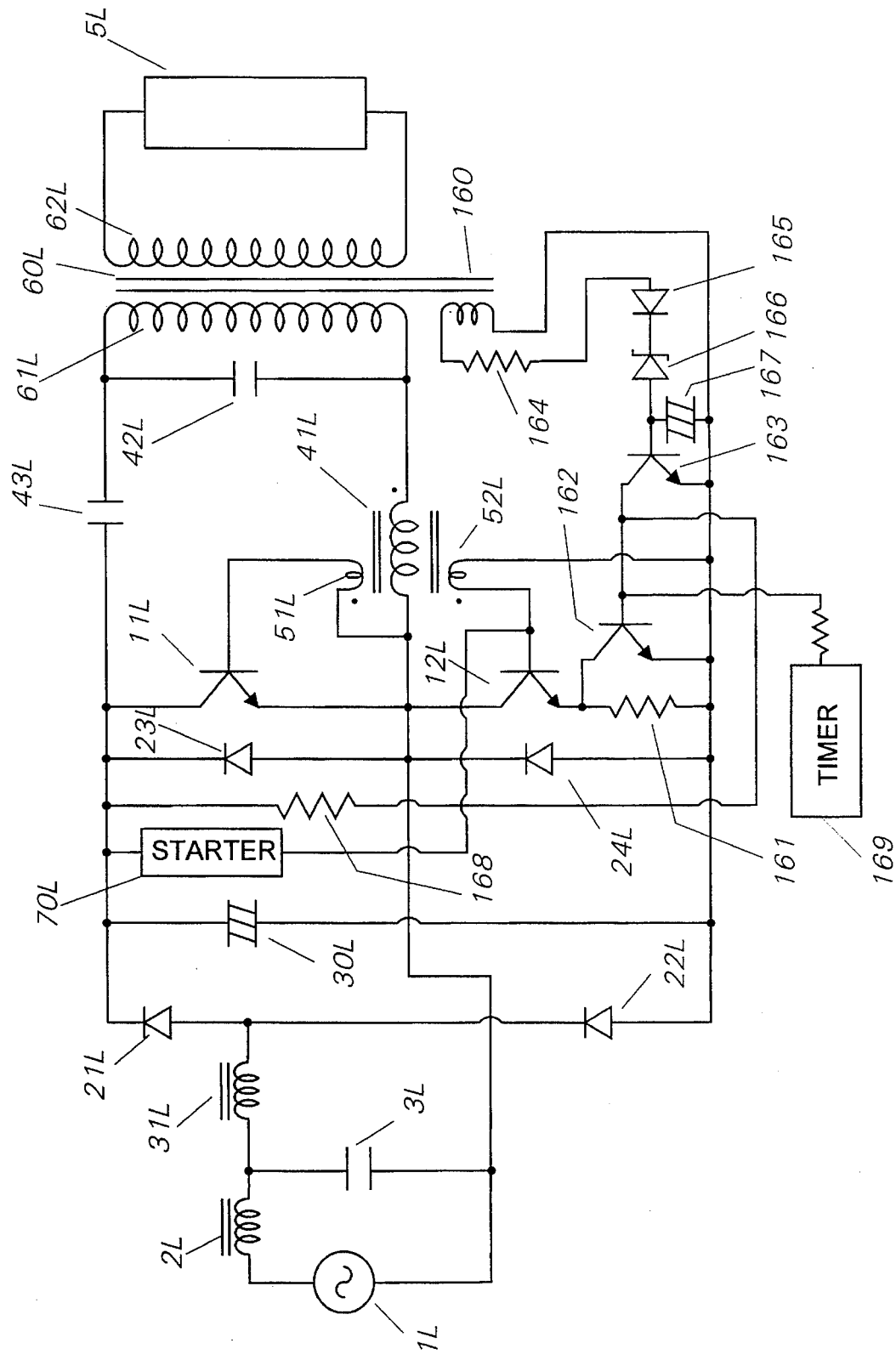
FIG. 20 is a circuit diagram of an inverter AC power supply in accordance with a 12th embodiment of the present invention.

12th Embodiment <FIG. 20>

FIG. 20 illustrates an inverter AC power supply in accordance with a 12th embodiment of the present invention which is basically identical in configuration and operations to the 1st embodiment except for provision of an output voltage monitor which monitors the inverter output for limiting the inverter operation upon occurrence of an abnormal load condition. Like components are designated by like numerals with a suffix letter of "L" for an easy reference purpose. The voltage monitor comprises a sensor winding 160 coupled to output transformer 60L to give a voltage indicative of the inverter output applied to the discharge lamp 5L. The inverter includes a current limiting resistor 161 which is inserted in series to the emitter of second switching transistor 12L and includes a shunting transistor 162 connected across the current limiting resistor 161. A bypass transistor 163 is inserted in a base-emitter path of shunting transistor 162 with base of bypass transistor 163 being connected to receive the voltage from sensor winding 160 through resistor 164, diode 165, zener diode 166, and capacitor 167. Shunting transistor 162 has its base connected thorough resistor 168 to receive an operating voltage from smoothing capacitor 30L such that shunting transistor 162 is kept conductive to shunt current limiting resistor 161 under normal operating condition.

When the inverter output abnormally increases beyond a predetermined level, sensor winding 160 provides a corresponding voltage which cause zener diode 166 to become conductive to turn on bypass transistor 163. Upon this occurrence, a current through resistor 168 is drawn through bypass transistor 163 to thereby turn off shunting transistor 161. Consequently, the inverter current flows through current limiting resistor 161 to be thereby reduced to a level insufficient to maintain self-excitation of the inverter, thus ceasing the inverter operation. A timer 169 is provided to give a starting voltage to the base of shunting transistor 162 for a predetermined time period after energization of the power supply to enable the starting thereof.

Figure 21:
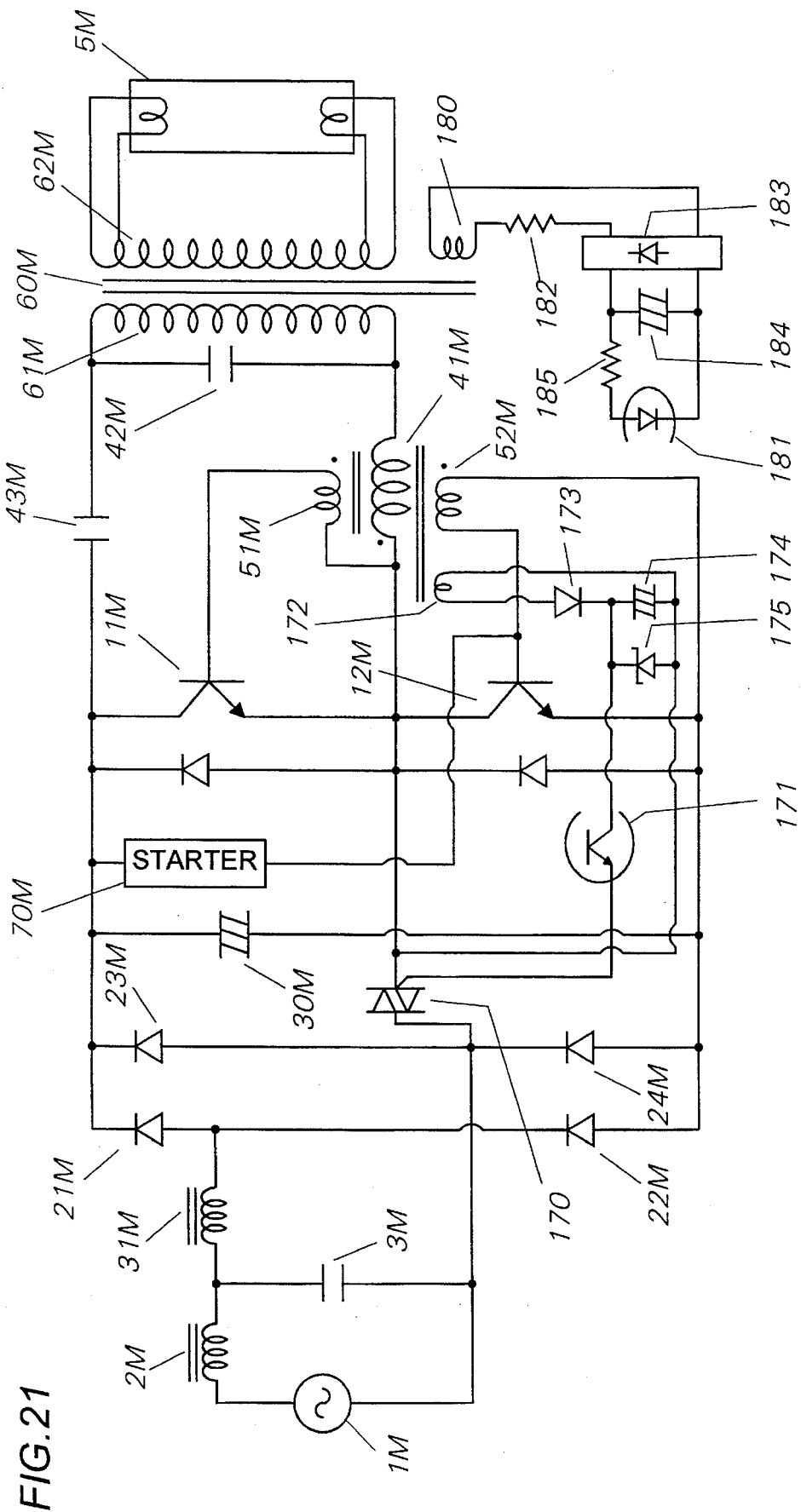
FIG. 21 is a circuit diagram of an inverter AC power supply in accordance with a 13th embodiment of the present invention.

13th Embodiment <FIG. 21>

FIG. 21 illustrates an inverter AC power supply in accordance with a 13th embodiment of the present invention which is basically identical in configuration and operations to the 1st embodiment except for inclusion of a preheating circuit for providing a preheating current to filaments 6 of discharge lamp 5M for a limited time period prior to activating the chopper to provide a full DC voltage to the inverter. Like components are designated by like numerals with a suffix letter of "M" for an easy reference purpose. The preheating circuit comprises a triac 170 inserted in a path from a connection between third and fourth diodes 23M and 24M to a connection between first and second switching transistors 11M and 12M. The gate of triac 170 is connected through a phototransistor 171 to a trigger voltage circuit composed of winding 172, diode 173, capacitor 174, and zener diode 175. The winding 172 is magnetically coupled to resonance inductor 41M to provide a triggering voltage to the gate of triac 170 through phototransistor 171 which is coupled to a photodiode 181. The preheating circuit further includes a winding 180 which is coupled to output transformer 60M and connected through resistor 182 and rectifier 183 to give a DC voltage to a capacitor 184. Photodiode 181 is connected in series with a resistor 185 across capacitor 183 so as to be made conductive to emit a light after an elapse of time determined by a time constant of capacitor 184 and resistor 185 from the start of the inverter, or of receiving the voltage through output transformer 60M. Upon receiving the light from photodiode 181, phototransistor 171 responds to turn on which in turn gives a trigger voltage to turn on triac 170.

In operation, the power supply starts with triac 170 turned off to effect charging smoothing capacitor 30M without the chopper operation. Thus, the inverter operates on a low DC voltage, i.e., $\sqrt{2}$ times the peak voltage of the input AC voltage so as to produce a limited inverter output for preheating the filaments 6 of discharge lamp 5M. Upon starting to preheat discharge lamp 5M, capacitor 184 begins being charged even by the limited inverter output so that photodiode 181 emits the light after the predetermined time period from the start of the inverter, thereby turning on phototransistor 171 and then triac 170 to terminate the preheating period. Then, the chopper is enabled to provide a step-up high voltage on which the inverter operates to produce a normal output for lighting the discharge lamp 5M.

Figure 22:
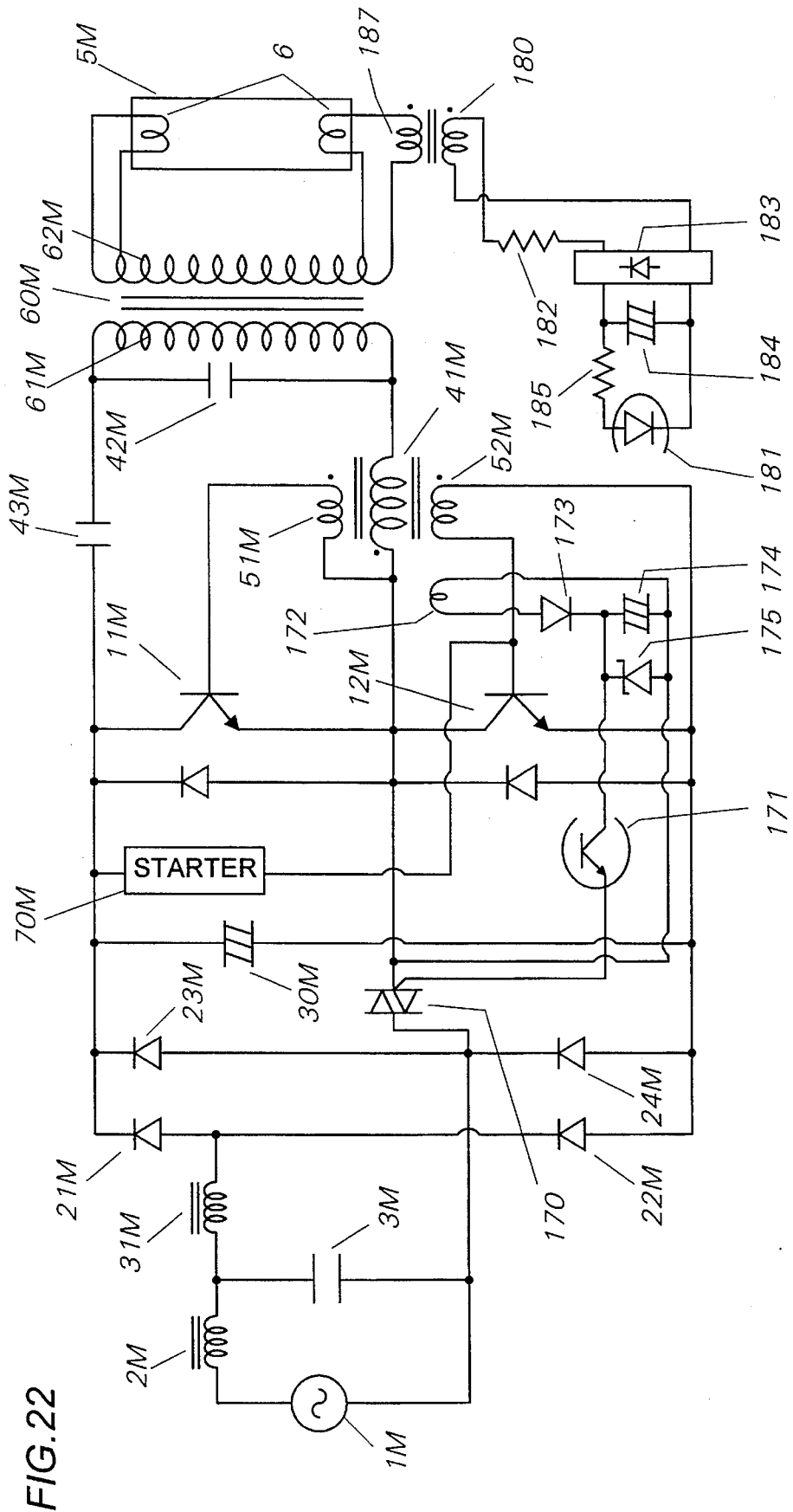
FIG. 22 is a circuit diagram of an inverter AC power supply in accordance with a modification of the embodiment of FIG. 21.

FIG. 22 illustrates a modification of the above 13th embodiment in which winding 180 is coupled to an additional transformer 187 connected to the filament 6 of discharge lamp 5M. With this transformer coupling, no voltage is fed to capacitor 184 when discharge lamp 5M is disconnected, to thereby keep triac turning off. Under this condition, therefore, the chopper is disabled and the inverter is only allowed to operate on the low voltage for protection of the inverter circuit.

Figure 23:
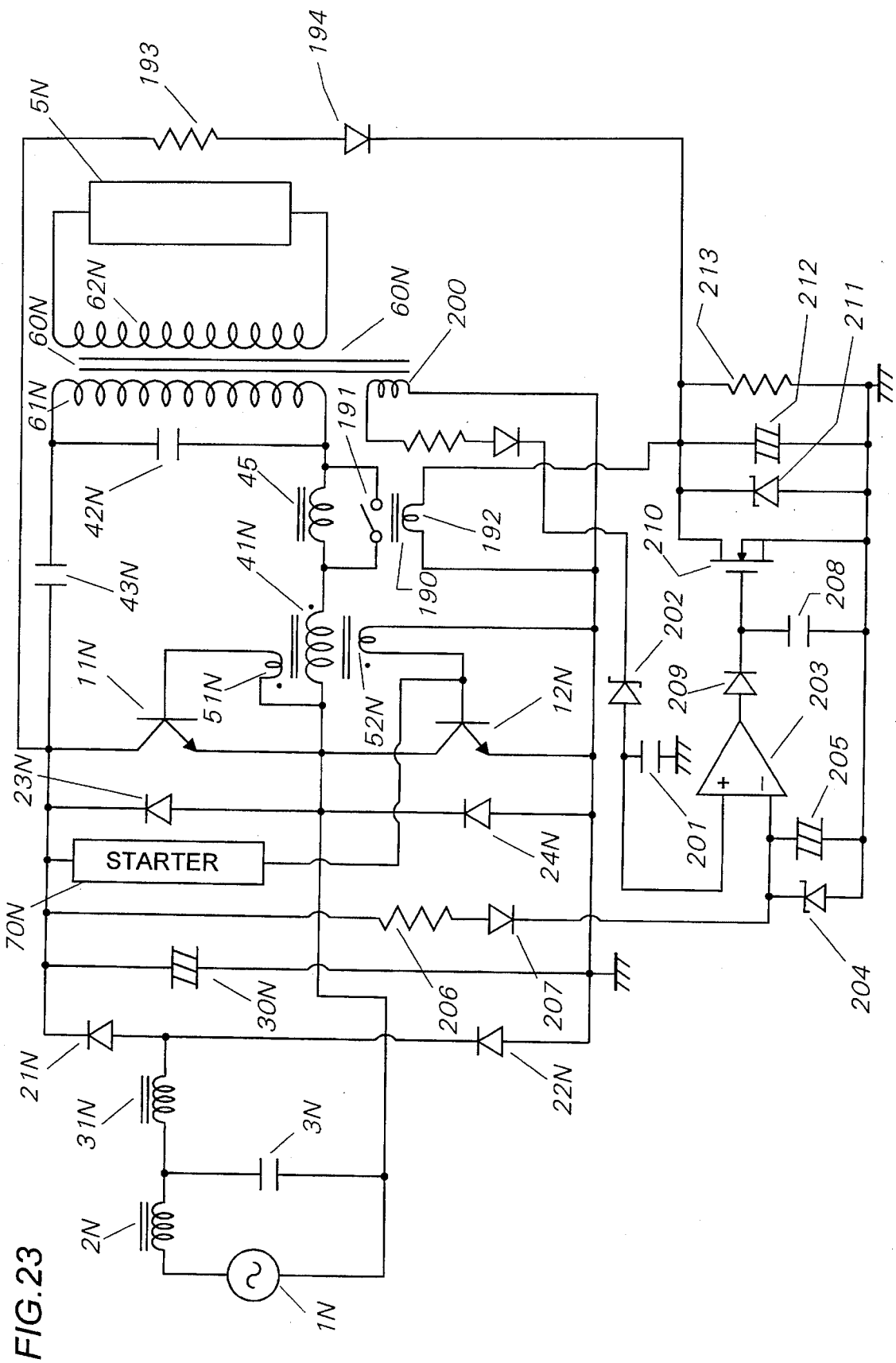
FIG. 23 is a circuit diagram of an inverter AC power supply in accordance with a 14th embodiment of the present invention.

14th Embodiment <FIG. 23>

FIG. 23 illustrates an inverter AC power supply in accordance with a 14th embodiment of the present invention which is basically identical in configuration and operations to the 1st embodiment except for inclusion of an additional resonance inductor 45 for adjusting the resonant frequency of the inverter to limit the inverter output under an abnormal load condition. Like components are designated by like numerals with a suffix letter of "N" for an easy reference purpose. The additional inductor 45 is connected in series with resonance inductor 41N and is bypassed by a switch contact 191 of a relay 190. Relay 190 has an excitation coil 192 which is connected to receive an excitation voltage which is obtained by a current flowing through a resistor 193 and a diode 194 from smoothing capacitor 30N and charged across a capacitor 212. Thus, relay is normally excited to close switch contact 191 for disconnecting additional resonance inductor 45 from resonance inductor 41N. Relay 190 is controlled by a regulator circuit to open switch contact 191 when the inverter produces an unduly high output voltage in response to the abnormal load condition, to make additional inductor 45 connected to existing inductor 41N, thereby giving added impedance to L-C resonant circuit and therefore lower the resonant frequency for limiting the inverter output. The regulator circuit includes a sensor winding 200 which is coupled to output transformer 60N to charge a capacitor 201 through a zener diode 202 to develop across capacitor 201 a voltage indicative of the inverter output. The resulting voltage is applied to a non-inverting input of a comparator 203 where it is compared with a reference voltage given to a inverting input of comparator 203 from a circuit of zener diode 204 and capacitor 205 connected to receive a necessary voltage from smoothing capacitor 30N through a resistor 206 and a diode 207. When voltage of capacitor 201 exceeds the reference voltage as a result of the inverter output increases unduly, comparator 203 responds to give a high level output to charge a capacitor 208 through a diode 209, and to turn on a MOSFET transistor 210 with capacitor 206 connected in source-gate path of MOSFET 210. MOSFET 210 is connected across a parallel combination of a zener diode 211, capacitor 212, and a resistor 213 which combination gives an excitation voltage to relay 190. Accordingly upon turning on of MOSFET 210 due to the abnormal load condition, the excitation current being fed through resistor 193 and diode 194 from smoothing capacitor 30N is bypassed to be drawn through MOSFET 210, thereby deenergizing relay 190 to open switch contact 191 and therefore limiting the inverter output in the manner as described above. This embodiment may be modified to achieve dimming of discharge lamp 5N by externally controlling MOSFET 210 or relay 190.

Figure 24:
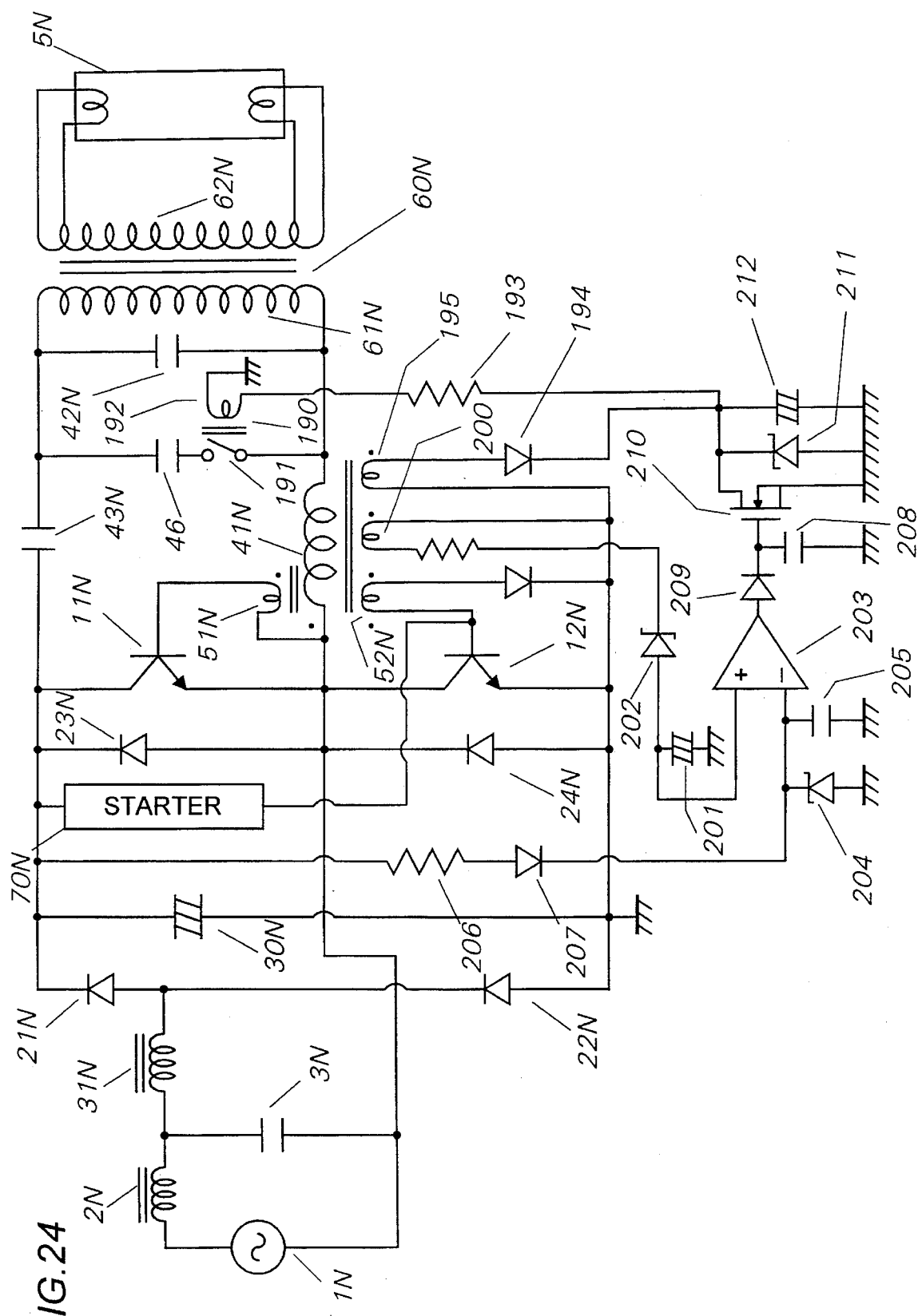
FIG. 24 is a circuit diagram of an inverter AC power supply in accordance with a 15th embodiment of the present invention.

15th Embodiment <FIG. 24>

FIG. 24 illustrates an inverter AC power supply in accordance with a 15th embodiment of the present invention which is basically identical in configuration and operations to the 14th embodiment except that an additional resonance capacitor 46 is provided instead of additional inductor for the same purpose of adjusting the resonant frequency of the inverter to limit the inverter output under an abnormal load condition. The additional capacitor 46 is connected in parallel with resonance capacitor 42N and is bypassed by a switch contact 191 of a relay 190. Relay 190 has an excitation coil 192 which is connected to receive an excitation voltage which is obtained from a winding 195 coupled to resonance inductor 41N and charged through diode 194 across capacitor 212. Thus, relay 190 is normally excited to close switch contact 191 for connecting additional capacitor 46 to resonance capacitor 42N to give resonance capacitance of parallel combination of capacitors 42N and 46. Relay 190 is controlled by a like regulator to open switch contact 191 when the inverter produces an unduly high output voltage in response to the abnormal load condition, to disconnect additional capacitor 46 from resonance capacitor 42N, thereby providing increased resonance capacitance to L-C resonant circuit and therefore lower the resonant frequency for limiting the inverter output. The regulator circuit includes a sensor winding 200 which is coupled to resonance inductor 41N to charge a capacitor 201 through a zener diode 202 to develop across capacitor 201 a voltage indicative of the inverter output. The resulting voltage is applied to a non-inverting input of comparator 203 where it is compared with a reference voltage given to a inverting input of comparator 203 from a circuit of zener diode 204 and capacitor 205 connected to receive a necessary voltage from smoothing capacitor 30N through a resistor 206 and a diode 207. When voltage of capacitor 201 exceeds the reference voltage as a result of the inverter output increases unduly, comparator 203 responds to give a high level output to charge capacitor 208 through diode 209, and to turn on a MOSFET transistor 210. MOSFET 210 is connected across a parallel combination of a zener diode 211 and capacitor 212 which combination gives an excitation voltage to relay 190. Accordingly upon turning on of MOSFET 210 due to the abnormal load condition, the excitation current being fed through resistor 193 and diode 194 from winding 195 is bypassed to be drawn through MOSFET 210, thereby deenergizing relay 190 to open switch contact 191 and therefore limiting the inverter output in the manner as described above. This embodiment may be also modified to achieve dimming of discharge lamp 5N by externally controlling MOSFET 210 or relay 190.

Figure 25:
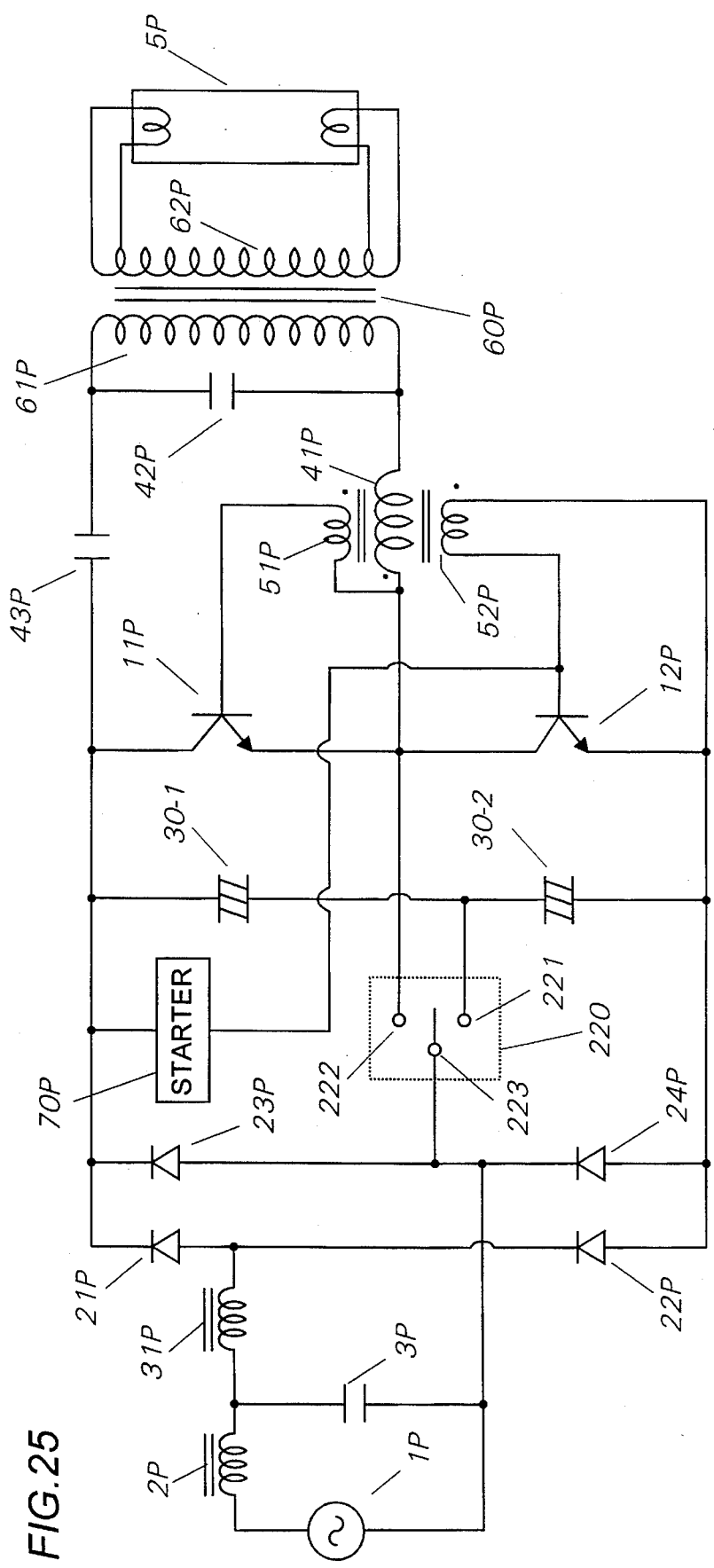
FIG. 25 is a circuit diagram of an inverter AC power supply in accordance with a 16th embodiment of the present invention.

16th Embodiment <FIG. 25>

FIG. 25 illustrates an inverter AC power supply in accordance with a 16th embodiment of the present invention which is basically identical in configuration and operations to the 1st embodiment except for provision of an input voltage selector 220 capable of providing operating DC voltages of three different levels for operation of the inverter. In this embodiment, a series connected pair of first and second smoothing capacitors 30-1 and 30-2 is utilized instead of a single capacitor and connected across the series connected pair of third and fourth diodes 23P and 24P. Like components are designated by like numerals with a suffix letter of "P" for an easy reference purpose. Input voltage selector 220 comprises a three-position switch with first and second contacts 221 and 222, and a common contact 223 which is movable among a first position of being connected to first contact 221, second position of being connected to second contact 222, and a neutral position of being disconnecting from either of first and second contacts. Common contact 223 is connected to a point between third and fourth diodes 23P and 24P. First contact 221 is connected to a point between first and second smoothing capacitors 30-1 and 30-2, while second contact 222 connected to a point between first and second switching transistors 11P and 12P.

In operation, when selector 220 is kept in the neutral position, the input current from AC voltage source 1P is drawn through diodes 21P to 24P to apply a rectified voltage to charge the series connected pair of first and second smoothing capacitors 30-1 and 30-2 to thereby give to the inverter a low DC voltage, i.e., $\sqrt{2}$ times the peak voltage of the input AC voltage. When selector 220 is switched to the first position of connecting common contact 223 to first contact 221, a voltage doubler is made to charge each one of smoothing capacitors 30-1 and 30-2 during each one of positive and negative half cycles of the input AC voltage, thereby giving to the inverter a medium DC voltage, i.e., 2 $\sqrt{2}$ times the peak voltage of the input AC voltage. In the second position of connecting common contact 223 to second contact 222, the chopper operation is enabled to provide a step-up high DC voltage to the inverter. With this three-mode charging, it is readily possible to adjust the inverter output for preheating and dimming the discharge lamp 5P.

Figure 26:
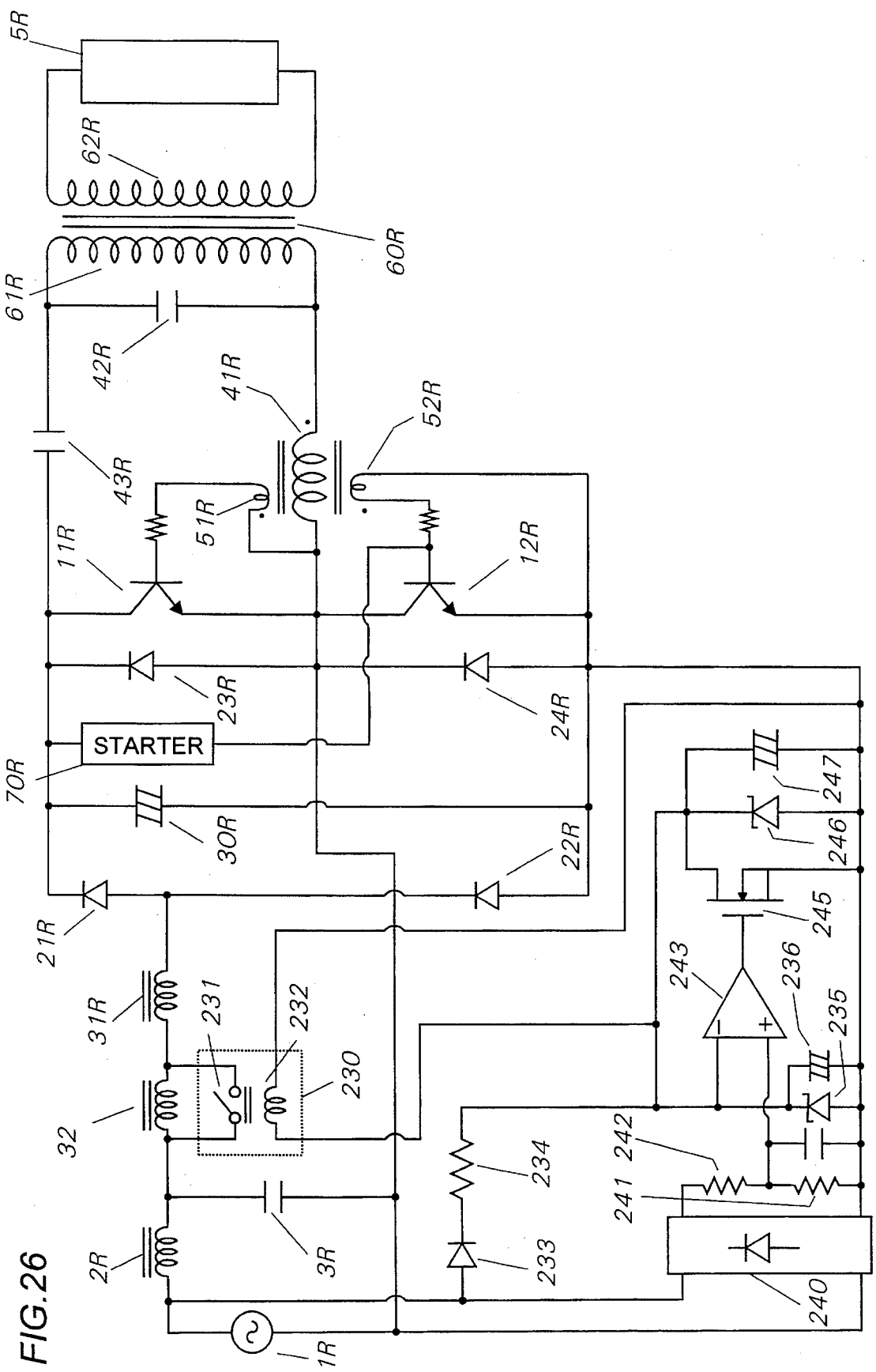
FIG. 26 is a circuit diagram of an inverter AC power supply in accordance with a 17th embodiment of the present invention.

17th Embodiment <FIG. 26>

FIG. 26 illustrates an inverter AC power supply in accordance with a 17th embodiment of the present invention which is basically identical in configuration and operations to the 1 st embodiment except that the chopper includes an additional inductor 32 which is selectively connected and disconnected to and from existing inductor 31R depending upon the input AC voltage available for providing a constant DC voltage to the inverter. Like components are designated by like numerals with a suffix letter of "R" for an easy reference purpose. The additional inductor 32 is connected in series with existing inductor 31R and is bypassed by a switch contact 231 of a relay 230. Relay 230 has an excitation coil 232 which is connected to receive an excitation current through a diode 233 and a resistor 234 from AC voltage source 1R. Relay 230 is energized to close switch contact 231 to thereby disconnect additional inductor 32 from the chopper when the input AC voltage is lower than a predetermined level. On the other hand, when the input AC voltage is higher than the predetermined level, relay 230 responds to open switch contact 231 to connect additional inductor 32 in the circuit of the chopper. For example, when available AC mains provides 100V, the chopper utilizes additional inductor 32 plus existing inductor 31R to boost the resulting DC voltage. And when connected to AC mains of 200V, the chopper operates without additional inductor 32. In this manner, the chopper provides a constant DC voltage for operation of the inverter irrespective of whether being connected to 100V AC or 200V AC mains. For this purpose, the chopper includes an input voltage monitor comprising a full-wave rectifier 240 and a voltage divider of resistors 241 and 242 which gives a monitored voltage indicative of the AC voltage to non-inverting input of a comparator 243 where it is compared with a fixed reference voltage applied to inverting input of comparator 243. The reference voltage is derived from AC voltage source 1R through diode 233 and resistor 234 and determined by a combination of a zener diode 235 and a capacitor 236 to be lower than monitored voltage when AC voltage source supplies 100V and greater than the monitored voltage when AC voltage source supplies 200V. Comparator 243 has its output connected to gate of MOSFET 245 connected across a parallel combination of a zener diode 246 and a capacitor 247 which combination gives an excitation voltage to relay 230.

In operation, when comparator 243 gives a high level output in response to the input AC voltage is greater than predetermined level, i.e., 200V AC is connected, MOSFET 245 turns on to stop applying the excitation voltage to relay 230. Consequently, switch contact 231 is opened to connect additional inductor 32 to existing inductor 31R. Otherwise, MOSFET 245 is kept non-conductive to keep exciting the relay 232 to maintain additional inductor 32 being disconnected.

Figure 27:
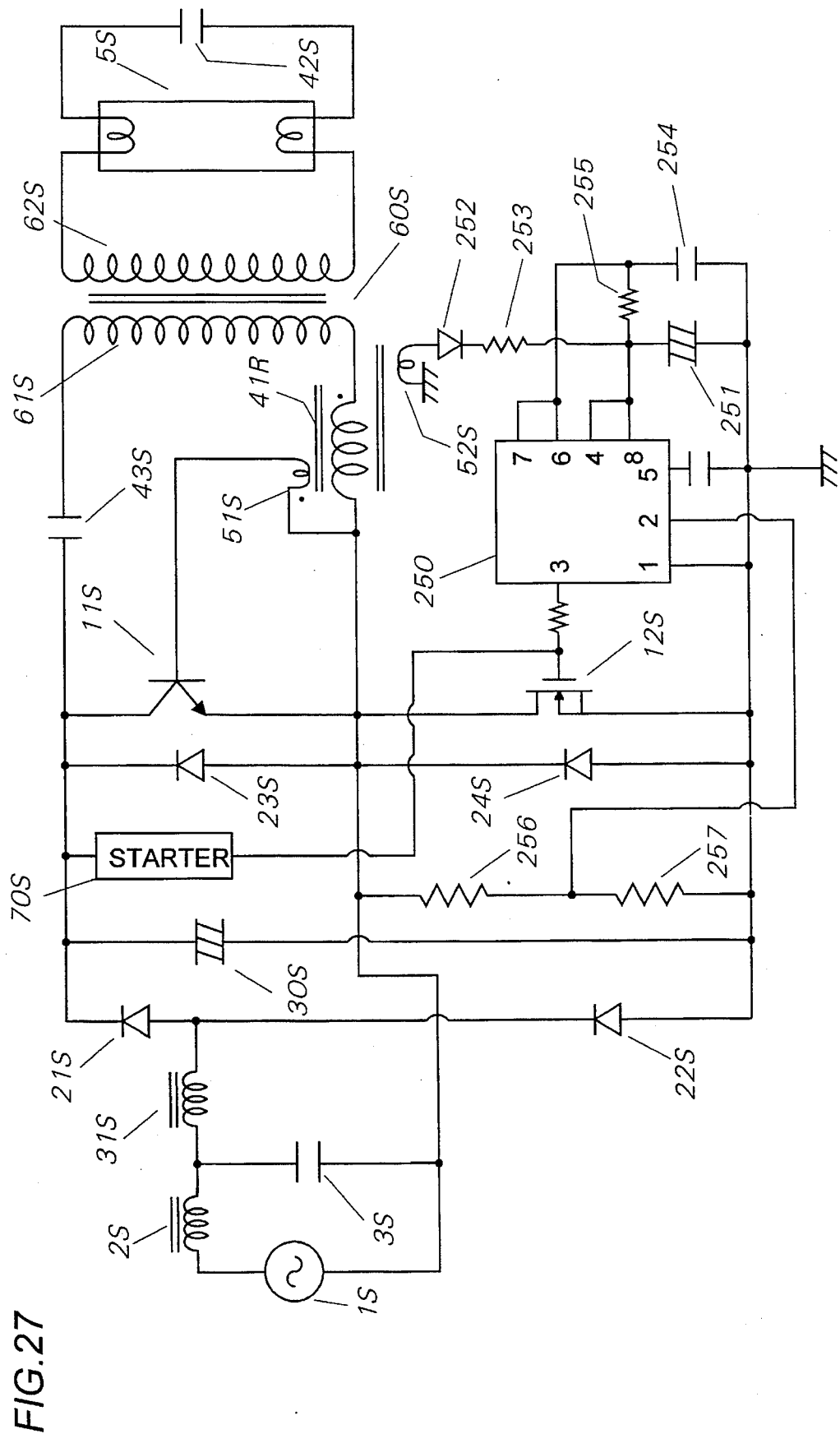
FIG. 27 is a circuit diagram of an inverter AC power supply in accordance with an 18th embodiment of the present invention.

18th Embodiment <FIG. 27>

FIG. 27 illustrates an inverter AC power supply in accordance with a 18th embodiment of the present invention which is basically identical in configuration and operations to the 1st embodiment except that the self-excitation circuit includes a timer IC 250 for excitation of second switching transistor 12S yet in synchronism with first transistor 11S. Like components are designated by like numerals with a suffix letter of "S" for an easy reference purpose. In this embodiment, resonance capacitor 42S is connected across secondary winding 62S of output transformer 60S and constitutes L-C resonant circuit with resonance inductor 41S to give an oscillating voltage as inverter output. In response to the oscillating voltage, first feedback winding 51S provides a bias voltage to turn on and off first switching transistor 11S, while second feedback winding 52S is connected to charge capacitor 251 through a diode 252 and a resistor 253. Capacitor 251 is connected between an input terminal (pin no. 8) and a ground terminal (pin no. 1) of timer IC 250 to give an operating voltage thereto. The timer IC 250 is available from NEC Inc., Japan as "µPD555" and gives a drive pulse from an output terminal (pin no.3) to a gate of MOSFET which is utilized as second switching transistor 12S. A reset terminal (pin no. 4) of timer IC is connected to input terminal (pin no. 8). A voltage divider of resistors 256 and 257 is connected across MOSFET 12S to give a control signal indicative of whether first transistor 11S is conductive or non-conductive to a trigger terminal (pin no. 2) of timer IC 250. That is, while first transistor 11S is conductive, a full voltage of smoothing capacitor 41S is applied across second transistor or MOSFET 12S so that the voltage divider gives a high voltage signal to trigger terminal (pin no.2) of timer IC 250. Subsequently when first transistor 11S is turned on to cause the inverter current to flow through the flywheel loop from resonance inductor 41S, primary winding 61S, capacitor 43S, smoothing capacitor 30S, fourth diode 24S, and back to inductor 41S, no voltage is applied across voltage divider of resistors 256 and 257 so that voltage divider give a low voltage divider responds to give a zero voltage signal to timer IC 250. Upon receiving zero voltage signal indicative of that first switching transistor 11S is turned off, timer IC 250 responds to provide the drive pulse to turn on second switching transistor 12S for a limited turn-on period determined by a time constant of a circuit of a timing capacitor 254 and a resistor 255. Timing capacitor 254 and resistor 255 are connected in series across capacitor 251, while capacitor 254 is connected between a threshold terminal (pin no.6) and ground terminal (pin no. 1) of timer IC 250 and at the same time connected between a discharge terminal (pin no.7) and ground terminal (pin no. 1) thereof. When second switching transistor 12S is turned off, first feedback winding 11S responds to turn on first switching transistor 11S in the same manner as explained in the first embodiment. Therefore, in this embodiment, first and second switching transistors 11S and 12S are both responsive to the oscillating voltage of the inverter to alternately turn on and off in the self-excited manner.

Figure 28:
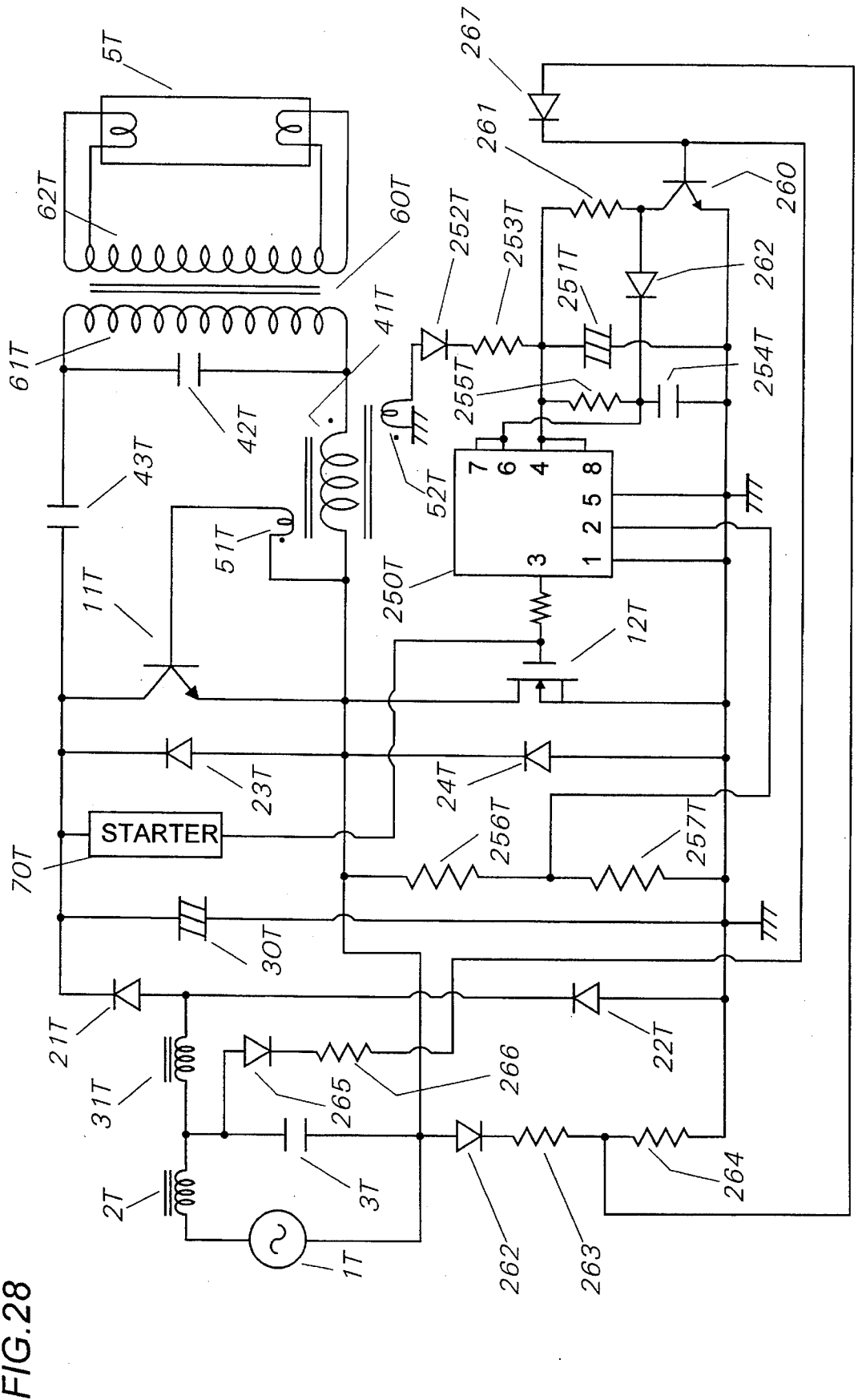
FIG. 28 is a circuit diagram of an inverter AC power supply in accordance with a 19th embodiment of the present invention.

19th Embodiment <FIG. 28>

Figure 29A:
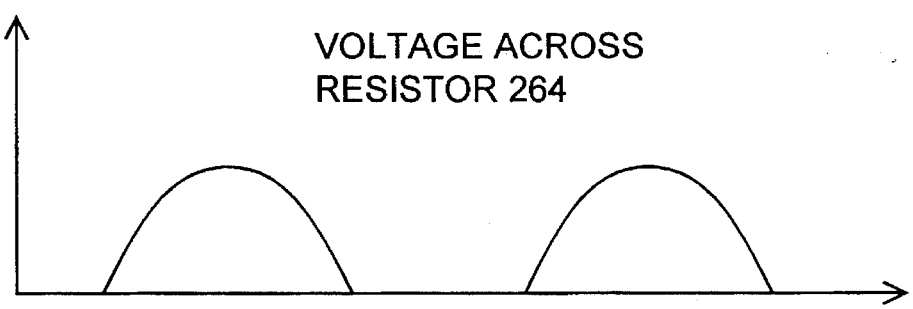
FIGS. 29A and 29B are waveform charts illustrating the operation of the embodiment of FIG. 28.
Figure 29B:
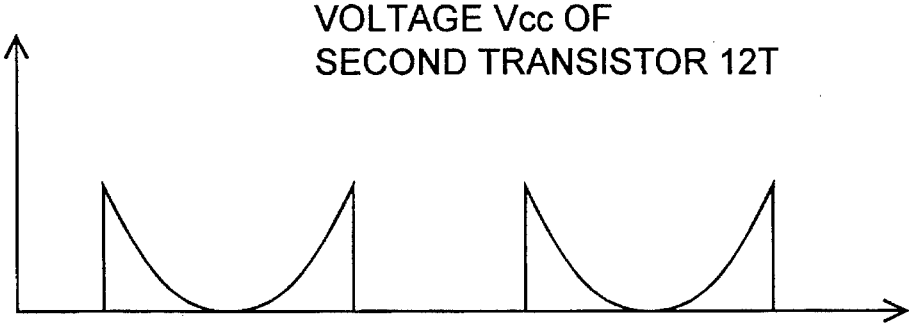

FIG. 28 illustrates an inverter AC power supply in accordance with a 19th embodiment of the present invention which is basically identical in configuration and operations to the 18th embodiment except that second switching transistor 12T is controlled to vary its turn-on period with varying input AC voltage. Like components are designated by like numerals with a suffix letter of "T" for an easy reference purpose. The inverter includes a transistor 260 which is connected in series with a resistor 261 in parallel with capacitor 251T and also a series combination of timing capacitor 254T and resistor 255T. A diode 262 is connected in series with resistor 261 across resistor 255T so as to form parallel charging paths of charging timing capacitor 254T from capacitor 251T, one through resistor 255T, and the other through resistor 261 and diode 262. Therefore, control of varying collector current flowing through transistor 260 can vary charging rate at which timing capacitor 254T is charged and therefore turn-on period of second switching transistor 12T. Second transistor 12T is connected to vary its collector current depending upon the instantaneous input AC voltage from AC voltage source 1T, which voltage is monitored by a monitor circuit. The monitor circuit comprises a series combination of a diode 262, resistors 263 and 264 which are connected between one end of filter capacitor 3T and ground, and another series combination of a diode 265 and a resistor 266 which are connected between the other end of filter capacitor 3T and the base of transistor 260. Resistor 264 is connected to give a varying divided voltage indicative of the instantaneous input AC voltage to gate of transistor 260 when the AC voltage is of a polarity of flowing a current through diode 262, so that transistor 260 operates to correspondingly vary its collector current, thereby varying the rate of charging capacitor 254T and therefore turn-on period of second transistor 12T. That is, during a positive half cycle of AC voltage source in which the input AC voltage is of the above polarity of flowing current through diode 262, resistor 264 gives a half-rectified voltage proportion to the instantaneous input AC voltage, as shown in FIG. 29A, to base of transistor 260 through diode 267. In this condition, transistor 260 responds to give voltage Vcc in reverse proportion to the input AC voltage, as shown in FIG. 29B, such that transistor 260 flows a more collector current in a direction of lowering the charging rate, thereby extending turn-on period of second switching transistor 12T. During negative half cycle of AC voltage source 1T where input AC voltage is of opposite polarity of flowing current through diode 265, resistor 266 gives a like varying voltage to base of transistor 260 to vary the turn-on period of second switching transistor 12T in the like manner with varying input AC voltage.

Figure 30:
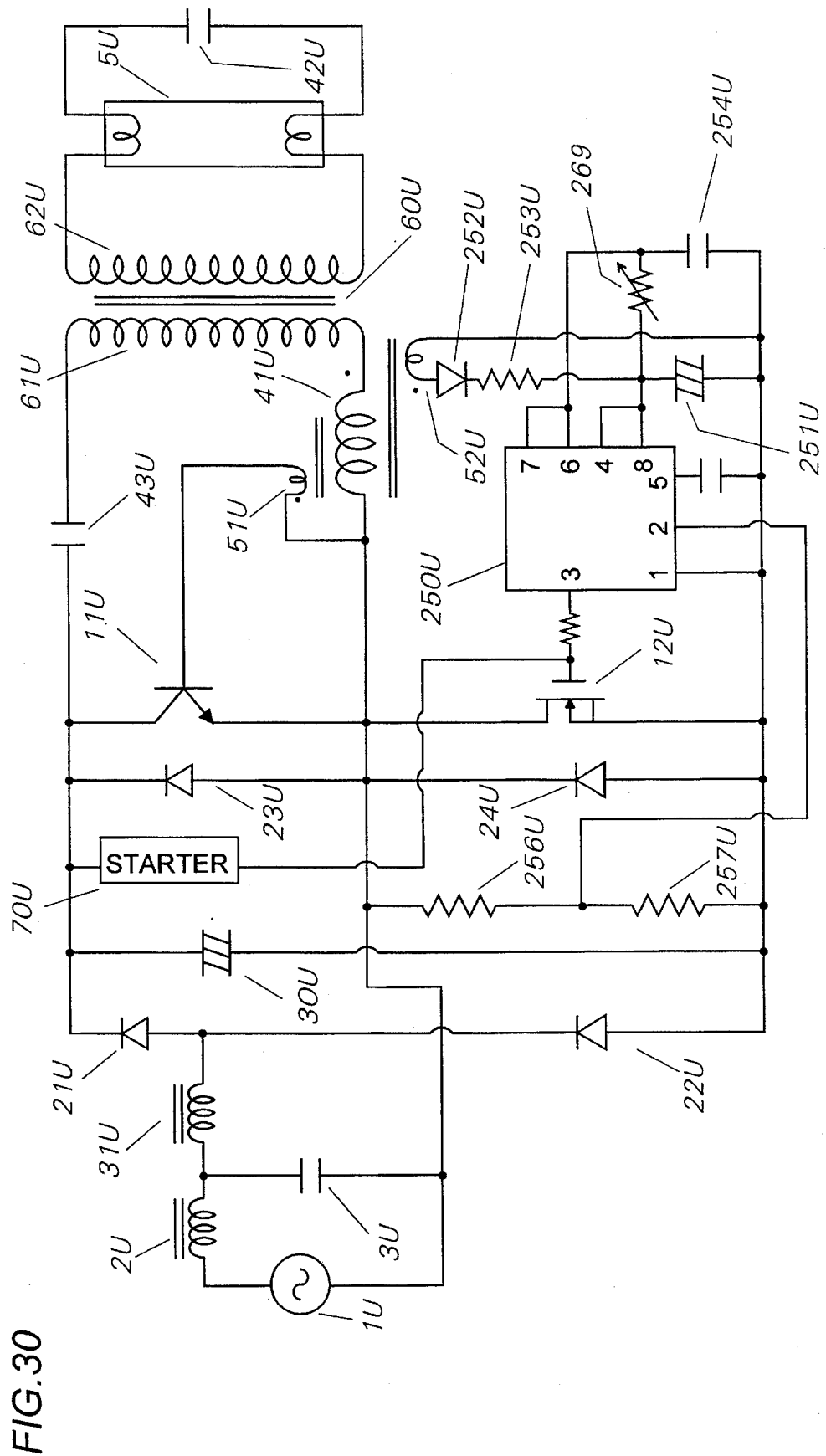
FIG. 30 is a circuit diagram of an inverter AC power supply in accordance with a 20th embodiment of the present invention.

20th Embodiment <FIG. 30>

FIG. 30 illustrates an inverter AC power supply in accordance with a 20th embodiment of the present invention which is basically identical in configuration and operations to the 18th embodiment except for a control of manually varying turn-on period of second switching transistor 12U for dimming discharge lamp 5U. Like components are designated by like numerals with a suffix letter of "U" for an easy reference purpose. In this embodiment, a variable resistor 269 is connected in series with timing capacitor 254U across capacitor 251U so as to vary the rate of charging timing capacitor 254U in order to turn-on period of second switching transistor 12U, whereby varying frequency of the inverter output for dimming discharge lamp 5U. For example, when charging rate is raised by adjusting variable resistor 269, timer IC 250U responds to reduce turn-on period of second switching transistor 12U to thereby increase the output frequency of the inverter. Also at this condition, coupling capacitor 43U receives a more DC current during inverter operation so as to correspondingly lower the voltage developed across resonance capacitor 42. With this result, the inverter gives a limited output energy for dimming discharge lamp 5U.

Figure 31:
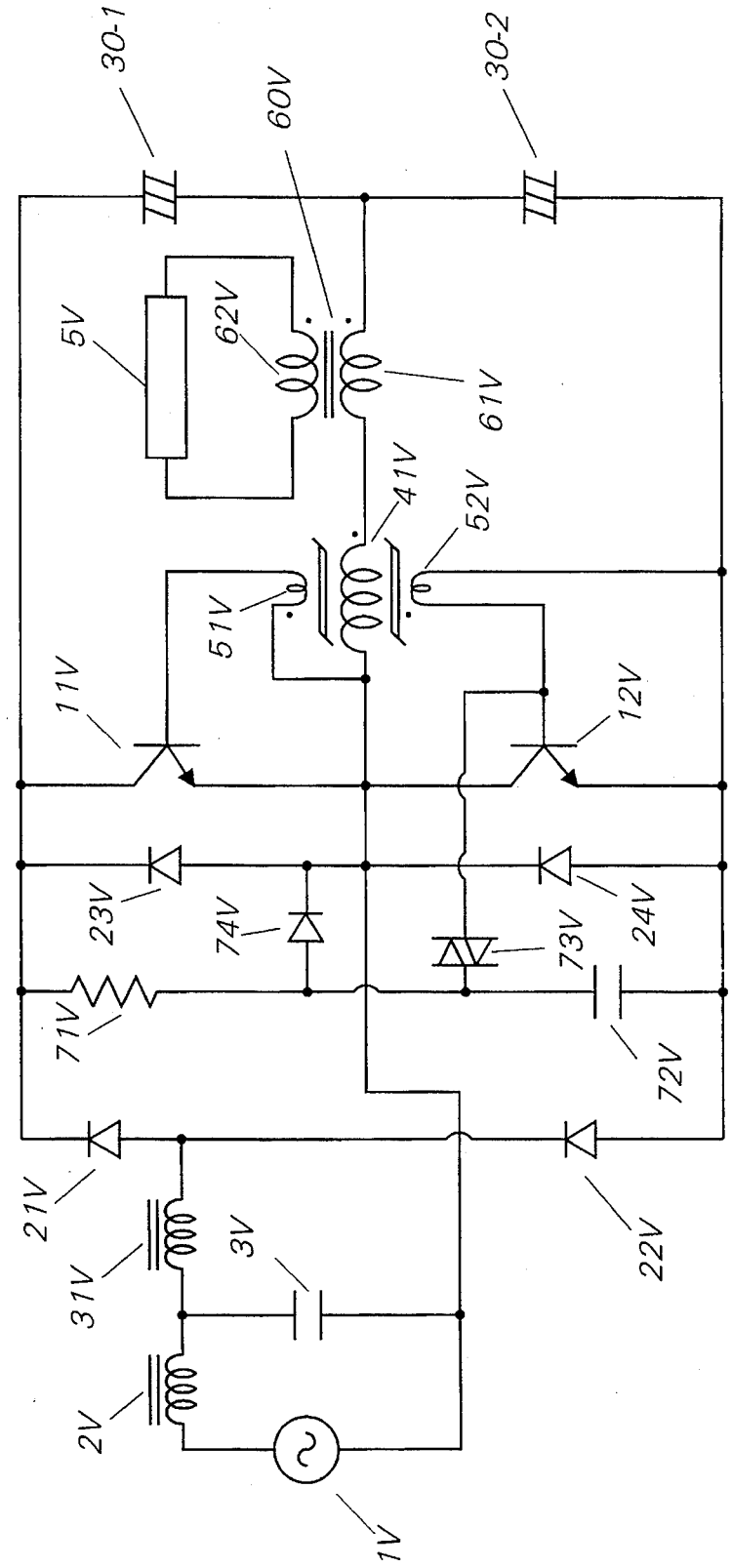
FIG. 31 is a circuit diagram of an inverter AC power supply in accordance with a 21th embodiment of the present invention.

21st Embodiment <FIG. 31>

FIG. 31 illustrates an inverter AC power supply in accordance with a 21st embodiment of the present invention which is basically identical in configuration and operations to the 1st embodiment except that the inverter is of a half-bride configuration and also that inductor 41V forms a saturable transformer with associated first and second feedback windings 51V and 52V. Like components are designated by like numerals with a suffix letter of "V" for an easy reference purpose. In this embodiment, a series connected pair of first and second smoothing capacitors 30-1 and 30-2 is utilized instead of a single capacitor and connected across the series connected pair of first and second switching transistors 11V and 11V in the half-bridge configuration. Thus, first smoothing capacitors 30-1 provides a voltage for flowing the inverter current through first switching transistor 11V and through inductor 41V and output transformer 60V, while second smoothing capacitor 30-2 provides a voltage for flowing the opposite inverter current through second transistor 12V, inductor 41V and output transformer 60V.

Figure 32:
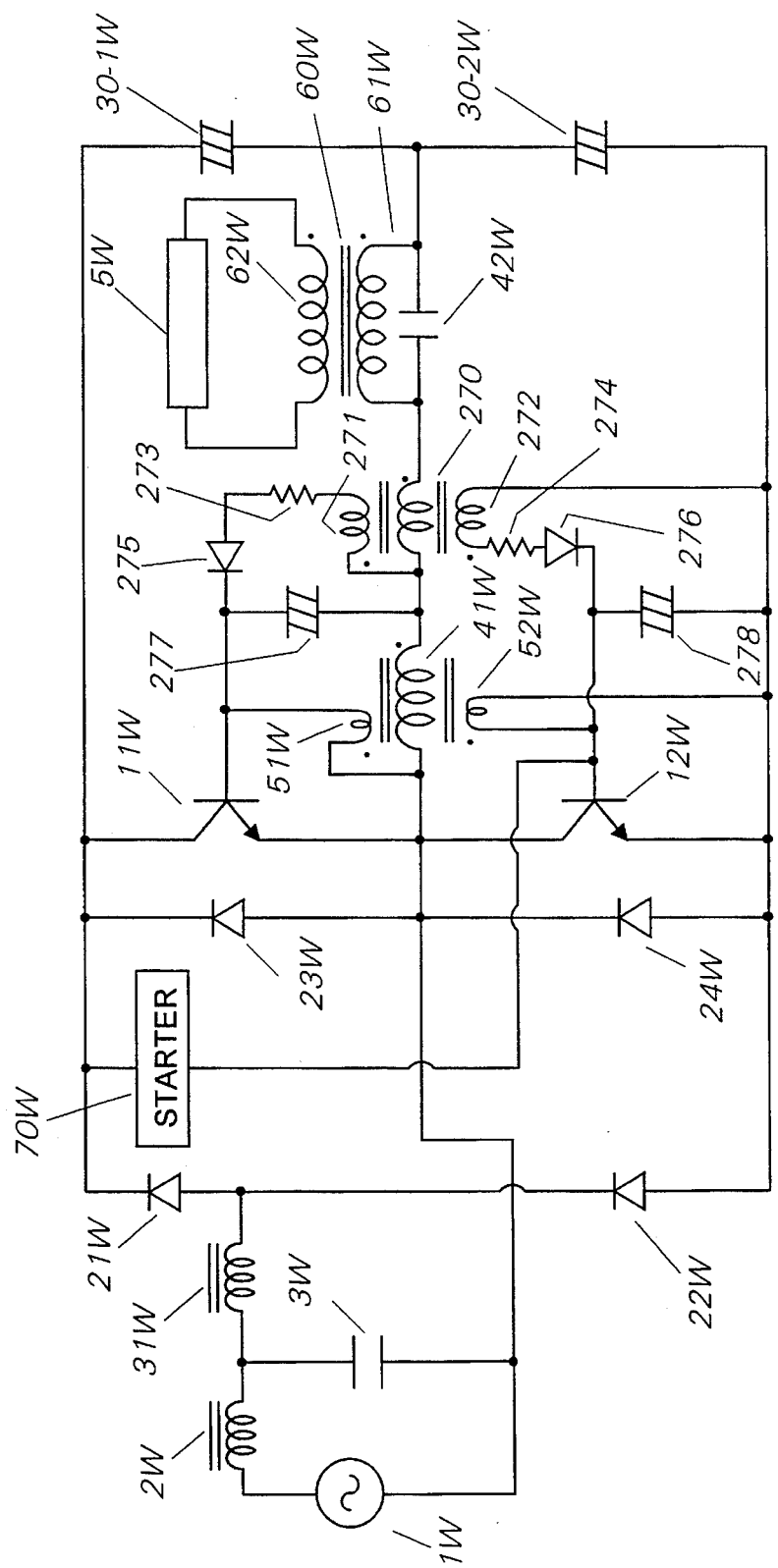
FIG. 32 is a circuit diagram of an inverter AC power supply in accordance with a 22th embodiment of the present invention.

22nd Embodiment <FIG. 32>

FIG. 32 illustrates an inverter AC power supply in accordance with a 22nd embodiment of the present invention which is basically identical in configuration and operations to 21st embodiment except that the inverter includes an offset circuit which provides an offset voltage proportion to the inverter output voltage supplied to load 5W and superimpose the offset voltage to bias voltages developed at first and second feedback windings 51W and 52W for successfully turning on and off first and second switching transistors 11W and 12W even when these transistors see increasing collector currents. Like components are designated by like numerals with a suffix letter of "W" for an easy reference purpose. The offset circuit comprises an additional transformer with a main winding 270 connected in series with resonance inductor 41W and with first and second sensor windings 271 and 272 which develop voltages by inverter current flowing through main windings 270. The resulting voltages are respectively fed through resistors 273 and 274, diodes 275 and 276 to charge capacitors 277 and 278 to give the offset voltages. The offset voltages are then respectively superimposed to bias voltages developed at first and second feedback windings 51W and 52W and being fed to bases of first and second switching transistors 11W and 12W, thereby assuring to enough bias to alternately turn on and off transistors 11W and 12W if these transistors see increased collector currents in response to increased load. In this embodiment, output transformer 60W has its primary winding 61W connected across a resonance capacitor 42W which is connected in series with resonance inductor 41W to form therewith an L-C resonant circuit responsible for providing the oscillating AC voltage to load 5W.

Figure 33:
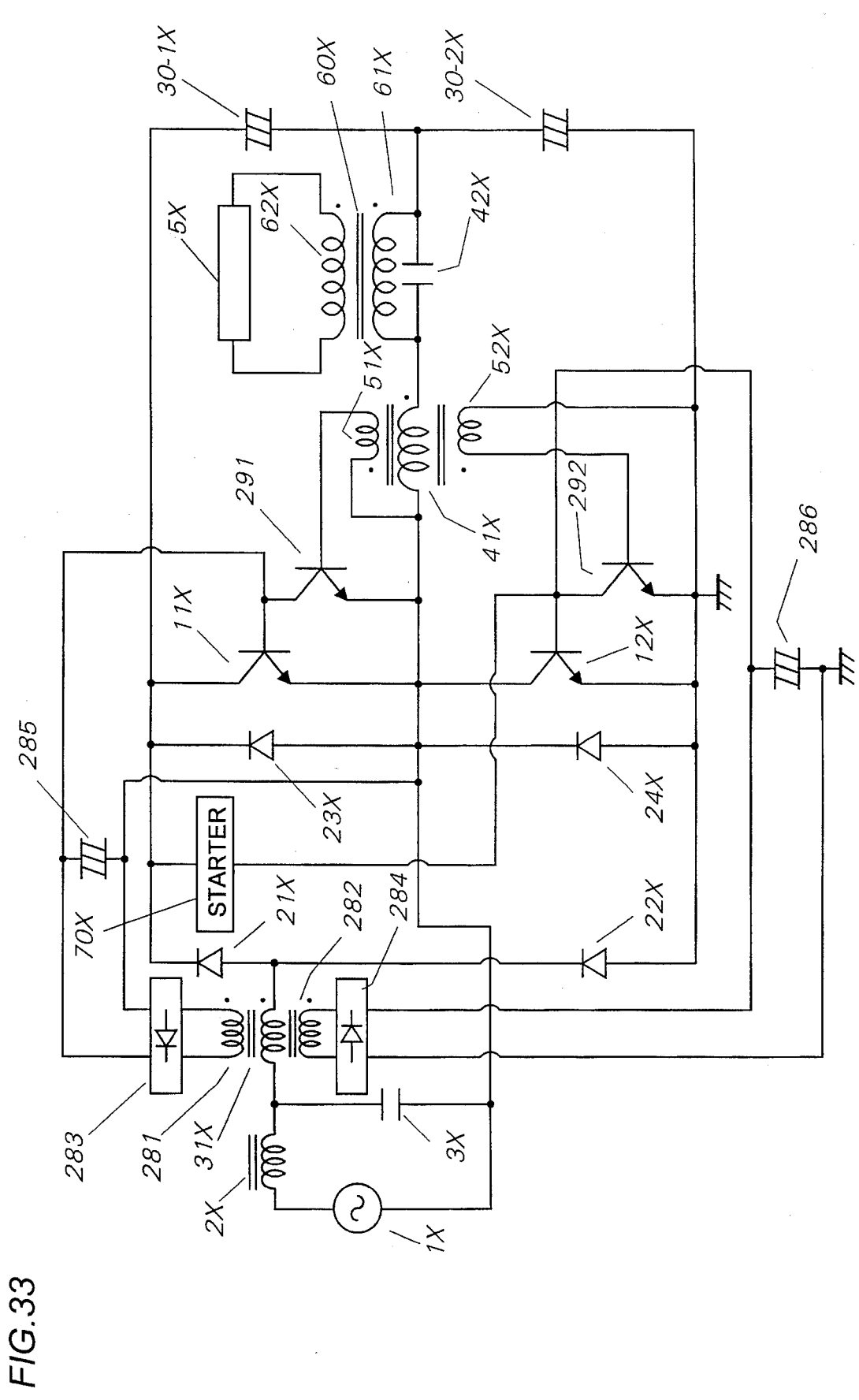
FIG. 33 is a circuit diagram of an inverter AC power supply in accordance with a 23th embodiment of the present invention.

23rd Embodiment <FIG. 33>

FIG. 33 illustrates an inverter AC power supply in accordance with a 23rd embodiment of the present invention which is basically identical in configuration and operations to the 21st embodiment except for inclusion of a safe circuit which ceases the inverter operation immediately upon the power supply is disconnected from AC voltage source 1X Like components are designated by like numerals with a suffix letter of "X" for an easy reference purpose. The safe circuit comprises first and second windings 281 and 282 respectively coupled to inductor 31X of the chopper to give bias voltages through associated rectifiers 283 and 284, and capacitors 285 and 286 to bases of first and second switching transistors 11X and 12X, respectively for turning on these transistors. Also included in the safe circuit are first and second shunting transistors 291 and 292 which are each inserted in base-emitter path of corresponding one of first and second switching transistors 11X and 12X. First and second shunting transistors 291 and 292 have their individual bases of shunting transistors 291 and 292 connected to receive oscillating feedback voltages respectively from first and second feedback windings 51X and 52X so as to turn on and off first and second switching transistors 11X and 12X in the self-excited manner in response to the voltages appearing first and second feedback windings 51X and 52X. Thus, when the power supply is disconnected from AC voltage source 1X, no biasing voltage is supplied to first and second switching transistors 11X and 12X to immediately cease operation of the inverter in order to avoid a malfunction of the inverter which would be otherwise possible yet on decreasing voltages from capacitors 30-1X and 30-2X and would cause unacceptable simultaneous turning on of first and second switching transistors 11X and 12X. In this embodiment, load 5X is connected to output transformer 60X of which primary winding 61 is connected across resonance capacitor 42X connected in series with resonance inductor 41X to form L-C resonant circuit.

Figure 34:
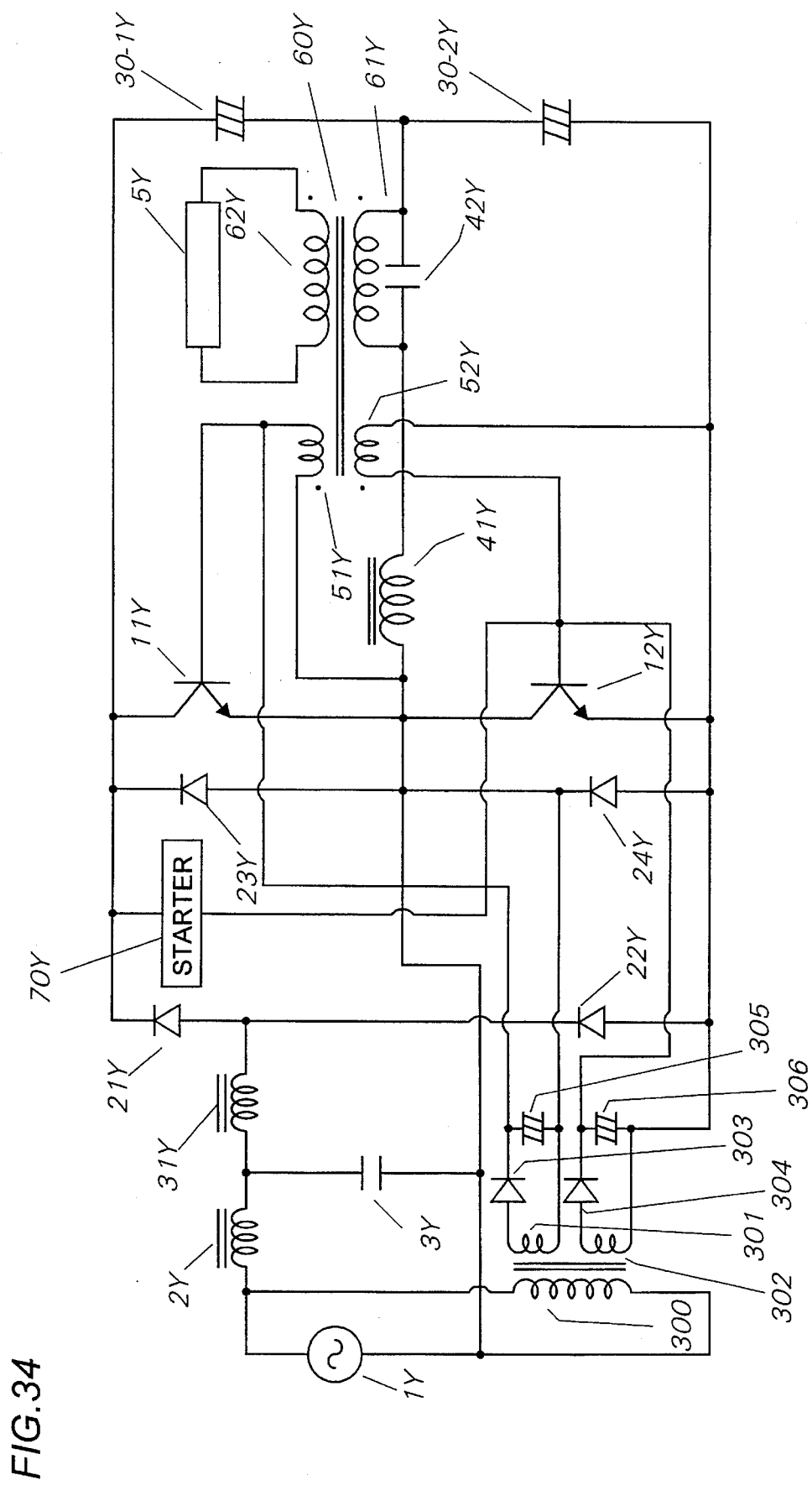
FIG. 34 is a circuit diagram of an inverter AC power supply in accordance with a 24th embodiment of the present invention.

24th Embodiment <FIG. 34>

FIG. 34 illustrates an inverter AC power supply in accordance with a 24th embodiment of the present invention which is basically identical in configuration and operations to the 21st embodiment except for provision of another safe circuit to immediately stop operating the inverter upon disconnected from AC voltage source and also for that first and second feed back windings 51Y and 52Y are coupled to primary winding 61Y of output transformer 60Y to give like oscillating bias voltages. Like components are designated by like numerals with a suffix letter of "Y" for an easy reference purpose. The safe circuit comprises a transformer with a main winding 300 connected across AC voltage source 1Y and with first and second windings 301 and 302 which are coupled to main winding 300 to give individual offset voltages through associated diodes 303 and 304, and capacitors 305 and 306. The offset voltages are respectively superimposed on bias voltages which are derived at first and second feedback windings 51Y and 52Y and fed to bases of first and second switching transistors 11Y and 12Y such that first and second switching transistors 11Y and 12Y are self-excited in the presence of the offset voltage. Thus, when the power supply is disconnected from AC voltage source 1Y, sufficient biasing voltage is not supplied to first and second switching transistors 11X and 12X to immediately cease operation of the inverter. In this embodiment, output transformer 60Y has its primary winding 61Y connected across a resonance capacitor 42Y which is connected in series with resonance inductor 41Y to form therewith an L-C resonant circuit responsible for providing the oscillating AC voltage to load 5Y.

First and second windings 301 and 302 may be alternately coupled to resonance inductor 41Y to derive the offset voltage from the inverter output. In this modification, it is possible to immediately stop operating the inverter operation upon disconnection of load or discharge lamp 5Y from the inverter.

Figure 35:
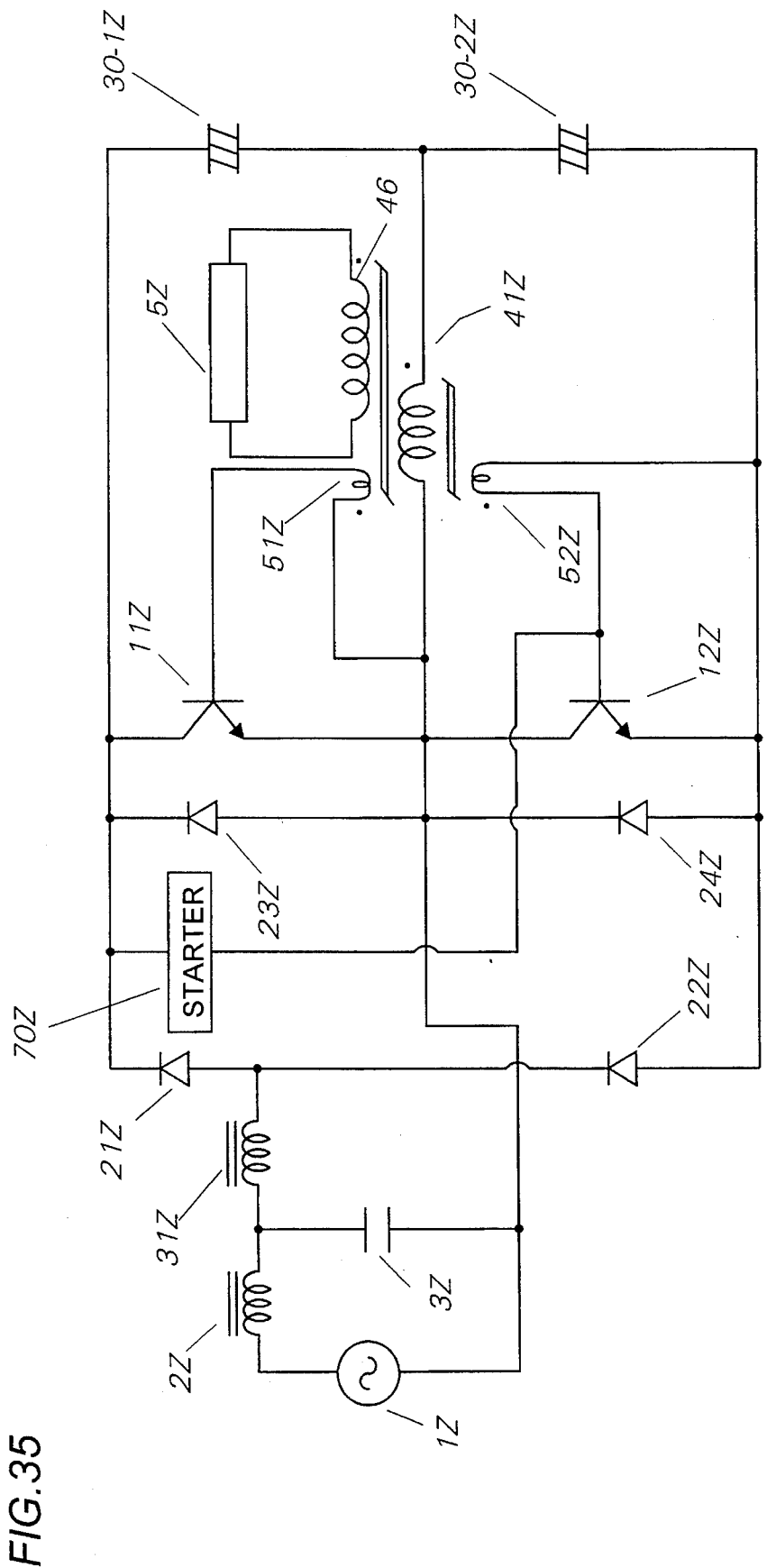
FIG. 35 is a circuit diagram of an inverter AC power supply in accordance with a 25th embodiment of the present invention.

25th Embodiment <FIG. 35>

FIG. 35 illustrates an inverter AC power supply in accordance with a 25th embodiment of the present invention which is basically identical in configuration and operations to the 21st embodiment except that load or discharge lamp 5Z is transformer-coupled to inductor 41Z through an output winding 64. Output winding 64 is coupled to inductor 41Z together with first and second feedback windings 51Z and 52Z to form a saturable transformer. Like components are designated by like numerals with a suffix letter of "Z" for an easy reference purpose.

Figure 36:
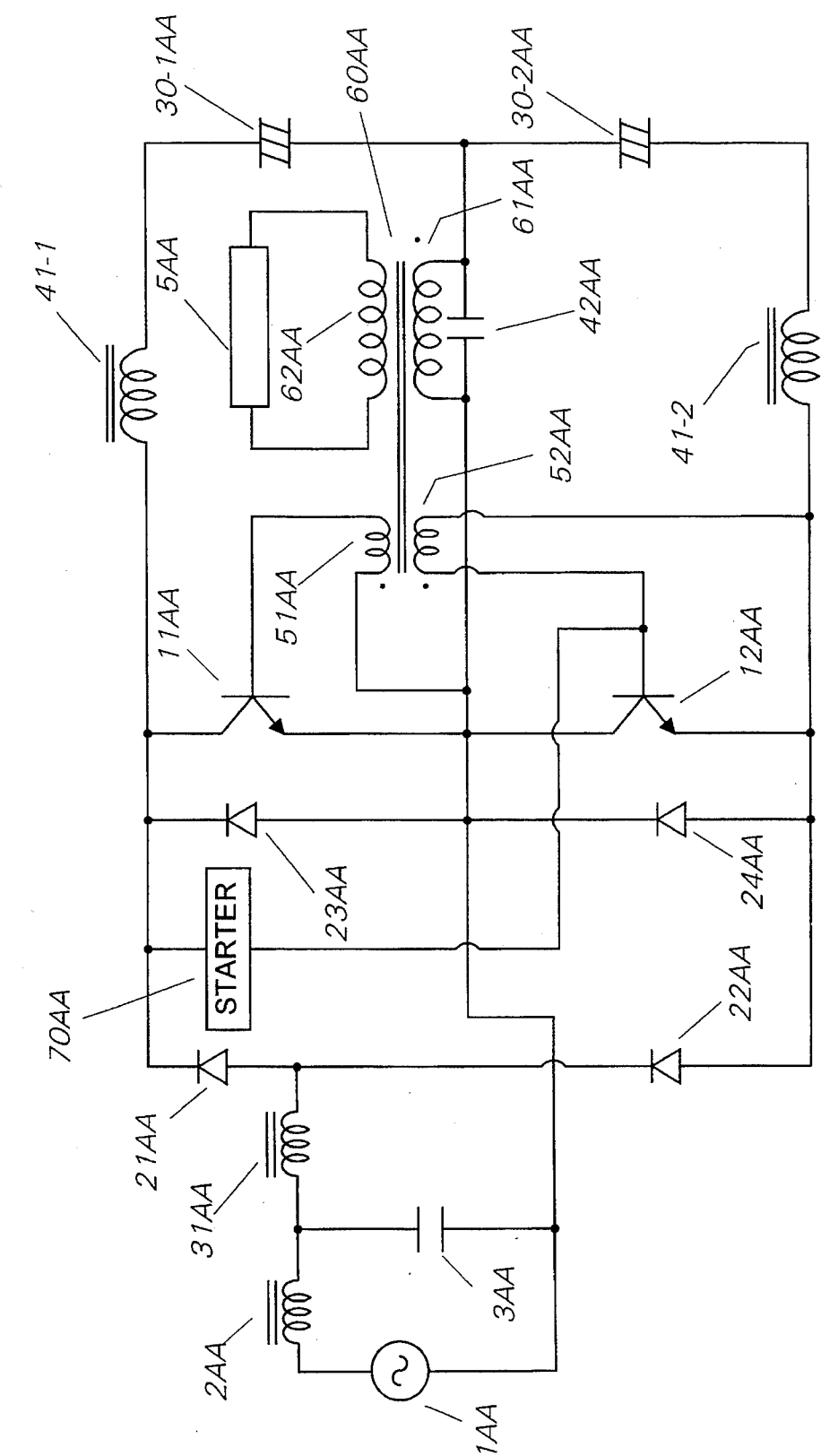
FIG. 36 is a circuit diagram of an inverter AC power supply in accordance with a 26th embodiment of the present invention.

26th Embodiment <FIG. 36>

FIG. 36 illustrates an inverter AC power supply in accordance with a 26th embodiment of the present invention which is basically identical in configuration and operations to the 21st embodiment except that the inverter includes two resonance inductors 41-1 and 41-2 which are respectively connected in series with smoothing capacitors 30-1AA and 30-2AA across first and second switching transistors 11AA and 12AA, and also that first and second feedback windings 51AA and 52AA are coupled to output transformer 60AA. Like components are designated by like numerals with a suffix letter of "AA" for an easy reference purpose. Inductors 41-1 and 41-2 are cooperative to common resonance capacitor 42AA to constitute individual L-C resonant circuit for providing oscillating output voltage applied to drive load 5AA as the inverter output.

Figure 37:
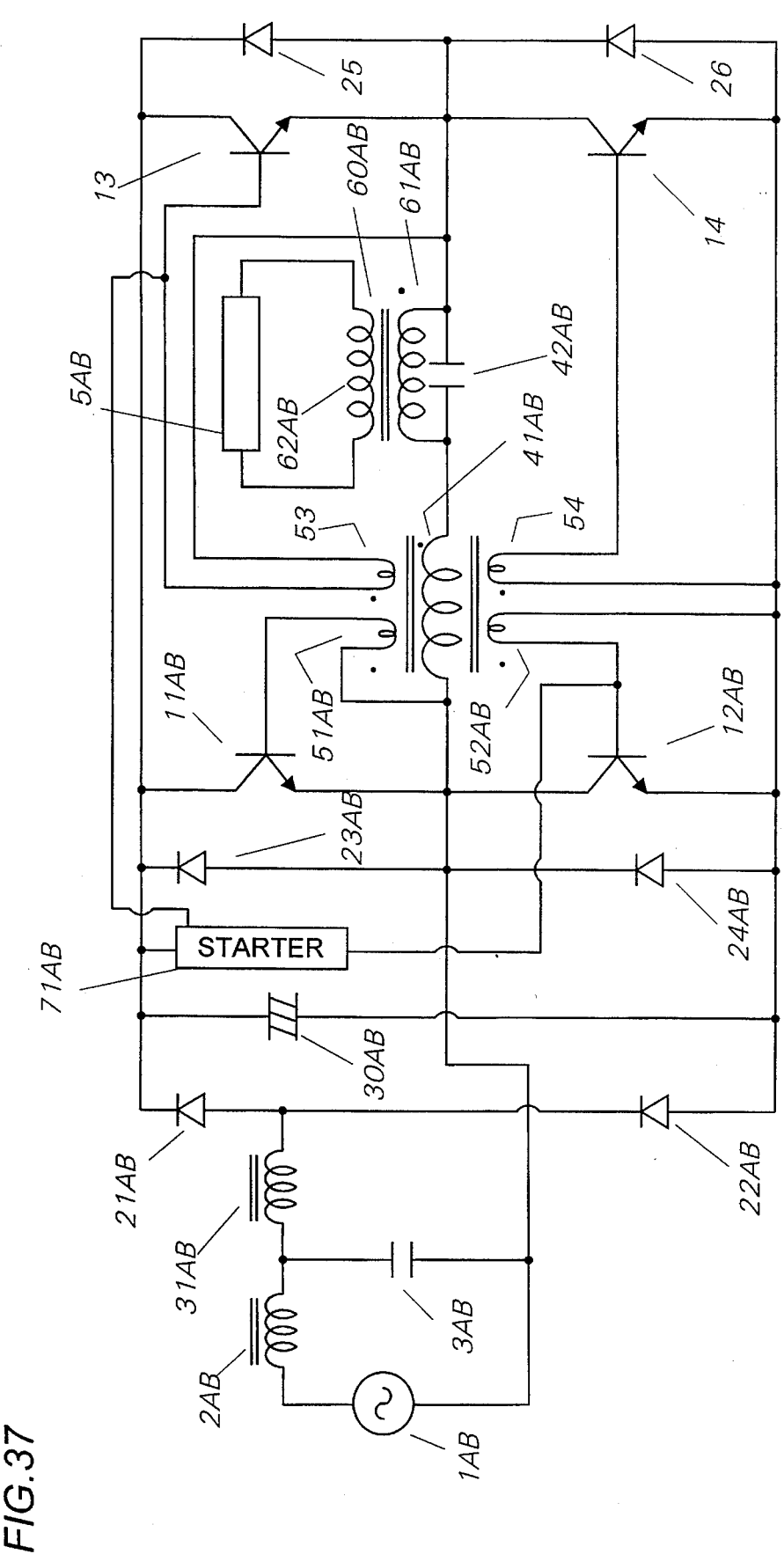
FIG. 37 is a circuit diagram of an inverter AC power supply in accordance with a 27th embodiment of the present invention.

27th Embodiment <FIG. 37>

FIG. 37 illustrates an inverter AC power supply in accordance with a 27st embodiment of the present invention which is basically identical in configuration and operations to the 1st embodiment except that the inverter is of a full-bridge configuration. Like components are designated by like numerals with a suffix letter of "AB" for an easy reference purpose. The inverter includes third and fourth switching transistors 13 and 14 which are cooperative with first and second switching transistors 11AB and 12AB to form a full-bridge circuit. Also included in the inverter is a series connected pair of fifth and sixth diodes 25 and 26 each connected in anti-parallel with each of third and fourth switching transistors 13 and 14. Resonance inductor 41AB is connected in series with resonance capacitor 42AB between a connection of first and second switching transistors 11AB and 12AB and a connection of third and fourth switching transistors 13 and 14 to form L-C resonant circuit which provides an oscillating AC voltage to load 5AB through output transformer 60AB. Output transformer 60AB has its primary winding 61AB connected across resonance capacitor 42AB and has its secondary winding 62AB connected across load or discharge lamp 5AB. Also included in the inverter are third and fourth feedback windings 53 and 54 which are magnetically coupled to resonance inductor 41AB together with first and second feedback windings 51AB and 52AB, and which are respectively connected to bases of third and fourth switching transistors 13 and 14 to give bias voltages thereto such that diagonally opposed pairs of switching transistors, i.e., a pair of first and fourth switching transistors 11AB and 14 and a pair of second and third switching transistors 12AB. and 13 are simultaneously turned on and off. Starter 70 is connected to give starting voltages to start turning on second and third switching transistors 12AB and 13.

The chopper operation of the circuit is identical to the 1st embodiment. That is, first and second switching transistors 11AB and 12AB are responsible for periodically interrupting input AC voltage respectively during negative and positive half cycles of input AC voltage from AC voltage source 1AB to give a smoothed set-up DC voltage to smoothing capacitor 30AB.

The inverter operation is as follows. When second and third switching transistors 12AB and 13 are turned on, smoothing capacitor 30AB give an inverter current flowing through third transistor 13, resonance capacitor 42AB, resonance inductor 41AB, second transistor 12AB in this direction. Upon turning off of second and third transistors 12AB and 13 by lowering of bias voltages respectively at second and third feedback windings 52AB and 53, resonance inductor 41AB acts to continue flowing the inverter current in the same direction through a flywheel loop of resonance inductor 41AB, third diode 23AB, smoothing capacitor 30AB, sixth diode 26, resonance capacitor 42AB, and back to resonance inductor 41AB. Immediately after ceasing the inverter current, first and fourth switching transistors 11AB and 14 are self-excited by bias voltages from first and fourth feedback windings 51AB and 54 are responsible for flowing inverter current in the opposite direction from smoothing capacitor 30AB through first transistor 11AB, resonance inductor 41AB, resonance capacitor 42AB, fourth transistor 14 in this order. Upon turning off of first and fourth transistors 11AB and 14 by lowering of bias voltages respectively at first and fourth feedback windings 51AB and 54, resonance inductor 41AB acts to continue flowing the inverter current in the same direction through another flywheel loop of resonance inductor 41AB, resonance capacitor 42AB, fifth diode 25, smoothing capacitor 30AB, fourth diode 26, and back to resonance inductor 41AB. Immediately after ceasing the inverter current, first and fourth switching transistors 11AB and 14 are self-excited by bias voltages from first and fourth feedback windings 51AB and 54 are responsible for flowing inverter current in the opposite direction from smoothing capacitor 30AB through first transistor 11AB, resonance inductor 41AB, resonance capacitor 42AB, fourth transistor 14 in this order. In this manner, the inverter operates to flow the inverter current in alternate directions so that L-C resonant circuit responds to develop the oscillating AC voltage applied to load 5AB.

What is claimed is:

1. An inverter AC power supply connected to a low frequency AC voltage source to provide a high frequency AC voltage for driving a load, said AC power supply comprising:

a chopper connected to receive an AC voltage from said AC voltage source to provide a smoothed DC voltage, said chopper comprising:

at least one inductor;

a series connected pair of first and second diodes;

a series connected pair of first and second unidirectional switching elements which are controlled to alternately turn on and off;

a series connected pair of third and fourth diodes which are connected in an anti-parallel relation respectively to said first and second switching elements, and which are connected across said series connected pair of the first and second diodes to form a rectifier bridge; and smoothing capacitor means connected across said series pair of said first and second switching elements, said first and second diodes defining therebetween a first input point, said first and second switching elements defining therebetween a second input point, said low frequency AC voltage source being adapted to be connected in series with said at least one inductor between said first and second input ends such that said first and second switching elements repeat interrupting an AC voltage supplied from said AC voltage source through said first and second diodes, thereby developing at said inductor a resulting voltage which is then fed through associated ones of said first, second, third, and fourth diodes to give said smoothed DC voltage across said smoothing capacitor means;

an inverter connected to receive said smoothed DC voltage from said chopper to provide said high frequency AC voltage, said inverter sharing said first and second switching elements, said third and fourth diodes with said chopper and comprising inductor means which is connected across one of said first and second switching elements together with said load so as to flow an alternating inverter current through said inductor means in response to alternate turn-on and-off of said first and second switching elements, thereby providing an oscillating voltage as said high frequency AC voltage to said load;

start means which gives a starting voltage to one of said first and second switching element to start operating said inverter;

self-excitation control means included in said inverter to acknowledge a change in said oscillating voltage, said self-excitation control means being connected to control terminals of said first and second switching elements in order to alternately turn on and off said first and second switching elements in response to said change in said oscillating voltage.

2. An inverter AC power supply as set forth in claim 1, wherein said inductor means comprises a resonant inductor which is cooperative with a resonance capacitor to form an L-C resonant circuit, said resonance inductor and said resonance capacitor being connected in series across said first switching element, and wherein said inverter includes an output transformer with a primary winding and a secondary winding, said primary winding being connected in series with said resonance inductor across said first switching element, and said secondary winding coupled to said load, said output transformer further including first and second feedback windings which develop bias voltages of opposite polarity respectively in response to said oscillating voltage of said inverter, said first and second feedback windings being coupled to feed back said bias voltages respectively to said control terminals of said first and second switching elements so as to define said self-excitation means for alternately turning on and off said first and second switching elements.

3. An inverter AC power supply as set forth in claim 1, wherein said inverter includes an output transformer with a primary winding and a secondary winding, said primary winding connected across said first switching element, said secondary winding coupled to said load, and further including a drive transformer with a main winding and a pair of first and second feedback windings, said main winding connected in series with said load across said secondary winding, said first and second feedback windings developing bias voltages of opposite polarity respectively in response to an oscillating output voltage of said inverter fed to said load, said first and second feedback windings being coupled to feed back said bias voltages respectively to said control terminals of said first and second switching elements so as to define said self-excitation means for alternately turning on and off said first and second switching elements.

4. An inverter AC power supply as set forth in claim 1, wherein said inductor means comprises a resonant inductor which is cooperative with a resonance capacitor to form an L-C resonant circuit, said resonance inductor and said resonance capacitor being connected in series across said first switching element, and wherein said inverter includes a saturable drive transformer with a main winding, a pair of first and second feedback windings, and a signal winding, said main winding being connected in series with said resonance inductor across said first switching element, said first and second feedback windings developing bias voltages of opposite polarity respectively in response to said oscillating voltage of said inverter, said first and second feedback windings being coupled to feed back said bias voltages respectively to said control terminals of said first and second switching elements so as to define said self-excitation means for alternately turning on and off said first and second switching elements, said inverter further including:

a sensor winding which is magnetically coupled to said resonance inductor to develop a check voltage indicative of the oscillating voltage of the inverter;

means for converting said check voltage of said sensor winding into a corresponding control DC voltage and applying said control DC voltage to said signal winding in order to magnetize said saturable drive transformer in the direction of lowering said bias voltages developed at said first and second feedback windings as said oscillating voltage increases, thereby reducing a turn-on period of said first and second switching elements.

5. An inverter AC power supply as set forth in claim 1, wherein said inductor means comprises a resonant inductor which is cooperative with a resonance capacitor to form an L-C resonant circuit, said resonance inductor and said resonance capacitor being connected in series across said first switching element, and wherein said inverter includes a saturable drive transformer with a main winding, a pair of first and second feedback windings, and a signal winding, said main winding being connected in series with said resonance inductor across said first switching element, said first and second feedback windings developing bias voltages of opposite polarity respectively in response to said oscillating voltage of said inverter, said first and second feedback windings being coupled to feed back said bias voltages respectively to said control terminals of said first and second switching elements so as to define said self-excitation means for alternately turning on and off said first and second switching elements, said inverter further including:

means for applying a variable DC control voltage to said saturable drive transformer in the direction of lowering said bias voltages developed at said first and second feedback windings as said oscillating voltage increases, thereby reducing a turn-on period of said first and second switching elements.

6. An inverter AC power supply as set forth in claim 1, wherein said first and second switching elements are MOSFETs each having an inherent parasitic diode, said parasitic diodes defining said third and fourth diodes, respectively.

7. An inverter AC power supply as set forth in claim 1, wherein said load comprises a discharge lamp with electrodes, and wherein said chopper includes a normally-closed switch which is connected in a path leading from a connection point between said series connected third and fourth diodes and to said second input end between said series connected first and second switching elements, said switch when turned on permitting an input current from said AC voltage source to flow through said first and second switching elements to enable a chopper operation of periodically interrupting said input current to store a resulting energy into said inductor and for releasing said energy to charge said smoothing capacitor means in addition to a direct charging by said input current, thereby obtaining a high voltage across said smoothing capacitor means, said switch when turned off disabling said chopper operation and only permitting said direct charging by said input current for obtaining a low voltage across said smoothing capacitor means, said power supply including a timer and control means, said timer being energized by an output of the inverter to provide a control signal after the elapse of a predetermined time period from the energization thereof, said control means connected to turn off said switch until receiving said control signal such that said inverter operates on said low voltage from said chopper to give a limited output voltage for preheating said electrodes after which said inverter operates on said high voltage from said chopper to give a nominal output voltage for lighting said discharge lamp.

8. An inverter AC power supply as set forth in claim 1, wherein said chopper defines a common point between said series connected third and fourth diodes, and wherein said smoothing capacitor means comprises a series connected pair of first and second smoothing capacitors which defines therebetween a branch point, said chopper including a selector which connects said common point selectively to one of said branch point and said second input end between said first and second switching elements, whereby upon said selector connecting said common point to said branch point, said first and second diodes are connected respectively in circuit to charge said first and second smoothing capacitors respectively during positive and negative half-cycle of said AC voltage from said AC voltage supply, while disconnecting said first and second switching elements from said AC voltage source, and upon said selector connecting said common point to said second input end, said first and second switching elements are connected to draw an input current from said AC voltage source to enable a chopper operation of periodically interrupting said input current to store a resulting energy into said inductor and for releasing said energy to charge said first and second smoothing capacitors.

9. An inverter AC power supply as set forth in claim 1, wherein said chopper includes a parallel combination of an additional inductor and a bypass switch, said parallel combination being connected in series with said inductor and said AC voltage source between said first and second input ends, and wherein said power supply includes an input voltage detector and control means, said input voltage detector detecting the AC voltage supplied from said AC voltage source and provide a control signal when said AC voltage exceeds a predetermined level, said control means being connected to turn off said bypass switch in response to said control voltage, thereby adding an inductance of said additional inductor to that of said inductor.

10. An inverter AC power supply as set forth in claim 1, wherein said inductor means comprises a resonant inductor which is cooperative with a resonance capacitor to form an L-C resonant circuit, said resonance inductor and said resonance capacitor being connected in series across said first switching element, and wherein said inverter includes a drive transformer with a main winding and a pair of first and second feedback windings, said main winding being connected in series with said resonance inductor across said first switching element, said first and second feedback windings developing bias voltages of opposite polarity respectively in response to said oscillating voltage of said inverter, said first and second feedback windings being coupled to feed back said bias voltages respectively to said control terminals of said first and second switching elements so as to define said self-excitation means for alternately turning on and off said first and second switching elements.

11. An inverter AC power supply as set forth in claim 10, wherein said inverter includes an output transformer with a primary winding and a secondary winding, said primary winding connected in series with said resonance inductor across said first switching element, said secondary winding coupled to said load, and wherein said main winding of said drive transformer is connected in series with said resonance capacitor across said primary winding of said output transformer.

12. An inverter AC power supply as set forth in claim 1, wherein said inductor means comprises a resonant inductor which is cooperative with a resonance capacitor to form an L-C resonant circuit, and wherein said inverter includes a series connected pair of third and fourth switching elements connected across said series connected pair of first and second switching elements in a full-bridge configuration, said load being connected in series with said L-C resonant circuit between a connection of said first and second switching elements and a connection of said third and fourth switching elements, said third and fourth switching elements having individual control terminals which are connected to said self-excitation control means such that said third and fourth switching elements are turned on and off simultaneously with diagonally opposed one of said second and first switching elements.

13. An inverter AC power supply as set forth in claim 12, wherein said self-excitation control means comprises said resonance inductor and a set of first, second, third and fourth feedback windings which are magnetically coupled to said resonance inductor to develop bias voltages in response to said oscillating voltage of said inverter, said first, second, third and fourth feedback windings being coupled to feed back said bias voltages respectively to said control terminals of said first, second, third and fourth switching elements for simultaneously turning on and off the pair of first and fourth switching elements while turning off and on the other pair of second and third switching elements.

14. An inverter AC power supply as set forth in claim 1, wherein said smoothing capacitor means comprises a pair of first and second smoothing capacitors which are connected across said series connected first and second switching elements to give a half-bridge configuration to said inverter, and wherein said load is connected in series with said first smoothing capacitor across said first switching element and at the same time in series with said second switching element across said second switching elements.

15. An inverter AC power supply as set forth in claim 14, wherein said self-excitation control means comprises said inductor and a pair of first and second feedback windings which are magnetically coupled to said resonance inductor to develop bias voltages of opposite polarity respectively in response to said oscillating voltage of said inverter, said first and second feedback windings being coupled to feed back said bias voltages respectively to said control terminals of said first and second switching elements for alternately turning on and off said first and second switching elements.

16. An inverter AC power supply as set forth in claim 14, wherein said inverter includes an output transformer with a primary winding and a secondary winding, said primary winding being connected in series with said resonance inductor, and said secondary winding coupled to said load, said output transformer further including first and second feedback windings which develop bias voltages of opposite polarity respectively in response to said oscillating voltage of said inverter, said first and second feedback windings being coupled to feed back said bias voltages respectively to said control terminals of said first and second switching elements so as to define said self-excitation means for alternately turning on and off said first and second switching elements.

17. An inverter AC power supply as set forth in claim 1, wherein said inductor means comprises a resonant inductor which is cooperative with a resonance capacitor to form an L-C resonant circuit, said resonance inductor and said resonance capacitor being connected in series across said first switching element, and wherein said self-excitation control means comprises:

said resonance inductor;

a first feedback winding magnetically coupled to said resonance inductor to develop a bias voltage in response to said oscillating voltage of said inverter, said first feedback winding being coupled to feed back said bias voltage to said control terminal of said first switching element for periodically turning it on and off;

a detector which produces a control signal indicative of a turn-off of said first switching element; and drive means which is connected to receive said control signal and provides a bias voltage to the control terminal of said second switching element for turning it on for a predetermined time period upon receiving said control signal.

18. An inverter AC power supply as set forth in claim 17, wherein said self-excitation control means further includes a second feedback winding which is magnetically coupled to said resonance inductor to give a voltage for energizing said drive means.

19. An inverter AC power supply as set forth in claim 17, wherein said self-excitation control means further includes an input voltage monitor and a pulse width adjuster, said input voltage monitor detecting an instantaneous pulsating voltage supplied from said AC voltage source to said chopper during one of positive and negative half period of said AC voltage in which said second switching element is responsible for a chopper operation of periodically interrupting said AC voltage and providing a control voltage proportional to said pulsating voltage, said pulse width adjuster responding to said control voltage signal for causing said drive means to vary the turn-on period of said second switching element in a reverse proportion to said control voltage.

20. An inverter AC power supply as set forth in claim 17, wherein said self-excitation control means includes a pulse width adjuster having a varying a time constant, said pulse width adjuster causing said drive means to vary the turn-on period of said second switching element in accordance with said time constant selected at said pulse width adjuster.

21. An inverter AC power supply as set forth in claim 1, wherein said inductor means comprises a resonant inductor which is cooperative with a resonance capacitor to form an L-C resonant circuit, said resonance inductor and said resonance capacitor being connected in series across said first switching element, said self excitation control means comprising said resonance inductor and a first feedback winding and a second feedback winding which are magnetically coupled to said resonance inductor to develop bias voltages of opposite polarity respectively in response to said oscillating voltage of said inverter, said first and second feedback windings being coupled to feed back said bias voltages respectively to said control terminals of said first and second switching elements for alternately turning on and off said first and second switching elements.

22. An inverter AC power supply as set forth in claim 21, wherein said inverter includes a DC-blocking capacitor and an output transformer with a primary winding and a secondary winding, said DC-blocking capacitor and said primary winding being connected in series with said resonant inductor across said first switching element, while said primary winding connected across said resonance capacitor, and said secondary winding being coupled to said load.

23. An inverter AC power supply as set forth in claim 21, further including an input voltage monitor which monitors an instantaneous AC voltage of said AC voltage source and provide a DC voltage corresponding to said AC voltage; and regulator means which is connected to said first and second feedback windings and responsive to said DC voltage for decreasing said bias voltages developed at said first and second feedback windings by an extent proportional to said DC voltage, whereby shortening the turn-on period of said first and second switching elements as the instantaneous AC voltage increases.

24. An inverter AC power supply as set forth in claim 23, wherein said first and second switching elements are bipolar transistors with bases defining said control terminal, and wherein said regulator means comprises first and second amplifier transistors which are connected respectively between base-emitter path of said first and second switching transistors, said first and second amplifier transistors connected to receive at individual control terminals said DC voltage from said input voltage monitor so as to withdraw a portion of said bias voltage in proportion to said DC voltage for correspondingly lowering the bias voltages applied to said first and second switching transistors, respectively.

25. An inverter AC power supply as set forth in claim 21, further including first and second voltage monitors connected respectively to said first and second feedback windings to provide first and second monitored DC voltages corresponding to said bias voltages developed respectively at said first and second feedback windings, and further including regulator means which is connected to said first and second feedback windings and responsive to said first and second monitored DC voltages exceeding a predetermined level for lowering said bias voltages at said first and second feedback windings, whereby shortening the turn-on period of said first and second switching elements as said first and second monitored voltage increase above said predetermined level.

26. An inverter AC power supply as set forth in claim 25, wherein said first and second switching elements are bipolar transistors with bases defining said control terminal, and wherein said regulator means comprises first and second shunting transistors which are connected 'respectively between base-emitter path of said first and second switching transistors and first and second zener diodes connected respectively to control terminals of said first and second transistors, said first and second shunting transistors connected to receive at said control terminals said first and second monitored voltages from said first and second current sensors respectively through said zener diodes so as to turn off said first and second switching transistors respectively when said first and second monitored voltages exceed said predetermined level.

27. An inverter AC power supply as set forth in claim 21, further including a voltage detector providing a detected voltage indicative of the DC voltage developed across said smoothing capacitor, and further including regulator means which is connected to said first and second feedback windings and responsive to said detected DC voltage exceeding a predetermined level for lowering said bias voltages applied from said first and second feedback windings to said first and second switching elements, whereby shortening the turn-on period of said first and second switching elements as said detected voltage exceeds said predetermined level.

28. An inverter AC power supply as set forth in claim 27, wherein said first and second switching elements are bipolar transistors with bases defining said control terminal, and wherein said regulator means comprises first and second comparators, and first and second shunting transistors, said first and second comparators connected to receive said detected voltage to produce a corresponding voltage when said detected voltage exceeds said predetermined level, said first and second shunting transistors connected respectively between base-emitter path of said first and second switching transistors, said first and second shunting transistors connected at their individual control terminals to said first and second comparator to receive said detected voltage exceeding said predetermined level so as to turn off said first and second switching transistors, respectively.

29. An inverter AC power supply as set forth in claim 21, further including first and second current sensors connected in series respectively with said first and second switching elements to give first and second monitored voltages indicative of currents flowing through the inverter when said first and second switching elements are turned on, respectively, and further including regulator means which is connected to said first and second feedback windings and responsive to said first and second monitored voltages from said first and second current sensors for decreasing said bias voltages developed at said first and second feedback windings by an extent proportional to said first and second monitored voltage, whereby shortening the turn-on period of said first and second switching elements as said first and second monitored voltage increase.

30. An inverter AC power supply as set forth in claim 29, wherein said first and second switching elements are bipolar transistors with bases defining said control terminal, and wherein said regulator means comprises first and second amplifier transistors which are connected respectively between base-emitter path of said first and second switching transistors, said first and second amplifier transistors connected to receive at individual control terminals said first and second monitored voltage from said first and second current sensors so as to withdraw a portion of said bias voltage in proportion to said first and second monitored voltages for correspondingly lowering the bias voltage applied to said first and second switching transistors, respectively.

31. An inverter AC power supply as set forth in claim 21, further including offset means for producing an offset DC voltage proportional to the oscillating voltage of said inverter, said offset means being connected to the control terminal of said first and second switching elements such that said bias voltage is additive to said offset voltage to turn on and off said first and second switching elements.

32. An inverter AC power supply as set forth in claim 31, wherein said offset means comprises a transformer with a main winding and a pair of first and second auxiliary windings, and wherein said inverter includes an output transformer with a primary winding and a secondary winding, said primary winding being connected in series with said resonant inductor across said first switching element, and said secondary winding being coupled to said load, said main winding connected in series with said load across said secondary winding to develop AC voltages respectively across said first and second auxiliary windings in correspondence to an oscillating voltage fed to said load, said offset means further including rectifier means which rectify said AC voltage into said offset DC voltages to be respectively applied to said first and second switching elements.

33. An inverter AC power supply as set forth in claim 31, wherein said offset means comprises a transformer with a main winding and a pair of first and second auxiliary windings, said main winding connected in series with said resonance inductor across said first switching element to develop AC voltages respectively across said first and second auxiliary windings in correspondence to the oscillating voltage of said inverter, said offset means further including rectifier means which rectify said AC voltage into said offset DC voltages to be respectively applied to said first and second switching elements.

34. An inverter AC power supply as set forth in claim 21, wherein further including offset means for converting the AC voltage from said AC voltage source into a corresponding offset DC voltage, said offset means being connected to the control terminal of said first and second switching elements such that said bias voltage is additive to said offset voltage to turn on and off said first and second switching elements.

35. An inverter AC power supply as set forth in claim 34, wherein said offset means comprises a pair of first and second auxiliary windings which are magnetically coupled to said inductor of said chopper to develop monitoring AC voltages in correspondence to the AC voltage being supplied to said chopper, said offset means further including rectifier means which rectify said monitoring AC voltage into said offset DC voltages to be respectively applied to said first and second switching elements.

36. An inverter AC power supply as set forth in claim 34, wherein said offset means comprises a transformer with a main winding and a pair of first and second auxiliary windings, said main winding connected across said AC voltage source to develop monitoring AC voltages respectively across said first and second auxiliary windings in correspondence to said AC voltage being fed to said chopper, said offset means further including rectifier means which rectify said monitoring AC voltage into said offset DC voltages to be respectively applied to said first and second switching elements.

37. An inverter AC power supply as set forth in claim 21, wherein said inverter includes a parallel combination of an additional resonance inductor and a normally-closed bypass switch, said parallel combination being connected in series with said resonance inductor so that said additional resonance inductor is connected to said resonance inductor only when said bypass switch is turned off, said inverter further including a voltage detector which detects the output voltage of said inverter and provides a control voltage when said output voltage exceeds a predetermined level, and output control means which is connected to turn off said bypass switch in response to said control voltage, thereby increasing an impedance of said L-C resonance circuit.

38. An inverter AC power supply as set forth in claim 21, wherein said inverter includes a series combination of an additional capacitor and a normally-closed bypass switch, said series combination being connected in parallel with said resonance capacitor so that said additional resonance capacitor is connected to said resonance capacitor only when said bypass switch is turned off, said inverter further including a voltage detector which detects the output voltage of said inverter and provides a control voltage when said output voltage exceeds a predetermined level, and output control means which is connected to turn off said bypass switch in response to said control voltage, thereby increasing an impedance of said L-C resonance circuit.

39. An inverter AC power supply as set forth in claim 21, wherein said inverter includes a parallel combination of a current limiting resistor and a normally-closed bypass switch, said parallel combination being connected in series with one of said first and second switching elements so that, when said bypass switch is turned off, said current limiting resistor is connected in series with said one of the first and second switching elements to reduce an oscillating current flowing in said inverter to such a level that said self-excitation control means fails to provide said bias voltage for turning on said first and second switching elements, and further including a voltage detector which detects the output voltage of said inverter and provides a control voltage when said output voltage exceeds a predetermined level, and output control means which is connected to turn off said bypass switch in response to said control voltage, thereby stopping the inverter operation.

40. An inverter AC power supply as set forth in claim 21, wherein said resonance inductor is cooperative with said first and second feedback windings to form a saturable transformer.

* * * * *